US006229854B1

(12) United States Patent
Kikuchi et al.

(10) Patent No.: US 6,229,854 B1
(45) Date of Patent: May 8, 2001

(54) VIDEO CODING/DECODING APPARATUS

(75) Inventors: Yoshihiro Kikuchi; Toshiaki Watanabe, both of Yokohama; Kenshi Dachiku; Takashi Ida, both of Kawasaki; Noboru Yamaguchi, Yashio; Takeshi Chujoh, Tokyo, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/636,509

(22) Filed: Aug. 10, 2000

Related U.S. Application Data

(62) Division of application No. 09/223,780, filed on Dec. 31, 1998, now Pat. No. 6,128,342, which is a division of application No. 08/916,006, filed on Aug. 21, 1997, now Pat. No. 5,912,706, which is a continuation of application No. 08/613,175, filed on Mar. 8, 1996, now Pat. No. 5,731,840.

(30) Foreign Application Priority Data

Mar. 10, 1995 (JP) ................................... 7-050993
May 31, 1995 (JP) ................................... 7-134406
Sep. 29, 1995 (JP) ................................... 7-277180
Oct. 27, 1995 (JP) ................................... 7-280443

(51) Int. Cl.[7] ................................... H04N 7/12
(52) U.S. Cl. ................................... 375/240.27; 375/240.13; 375/240.16
(58) Field of Search ........................ 375/240.01, 240.23, 375/240.26, 240.27, 240.28, 240.22, 240.12, 240.13, 240.11, 240.16; 346/401.1, 402.1, 407.1, 408.1, 412.1, 413.1, 414.1, 415.1, 416.1, 417.1, 418.1, 422.1, 398.1; 382/238–239

(56) References Cited

U.S. PATENT DOCUMENTS 4,821,119   4/1989   Gharavi ........................ 348/409.1
5,068,724  11/1991   Krause et al. ................... 348/400.1
5,231,384 * 7/1993   Kuriacose ......................... 348/426
5,302,949 * 4/1994   Yoshinari et al. ................... 341/67
5,351,095   9/1994   Kerdranvat ...................... 348/699
5,386,234   1/1995   Veltman et al. .................. 348/409.1
5,392,037 * 2/1995   Kato ................................ 341/67

(List continued on next page.)

FOREIGN PATENT DOCUMENTS 0 485 230    5/1992   (EP) .
0 490 544    6/1992   (EP) .
0 556 507    8/1993   (EP) .
0 619 552   10/1994   (EP) .
0 691 789    1/1996   (EP) .
4-3684       1/1992   (JP) .
5-122685     5/1993   (JP) .
5-217300     8/1993   (JP) .
5-219489     8/1993   (JP) .
WO 92/14339  8/1992   (WO) .
WO 93/20653 10/1993   (WO) .

Primary Examiner—Vu Le
(74) Attorney, Agent, or Firm—Oblon, Spivak, McClelland, Maier & Neustadt, P.C.

(57) ABSTRACT

A video coding/decoding apparatus comprises a prediction circuit that divides an input video signal into large regions and small regions in a hierarchical fashion and produces a prediction signal by performing prediction region by region, a subtracter for generating a prediction error signal for a prediction signal at the lowest level, a DCT circuit for coding a prediction error signal, a quantization circuit and a variable-length encoder, a variable-length encoder for coding the prediction mode and motion vector information obtained at each level from the prediction circuit, and a multiplexer for multiplexing the code strings obtained from the variable-length encoder and dividing them into the upper-layer and lower-layer code strings to output the code strings obtained at the variable-length encoder particularly as upper-layer code strings.

15 Claims, 20 Drawing Sheets

U.S. PATENT DOCUMENTS

| | | | |
|---|---|---|---|
| 5,475,435 | 12/1995 | Yonemitsu et al. | 348/426.1 |
| 5,488,616 * | 1/1996 | Takishima et al. | 714/746 |
| 5,534,927 | 7/1996 | Shishikui et al. | 348/400.1 |
| 5,563,593 * | 10/1996 | Puri | 341/67 |
| 5,608,458 | 3/1997 | Chen et al. | 348/413.1 |
| 5,625,356 * | 4/1997 | Lee et al. | 341/67 |
| 5,680,174 | 10/1997 | Sugiyama | 348/405.1 |
| 5,715,005 | 2/1998 | Masaki | 348/416.1 |
| 5,731,840 | 3/1998 | Kikuchi et al. | 348/416.1 |
| 5,852,469 * | 12/1998 | Nagai et al. | 348/384 |

* cited by examiner

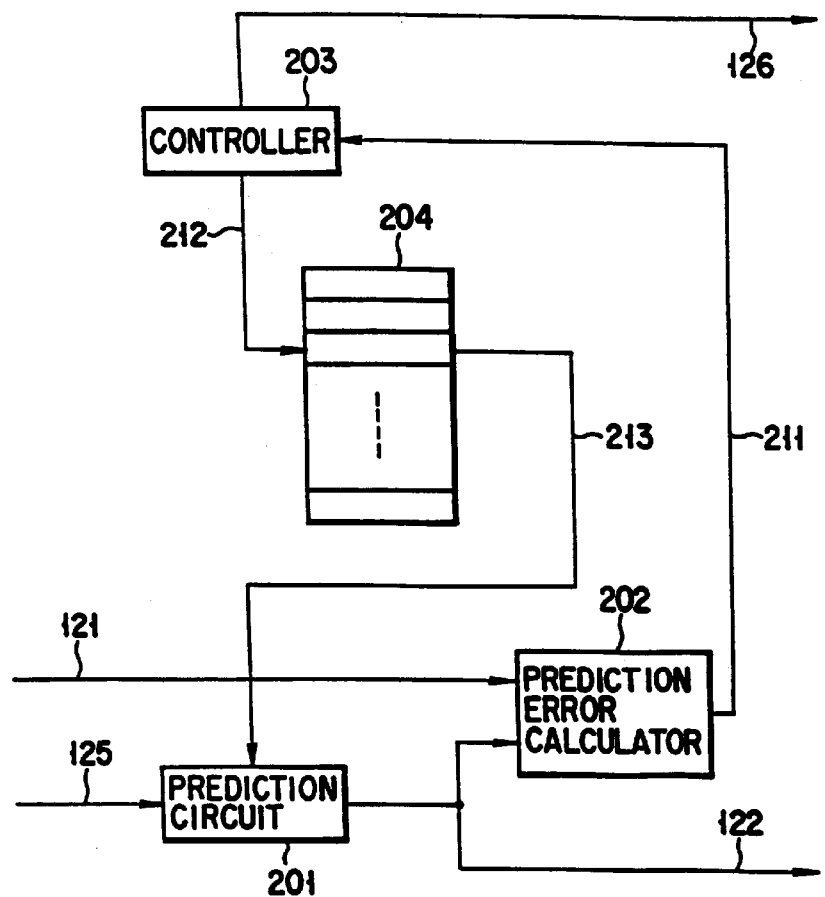
F I G. 6
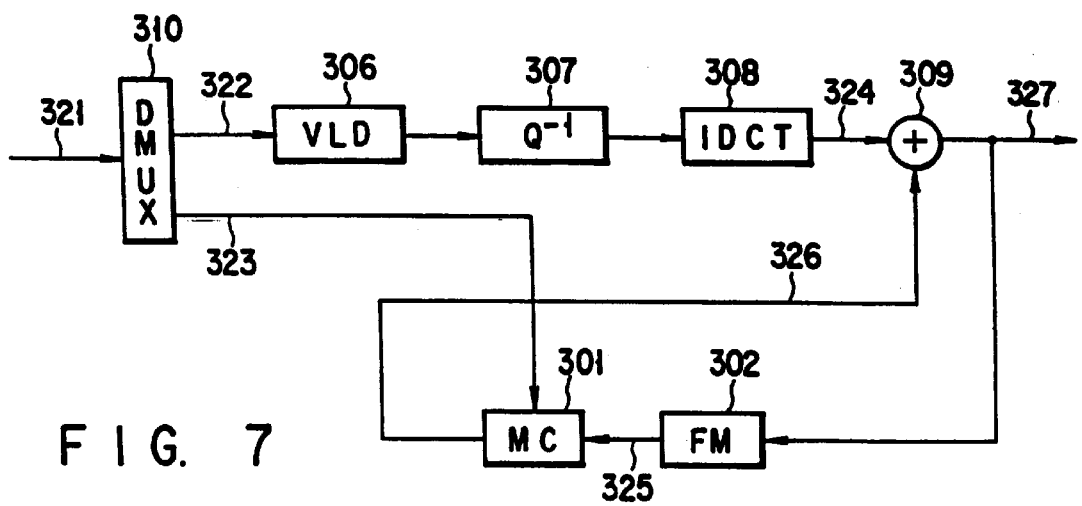
F I G. 7

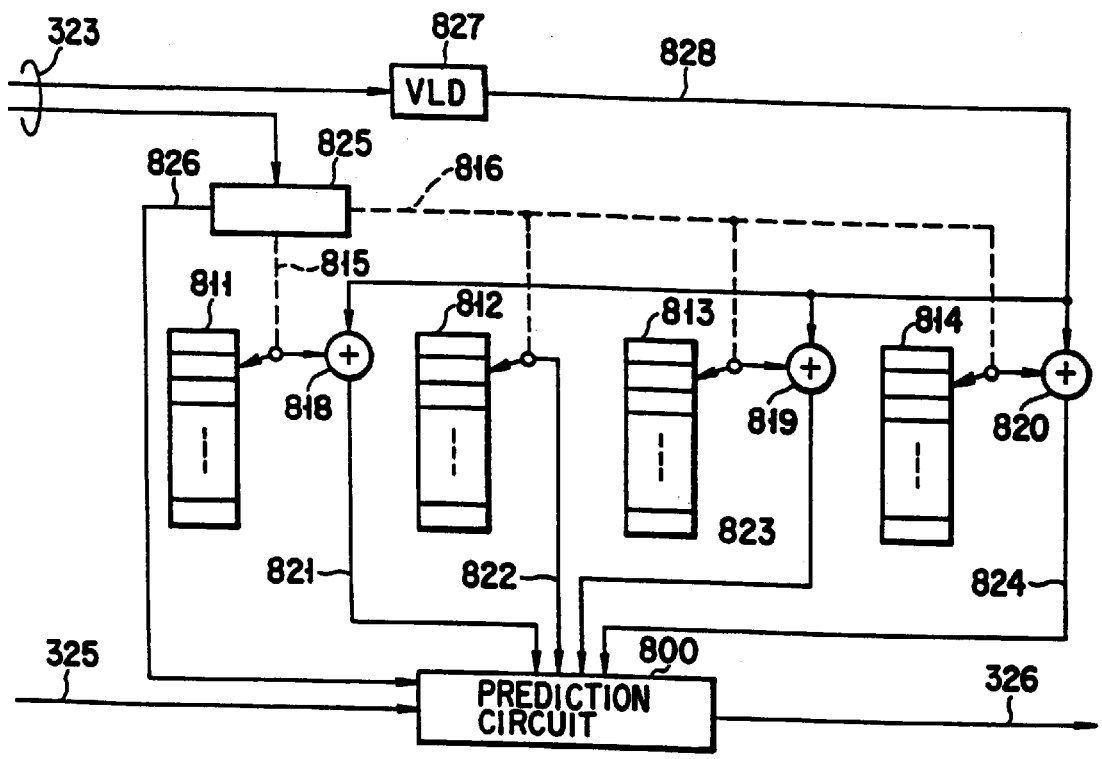
F I G. 21
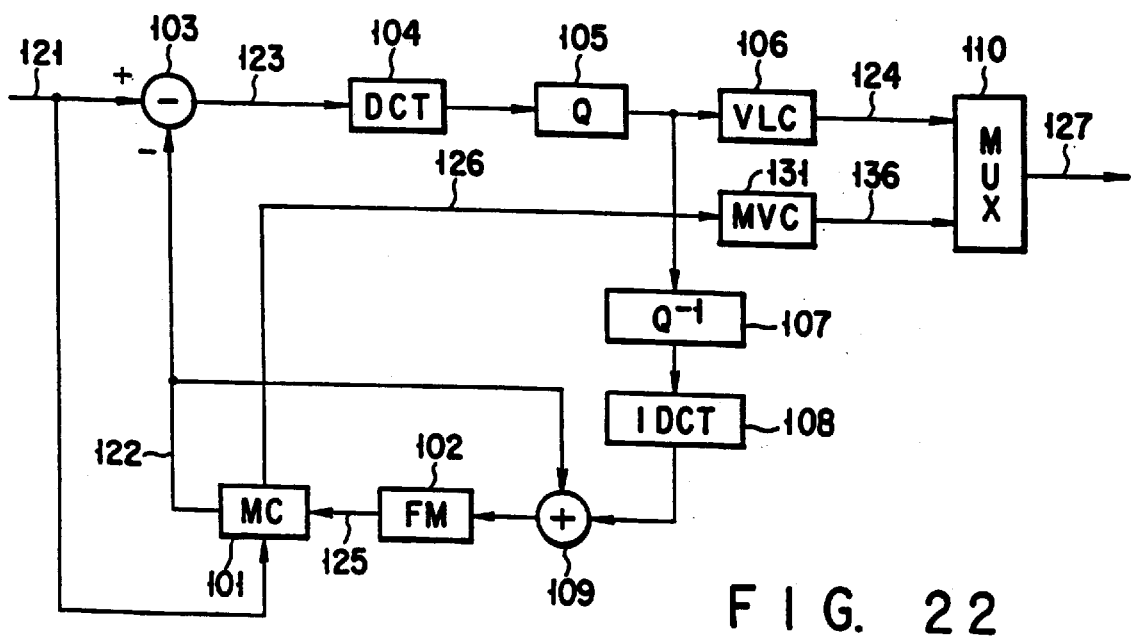
F I G. 22

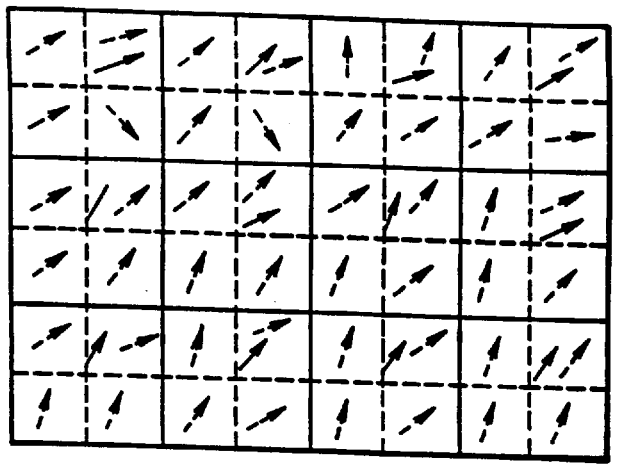
F I G. 26
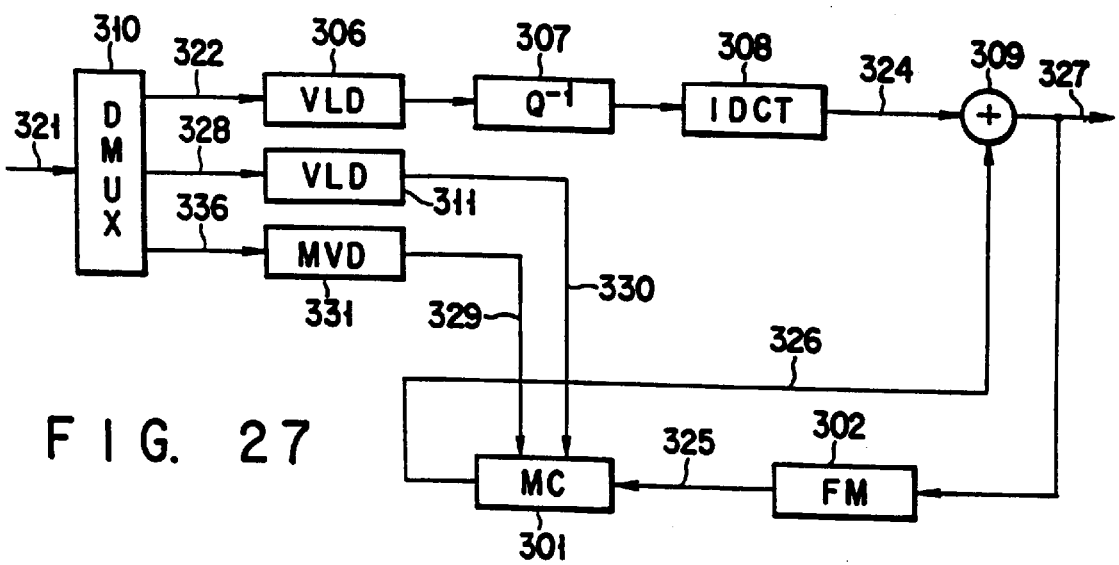
F I G. 27
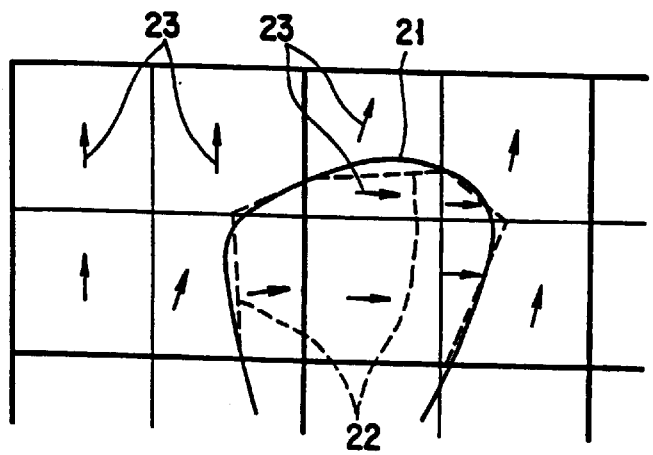
F I G. 29

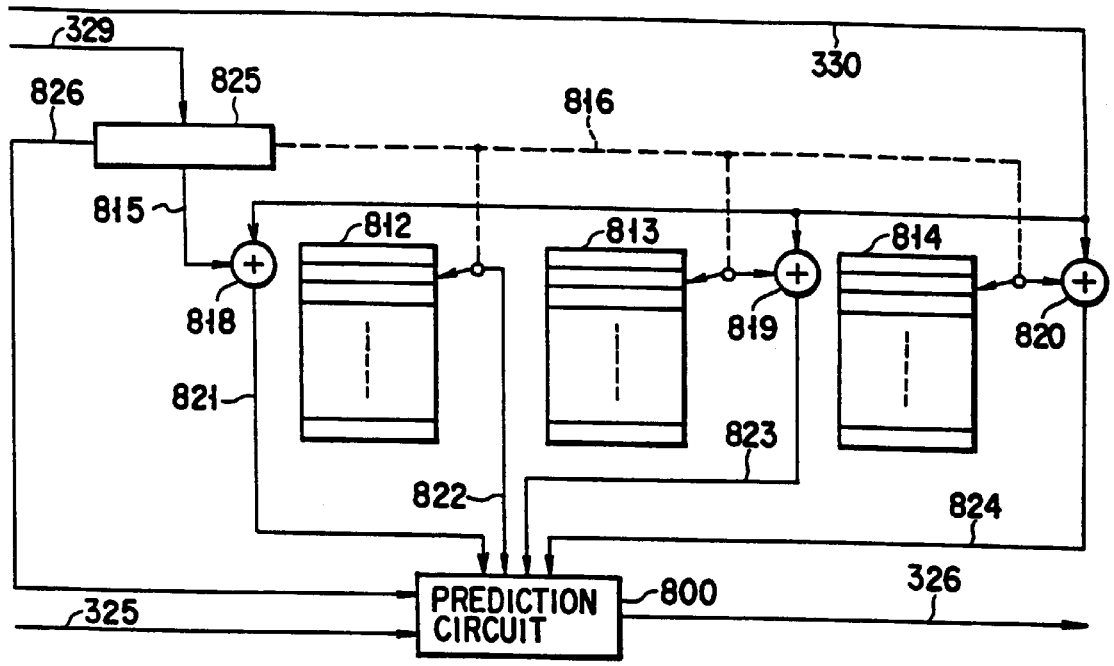
F I G. 30
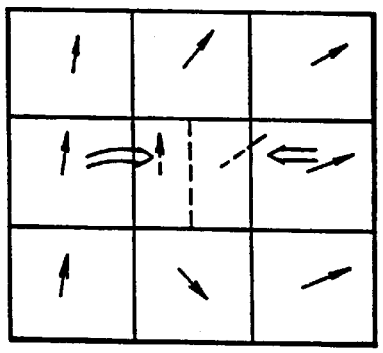
F I G. 31A
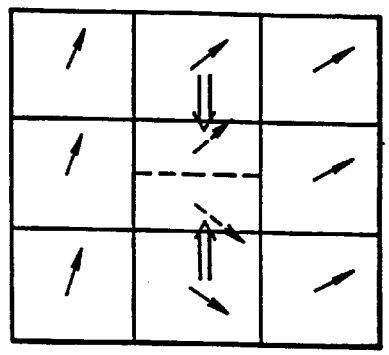
F I G. 31B
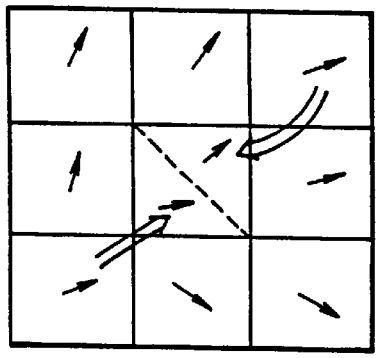
F I G. 31C
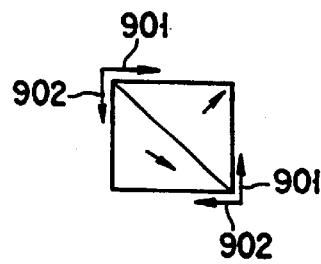
F I G. 31D

VIDEO CODING/DECODING APPARATUS

This application is a division of Ser. No. 09/223,780, filed Dec. 31, 1998 now U.S. Pat. No. 6,128,342, which is a division of Ser. No. 08/916,006 filed Aug. 21, 1997 now U.S. Pat. No. 5,912,706 which is a continuation of Ser. No. 08/613,175 filed Mar. 8, 1996 now U.S. Pat. No. 5,731,840.

BACKGROUND OF THE INVENTION

1. Field of the Invention

This invention relates to a video coding apparatus wherein a video signal is compression-coded at high efficiency and a video decoding apparatus for decoding the compression-coded signal to reconstruct the original video signal, and more particularly to a video coding/decoding apparatus that is immune to errors in the transmission channel/storage medium and assures a high-quality transmission channel/storage.

2. Description of the Related Art

In a system for transmitting and storing a video signal, such as a videophone, a teleconference system, a personal digital assistant, a digital video disk system, or a digital TV broadcasting system, a video signal is compression-coded into code strings with a small amount of information, which are transmitted to a transmission channel and stored in a storage medium. The transmitted and stored code strings are decoded to reconstruct the original video signal.

For video-signal compression-coding techniques applied to such a system, various methods have been developed, including motion compensation, discrete cosine transform (DCT), and sub-band coding, pyramid coding techniques, and a combination of these techniques. Furthermore, ISO, MPEG1, MPEG2, ITU-T H.261, and ITU-T H.262 have been determined as international standard systems for compression-coding a video signal. Any of these coding techniques uses motion compensation adaptive predictive cosine transform coding, which has been described in detail in, for example, reference 1: Hiroshi Yasuda, "International Standard for Multimedia Coding," Maruzen, June. 1991.

When the code strings obtained by coding a video signal as described above are transmitted and stored via a radio transmission channel that is prone to errors, the picture signal reconstructed on the decoding side may be degraded due to errors in transmission and storage. One known measure to deal with such errors is the multi-layered coding system which, under the conditions where code strings can be transmitted via a plurality of transmission channels each having a different error probability, divides the code strings into several layers and transmits the upper-layer code strings via transmission channels with lower error probabilities to reduce the degradation of picture quality due to errors. One proposed layer division method is such that the mode information, the motion compensation information, the low-frequency components of the prediction error signal are allocated to the upper layers and the high-frequency components of the prediction error signal are allocated to the lower layer.

In a conventional layered video coding apparatus, a prediction circuit detects a motion vector between the input video signal and the reference video signal obtained by coding and local decoding and stored in the frame memory, performs the motion compensation prediction of a specific unit region (referred to as a prediction region) on the basis of the motion vector, and produces a motion compensation prediction signal. By subtracting the prediction signal from the input video signal, a prediction error signal is produced. The prediction error signal undergoes discrete cosine transform in blocks of a specific size at a DCT circuit and is converted into DCT coefficient information. The DCT coefficient information is quantized at a quantizer. The quantized DCT coefficient information is branched into two pieces of information; one piece of DCT coefficient information undergoes variable-length coding at a first variable-length coding circuit and the other piece of DCT coefficient information undergoes inverse quantization. The inverse quantized information is subjected to inverse discrete cosine transform. The inverse DCT information is added to the prediction signal to produce a local decoded signal. The local decoded signal is stored in the frame memory as a reference video signal.

The prediction mode and motion vector information related to prediction outputted from the prediction circuit is subjected to variable-length coding at a second variable length coding circuit. The code strings outputted from each of the first and second variable-length coding circuits are multiplexed at a multiplexer, divided into upper-layer code strings and lower-layer code strings, and outputted to the transmission channels. Specifically, the upper-layer code strings are outputted to transmission channels having a relatively low probability that transmission errors will take place, and the lower-layer code strings are outputted to transmission channels having a relatively high probability that transmission errors will occur.

The multiplexer divides the code strings into the upper-layer code strings and the lower-layer code strings in a manner that allocates the mode information representing the prediction mode at the prediction circuit, the motion vector information (MV), and the low-frequency-band DCT coefficient information in the variable-length-coded DCT coefficient information to the upper-layer code strings and the remaining high-frequency-band DCT coefficient information in the variable-length-coded DCT coefficient information to the lower-layer code strings.

Such a conventional multi-layered video coding apparatus has the following problems. A first problem is that since each prediction region contains only one piece of motion vector information whose error would cause the picture quality to deteriorate seriously, if an error occurs in the motion vector information, the motion information cannot be decoded for the prediction region at all, leading to a serious picture-quality deterioration. To reduce such a picture-quality deterioration, all of the motion vector information (NV) should be allocated to the upper-layer code strings. In general, however, there is a limit to the ratio of the code amount of code strings in each layer to the total code amount of code strings in all of the layers. If all of the motion vector information is allocated to the upper-layer code strings, the limit may be exceeded. To avoid this, if the motion vector information is allocated to the lower-layer code strings, this causes the problem that error resilience decreases seriously.

Furthermore, since the individual code words of the two transmitted code strings are made up of the variable-length codes created at the first and second variable-length coding circuits, the variable-length codes may be out of synchronization due to errors in decoding. With the conventional video coding apparatus, however, multiplexing is effected in such a manner that important information related to prediction including the mode information and motion vector information, whose errors would lead to a serious deterioration of the decoded picture, is mingled with DCT coefficient information including the prediction error signal, whose errors would not cause a serious deterioration. Thus, when synchronization failure has occurred during the decoding of the code words containing the unimportant information, this may introduce errors into the code words containing the important information, causing a serious deterioration of the reconstructed picture. Should this happen, synchronization cannot be recovered until a synchronization code appears. Consequently, all of the pieces of information on the decoded pictures obtained until then have become erroneous, raising the problem that a serious deterioration develops in a wide range of the picture.

Furthermore, many conventional video coding systems use the technique for calculating the difference between adjacent motion vectors and subjecting the difference to variable-length coding in order to increase the coding efficiency. Since variable length coding is used, even an error in part of a code string will cause synchronization failure in variable length coding, which will permit the error to have an adverse effect on all of the subsequent code strings, bringing about a serious deterioration of quality of reconstructed video signal. Since the difference between adjacent motion vectors is coded, if an error occurs in one motion vector, the error will affect all of the pieces of the motion vector information obtained by computing the difference between the erroneous motion vector and each of the other motion vectors and coding the difference, with the result that the quality of reconstructed video signal will degrade considerably.

Furthermore, when there is a limit to the amount of codes that can be transferred over a transmission channel with a low error rate, part of the motion vector information must be coded in a lower layer with a high error rate, bringing about a substantial deterioration of picture quality. When a picture to be coded makes a great motion, the amount of codes in the motion vector information is very large. When the coding rate is relatively low, only the motion vector information may account for more than half of the total amount of codes. This makes greater the rate of the motion vector information to be coded in a lower layer, so that the possibility that an error will get mixed in the motion vector information becomes stronger, making a serious deterioration of picture quality more liable to develop.

On the other hand, many conventional video coding systems including the international standard systems use block matching motion compensation that divides the input motion picture into square blocks (referred to as motion compensation blocks) and performing motion compensation by representing the motion of each of these blocks by a motion vector. With the block matching motion compensation, when a motion compensation block contains regions with different motions, the vector to be obtained is the average of the motions in the respective regions, so that each region cannot be predicted with high accuracy, causing the problem that the quality of reconstructed video signal may deteriorate at the boundaries or the edges of the regions. When the coding rate is low, a motion compensation block must be made larger than the size of the picture, making degradation of picture quality from block matching more serious.

To overcome the problem with the block matching motion compensation, a segmentation based motion compensation scheme has been studied which divides the motion compensation blocks along the boundary of the object and performs motion compensation using a different motion vector for each region. The segmentation based motion compensation scheme requires an additional piece of information (region shape information) to indicate how the regions have been divided. Although the motion compensation efficiency is improved more as the region shape is represented more accurately, the volume of the region shape information increases accordingly. Therefore, the point of improvements in the coding efficiency is how efficiently the region shape is represented. When the coding rate is low, the ratio of the side information including the motion vector information and the region shape information gets larger, making the problem more significant.

The scheme for coding the region shape information include a method of chain-coding the region shape information, a method of approximating the region shape using several division patterns, and a method of approximating the region shape through interpolation by expressing the shape in approximate blocks. With any method, however, it is difficult to represent the shape of a region with a high accuracy using a small amount of codes, so that segmentation based compensation coding does not necessarily improve the coding efficiency remarkably. Furthermore, a method has been studied which estimates the region shape information from the decoded picture of an already coded frame at both of the coding unit and the decoding unit and consequently requires no independent region shape information. With this method, however, the amount of processing at the decoding unit increases significantly, and the decoded reconstructed picture contains coding distortion, so that it is difficult to effect region division with a high accuracy and better results are not necessarily obtained.

As described above, with the conventional video coding apparatus, since only one piece of information related to prediction, such as motion vector information whose error would degrade the quality of the decoded picture seriously, is coded for each prediction region, resistance to error is low.

To increase resistance to error, pieces of information on all of the predictions must be transferred via transmission channels having low error probabilities. Since there is a limit to the ratio of the code amount of code strings in each layer to the total code amount of code strings in all of the layers, the code strings must be transferred over transmission channels having different error probabilities, thus impairing the feature of multi-layered coding to alleviate the deterioration of picture quality due to errors.

Furthermore, with the conventional video coding apparatus, since the relatively important information including information related to prediction and the relatively unimportant information are mingled in code strings, an error occurred in the unimportant information affects the important information, resulting in a serious deterioration of picture quality.

As described above, with the conventional video coding/decoding apparatus using variable length coding to code the motion vector information, even if a measure to cope with errors, such as multi-layered coding, is taken, only an error in part of the code words in the motion vector information is permitted to spread over the remaining code words behind, so that the error has an adverse effect on the entire screen. Since all of the pieces of the motion vector information cannot be coded in the upper layers, many errors occur in pieces of the motion vector information, making a significant deterioration of picture quality liable to develop in the decoded picture.

Additionally, with the conventional video coding/decoding apparatus using block matching motion compensation, when a motion compensation block contains regions with different motions, the motion compensation efficiency decreases, causing the quality of reconstructed video signal to deteriorate. In addition, the amount of codes in the region shape information is large, making the coding efficiency lower.

Furthermore, with the conventional video coding/decoding apparatus using segmentation based compensation, the amount of codes in the region shape information is large, thus decreasing the coding efficiency.

SUMMARY OF THE INVENTION

An object of the present invention is to provide a video coding/decoding apparatus with high error resilience.

Another object of the present invention is to provide a video coding/decoding apparatus having a high coding efficiency as well as a high error resilience.

According to a first aspect of the present invention, there is provided a video coding apparatus comprising: a prediction section for predicting each of a plurality of first regions and each of a plurality of second regions smaller than the first regions at respective prediction levels ranging from a first prediction level at which motion prediction is effected with a first accuracy and to a second prediction level at which motion prediction is effected with a second accuracy higher than the first accuracy, for generating prediction signals corresponding to the first and second prediction levels, the first and second regions being obtained by dividing an input video signal at the respective levels; a prediction error generating section for generating a prediction error signal on the basis of the prediction signals obtained by the prediction section and the input video signal; a first coding section for coding the prediction error signal generated by the prediction error generating section to output first coded information; a second coding section for coding information on the prediction which is carried out at each of the prediction levels by the prediction section to output second coded information; and a code string output section for outputting the coded information obtained by the first and second coding section in the form of hierarchical code strings.

According to a second aspect of the present invention, there is provided a video decoding apparatus comprising: a first decoding section for obtaining a prediction error signal by decoding the upper-layer coded information and lower-layer coded information obtained in a high-level prediction with a low accuracy and in a low-level prediction with a high accuracy, respectively; a second decoding section for obtaining information on prediction by decoding the upper-layer coded information and the lower-layer coded information; a deciding section for deciding whether or not the prediction error signals decoded at the first and second decoding section and the information on prediction have been decoded correctly; and picture generating section for reconstructing the video signal on the basis of the information decoded at the second decoding section, when the deciding section has decided that the first decoding section has not decoded the prediction error signal correctly.

According to a third aspect of the present invention, there is provided a video coding apparatus comprising: a prediction section for obtaining a motion vector from an input video signal and a reference video signal and generating a prediction signal on the basis of the motion vector; a prediction error generating section for generating a prediction error signal on the basis of the prediction signal from the prediction section and the input video signal; a first coding section for coding the prediction error signal; a second coding section for generating and coding the vector-quantized motion information corresponding to the motion vector; and a reference picture generating section for generating the reference video signal on the basis of result obtained by local-decoding the prediction error signal.

According to a fourth aspect of the present invention, there is provided a video decoding apparatus comprising: a first decoding section for decoding the prediction error information from a code string containing index information indicating a vector-quantized motion vector and coded prediction error information; a second decoding section for decoding the index information from the code string and obtaining a vector-quantized motion vector; a prediction section for generating a prediction signal by performing the motion compensation prediction of the preceding reconstructed video signal using the motion vectors obtained from the second decoding section; and a reconstructing section for reconstructing a video signal from the prediction signal and the prediction error signal.

According to a fifth aspect of the present invention, there is provided a video coding apparatus comprising: a prediction section for predicting each of a plurality of first regions and each of a plurality of second regions smaller than the first regions at respective prediction levels ranging from a first prediction level at which motion prediction is effected with a first accuracy and to a second prediction level at which motion prediction is effected with a second accuracy higher than the first accuracy, for generating prediction signals corresponding to the first and second prediction levels, the first and second regions being obtained by dividing an input video signal at the respective levels; a prediction error generating section for generating a prediction error signal on the basis of the prediction signals obtained by the prediction section and the input video signal; a first coding section for coding the prediction error signal generated by the prediction error generating section to output first coded information; a second coding section for coding information on the prediction which is carried out at each of the prediction levels by the prediction section to output second coded information; and a code string output section for outputting the coded information obtained by the first and second coding section in the form of hierarchical code strings, and wherein the prediction section obtains motion vectors for the first and second regions from the input video signal and reference video signal and on the basis of the motion vectors and generates a prediction signal corresponding to each of the prediction levels from the first prediction level to the second prediction level, and the second coding section generates and codes the vector-quantized motion information corresponding to the motion vector as information on the prediction.

With the video coding apparatus according to the first aspect of the invention, because the input video signal is predicted in a hierarchical fashion over as many regions as possible and the pieces of information on the predictions obtained at the individual levels containing not only the lowest level but also higher levels are coded, even if an error has occurred in the information on the prediction at a specific level, the video decoding apparatus can produce a prediction signal from the information on the predictions, provided that there is no error in the information on the predictions at the higher levels. This helps reduce the deterioration of picture quality of the decoded image when an error has occurred in information on the prediction.

With the video coding apparatus according to the second aspect of the invention, pieces of information on the predictions at the individual levels of hierarchical predictions are decoded. When the prediction error signal is not decoded correctly because an error has occurred in the prediction at a specific level, the video signal is decoded by using the information on the prediction at higher levels to produce a prediction signal, whereby the deterioration of picture quality of the decoded image can be reduced.

With the video decoding apparatus according the third aspect of the invention, because the probability that erroneous information will be determined to be free from an error becomes low by whether the decoded information is possible information in coding motion pictures, the deterioration of picture quality of the decode picture due to use of erroneous information in decoding the motion picture can be suppressed.

With the video coding apparatus and video decoding apparatus according to the fifth and sixth aspects of the invention, motion compensation prediction is performed using vector-quantized motion information. In vector quantization, a series of sampled values is quantized into a single code vector, enabling the redundancy in the sampled values to be used directly for information compression. Therefore, by vector-quantizing the motion information and representing the motion information using the code book indexes specifying code vectors in a code book, it is possible to effect motion compensation prediction efficiently while suppressing the amount of codes in the motion information.

Furthermore, since the vector-quantized motion information has a smaller bias in the volume of generated information than the directly coded motion vector information, even fixed-length coding enables the motion information to be coded at a relatively high coding efficiency. With the video decoding apparatus, even when an error has got mixed in the transmission channel, use of fixed-length coding prevents the error from spreading over a wide range due to synchronization failure as found in variable-length coding, with the result that the quality of the reconstructed picture at the time when an error has occurred is improved remarkably. Therefore, with the first video coding/decoding apparatus, the error resilience is improved while a high coding efficiency is maintained.

Furthermore, candidates for the motion vectors corresponding to code vectors stored in a code book are arranged in such a manner that candidates for motion vectors with smaller movement are arranged with higher pixel accuracy. Since motion vectors with smaller movement usually appear more frequently, such an arrangement with higher pixel accuracy makes smaller a prediction error signal for motion compensation prediction, so that the coding efficiency is improved. On the other hand, since motion vectors with larger movement appear less frequently, an arrangement with high pixel accuracy does not contribute much to a reduction in the prediction error signal. By decreasing the pixel accuracy and reducing the number of candidates for motion vectors to be searched for, the coding efficiency can be improved more.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 6 is a block diagram of a motion compensation adaptive prediction circuit in the video coding apparatus of the second embodiment;

FIG. 7 is a block diagram of a video decoding apparatus corresponding to the video decoding apparatus of the second embodiment;

FIG. 21 is another block diagram of the motion compensation adaptive prediction circuit in the video decoding apparatus corresponding to the video coding apparatus according to the second embodiment of the invention;

FIG. 22 is a block diagram of a video coding apparatus according to a fifth embodiment of the present invention;

FIG. 26 is a diagram to help explain the operation of the motion compensation adaptive prediction circuit in the video coding apparatus of FIG. 25;

FIG. 27 is a block diagram of a video decoding apparatus corresponding to the video coding apparatus of the sixth embodiment;

FIG. 29 is a diagram to help explain the operation of the motion compensation adaptive prediction circuit of FIG. 28;

FIG. 30 is another block diagram of the motion compensation adaptive prediction circuit in the video decoding apparatus corresponding to the video coding apparatus of the seventh embodiment;

FIGS. 31A to 31D are diagrams to help explain the region shape in segmentation based compensation and a method of searching for a motion vector;

DETAILED DESCRIPTION OF THE PREFERRED EMBODIMENTS

Hereinafter, referring to the accompanying drawings, embodiments of the present invention will be explained.

Figure 1:
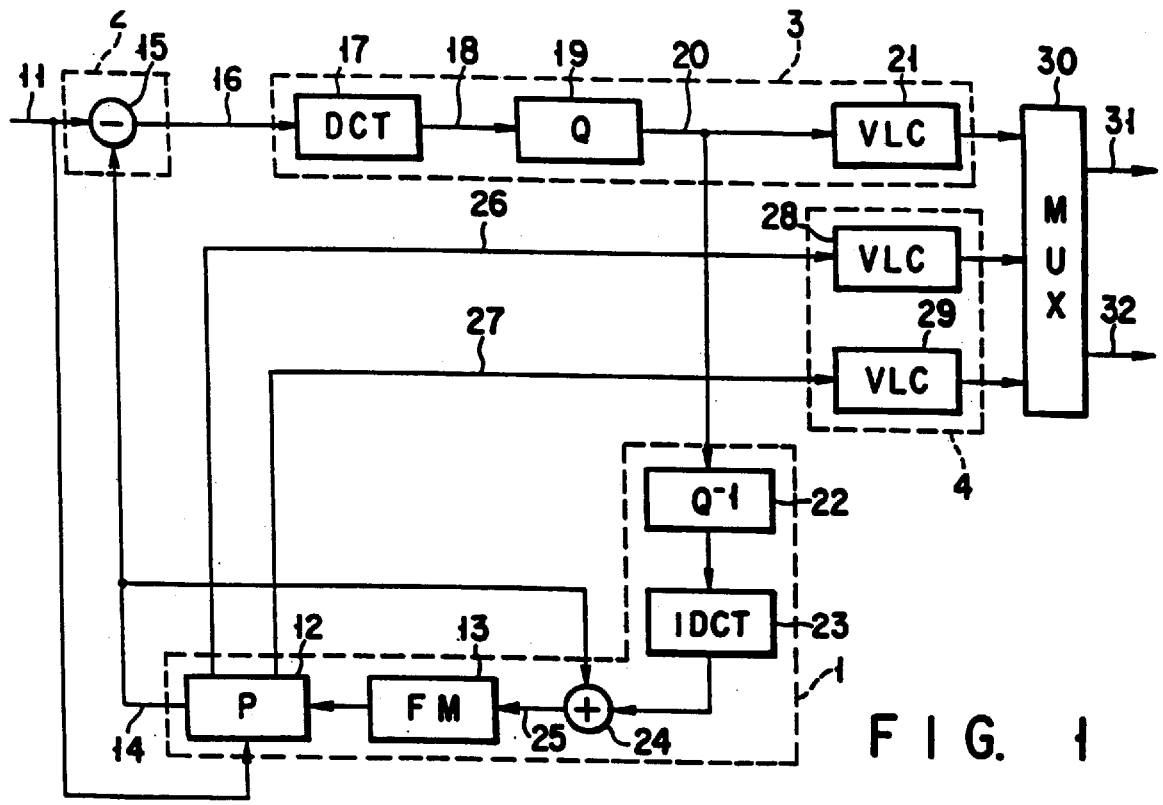
FIG. 1 is a block diagram of a video coding apparatus according to a first embodiment of the present invention.

A video coding apparatus shown in FIG. 1 comprises a local decode and prediction circuit section 1 that produces prediction signals in the range from the upper to the lower layers according to the motion of in an input video signal, a prediction error generator section 2 that generates a prediction error signal, a first coding circuit section 3 that encodes a prediction error signal, a second coding circuit section 4 that encodes information on prediction, and a multiplexer that multiplexes the code strings obtained from the first and second coding circuit sections.

The input video signal 11 is first used in prediction at a prediction circuit 12 in the local decoding and prediction circuit section 1. Specifically, the prediction circuit 12 senses the motion vector between the input video signal 11 and the reference video signal obtained by coding/decoding and stored in a frame memory 13 and on the basis of the motion vector, produces a motion compensation prediction signal. The prediction circuit 12 can operate in two modes, a motion compensation prediction mode (interframe prediction mode) and an intra-frame prediction mode in which the input video signal 11 is coded directly, and selects the mode most suitable for coding and outputs a prediction signal 14 corresponding to the mode. Namely, the prediction circuit 12 outputs a motion compensation prediction signal in the motion compensation prediction mode and "0" as a prediction signal in the intra-frame prediction mode.

A subtracter 15 produces a prediction error signal 16 by subtracting the prediction signal 14 from the input video signal 11. A discrete cosine transform (DCT) circuit 17 subjects the prediction error signal 16 to discrete cosine transform in blocks of a specific size and produces DCT coefficient information 18. The DCT coefficient information 18 is quantized at a quantizer 19. Since in the intra-frame prediction mode, the prediction signal 14 is "0", the subtracter 15 outputs the input video signal 11 directly as the prediction error signal 16.

The DCT coefficient information 20 quantized at the quantizer 19 is branched into two pieces of information; one piece of information is subjected to variable-length coding at a first variable-length encoder 21 and the other piece of information is subjected to inverse quantization at an inverse quantizer 22. The output of the inverse quantizer 22 undergoes inverse discrete cosine transform at an inverse discrete cosine transform (inverse DCT) circuit 23. That is, the inverse quantizer 22 and inverse DCT circuit 23 carry out the processings opposite to those in the quantizer 19 and DCT circuit 17, respectively, and the inverse DCT circuit 23 produces a signal approximate to the prediction error signal 16 at the output. The output of the inverse DCT circuit 23 is added to the prediction signal 14 from the prediction circuit 12 at an adder 24, which then produces a local decoded signal 25. The local decoded signal 25 is stored in the frame memory 13 as a reference video signal.

The prediction circuit 12, as described later, outputs the large-region prediction mode/motion vector information 26 and the small-region prediction mode/motion vector information 27 as information on prediction, which are subjected to variable-length coding at a variable-length encoder 28 and a variable-length encoder 29, respectively. The code strings outputted from the variable-length encoders 21, 28, and 29 are multiplexed at a multiplexer 30 and divided into upper-layer code strings 31 and lower-layer code strings 32, which are outputted to a transmission channel/storage medium (not shown).

Under the conditions where code strings can be transmitted/stored via transmission channels/storage mediums having different error probabilities, the upper-layer code strings 31 are transmitted and stored via transmission channels/storage mediums having lower error probabilities and the lower-layer code strings 32 are transmitted and stored via transmission channels/storage mediums having higher error probabilities, whereby an error is made as less liable to occur in the upper-layer code strings as possible. When the code strings 31, 32 are subjected to error correcting/detecting coding, more powerful error correcting/detecting coding is effected so that the upper-layer code strings 31 may have a lower error probability than the lower-layer code strings 32.

Figure 2:
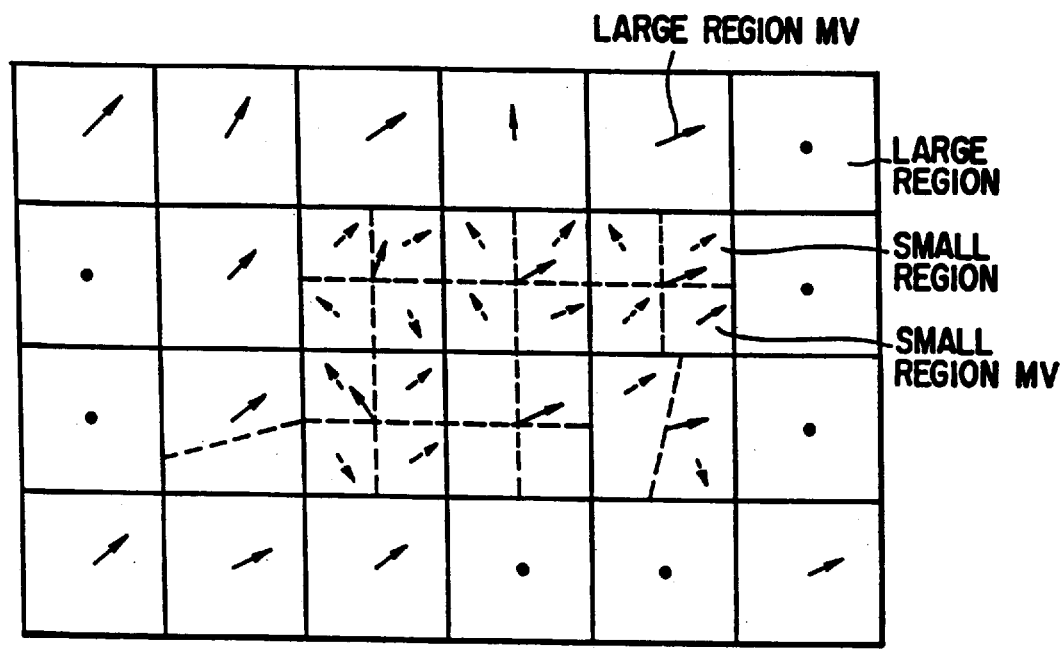
FIG. 2 illustrates the motion compensation regions in the video coding apparatus of FIG. 1 and the motion vectors corresponding to the regions.

Next, the configuration and operation of the prediction circuit 12 will be explained in detail with reference to FIG. 2. The prediction circuit 12 divides the input video signal 11 into as many regions as possible in a hierarchical fashion in the range from the highest to lowest levels, performs the motion compensation prediction of the input video signal for each region divided at each level, and thereby produces a prediction signal. In the example of FIG. 2, the prediction circuit 12 performs region division and prediction at two levels. Specifically, at the first level, the prediction circuit 12 broadly divides the input video signal 11 as shown by the solid-line regions in FIG. 2 (referred to as large regions), performs motion compensation prediction of these large regions with low pixel accuracy, and then at the second level, further divides the large regions into broken-line regions (referred to as small regions) if necessary, and effects motion compensation prediction of these small regions with high pixel accuracy.

Then, variable-length encoders 28 and 29 encode not only information on the prediction of the large regions outputted from the prediction circuit 12 but also information on the prediction of the small regions in connection with the large regions. By doing this way, if information on the prediction of the small regions should be lost by the error on transmission line/storage media, the decoding apparatus can predict with low accuracy provided that information on the prediction of the large regions is decoded correctly, thereby preventing a serious deterioration of picture quality of the decode image.

The information on the prediction outputted from the prediction circuit 12 consists of information indicating the prediction mode and information indicating the motion vector. Information indicating the prediction mode of large regions and information indicating motion vectors (shown by the sold-line arrows in FIG. 2), that is, large-region prediction mode/motion vector information 26, are subjected to variable-length coding at the variable-length encoder 28. In this case, for the motion vector information, the difference from the already coded adjacent large-region motion vector information may be subjected to variable-length coding or the motion vector information may undergo fixed-length coding without computing the difference. Additionally, the motion vector information may be subjected to fixed-length coding in some regions and to variable-length coding in the remaining regions.

On the other hand, information indicating the prediction mode of small regions and information indicating motion vectors (shown by the broken-line arrows in FIG. 2), that is, small-region prediction mode/motion vector information 27 undergoes variable-length coding at the variable-length encoder 29. In this case, the difference between the motion vector information and the large-region motion vector information may be calculated for each small region and subjected to variable-length coding. The differences may be coded together for each large region by block encoding and vector quantization. When the difference value is subjected to variable-length coding, by expressing a large-region motion vector as a reversible function (e.g., the average value) on the basis of small-region motion vectors, any one of the small-region motion vectors can be computed on the basis of the large-region motion vector and the other small-region motion vectors, thereby eliminating the necessity of coding.

Figures 3A, 3B:
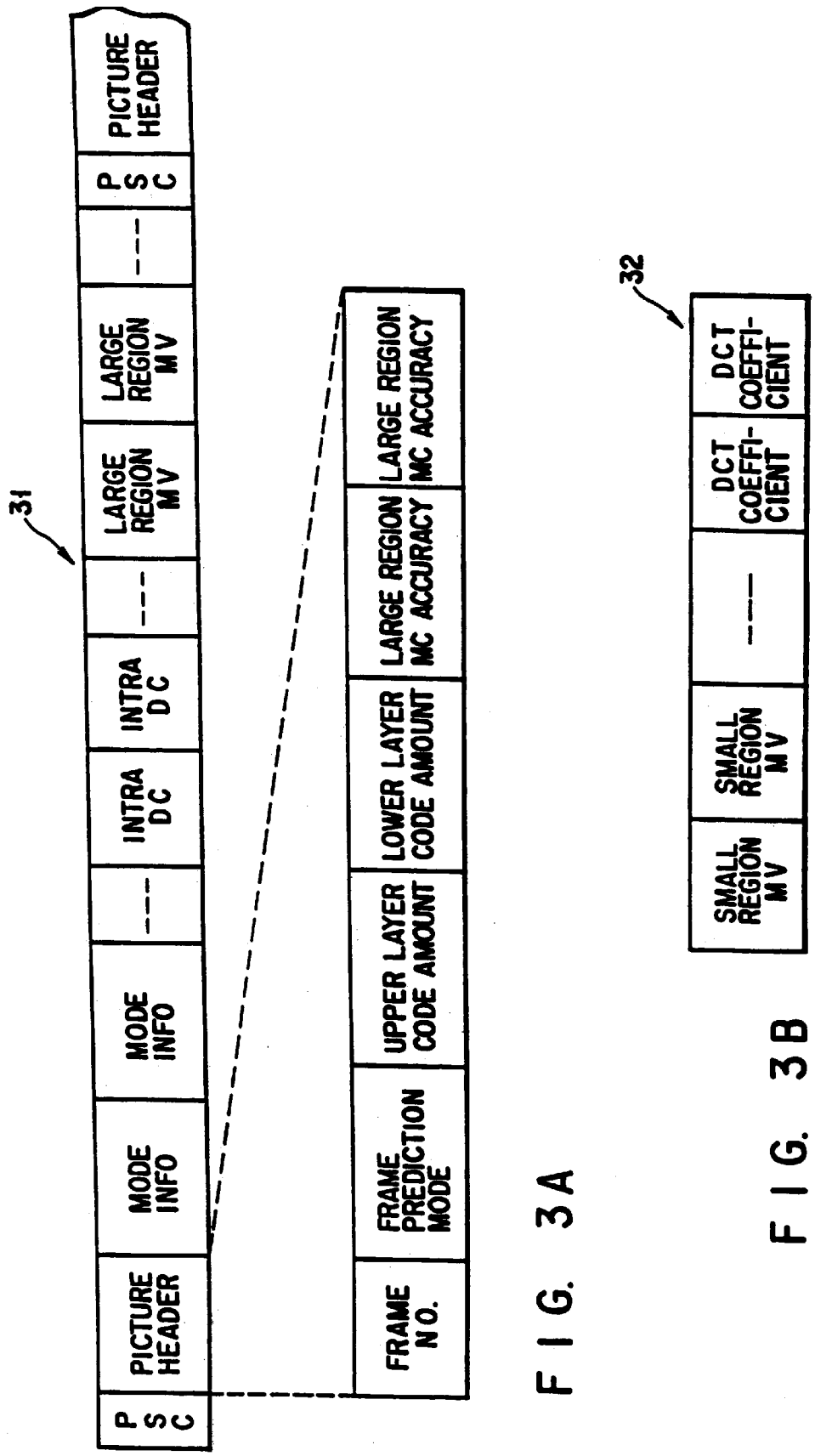
FIGS. 3A and 3B show an upper-layer code string and a lower-layer code string outputted from the video coding apparatus of FIG. 1.

FIGS. 3A and 3B show the structure of an upper-layer code string 31 and a lower-layer code string 32. A uniquely decodable synchronization code is put at the head of each coding frame or each region unit in the upper-layer code string 31 shown in FIG. 3A. PSC represents a synchronization code for a frame unit. The synchronization code PSC is followed by a picture header indicating coding information on the frame. The picture header includes a frame number indicating the temporal position of the frame, information indicating the prediction mode of the frame (frame prediction mode), and information indicating the length of each code string in the upper and lower layers of the frame (upper layer code amount and lower layer code amount.

Furthermore, when the sizes of the large and small regions and information indicating the pixel accuracy of motion compensation (large-region MC accuracy and small-region MC accuracy) are added to the picture header as shown in FIG. 3A, whereby the amount of codes in the motion vector information can be controlled by changing the motion compensation accuracy frame by frame. As a result, even when the ratio of the amount of codes 31 in the upper-layer code strings to that in the lower-layer code strings 32 is determined on account of the limits of the transmission channel/storage medium, the amount of codes can be allocated according to the situation. Because the total amount of codes in the motion vector information on each frame can be controlled, the optimum motion compensation accuracy can be selected on the basis of the motion compensation accuracy and the amount of codes in the motion vector information, whereby the coding efficiency can be improved.

One of the features is that pieces of coding information on the individual regions are arranged in descending order of importance. Here, information with much importance means information whose error would cause a serious deterioration of the decoded image. Specifically, behind the picture header in the upper-layer code string 31, information indicating the prediction mode (mode information) which has the greatest importance is placed. This mode information consists of the large-region prediction mode and motion vector information and small-region prediction mode information.

Placed behind the code string of the prediction mode information is the DC component of the DCT coefficient information (intra DC) in the region for which the intra-frame prediction mode has been selected, that is, the code string of the DC component among the code strings obtained by coding by means of the variable-length encoder 21 the DCT coefficient information obtained by passing the prediction error signal 16 through the DCT circuit 17 and quantizer 19. Furthermore, put in a region for which the motion compensation prediction mode has been selected is the large-region motion vector information (large-region MV), that is, the code string of the motion vector information among the code strings obtained by coding by means of the variable-length encoder 28 the large-region prediction mode/motion vector information 26 outputted from the prediction circuit 12.

For example, where the prediction mode information is inserted into the code string, first the large-region mode information may be inserted into the code string in units of one frame and then the large-region mode information may be inserted therein. Alternatively, large-region mode information and small-region mode information contained in the large-region mode information may be inserted together in the code string for each large region.

On the other hand, placed first in the lower-layer code string 32 shown in FIG. 3B is the small-region motion vector information (small-region MV), that is, the code string of the motion vector among the code strings obtained by coding the small-region prediction mode/motion vector information 27 outputted from the prediction circuit 12 at the variable-length encoder 29. Put behind that string is the high-frequency components of the DCT coefficient information, that is, the code string of the high-frequency components among the code strings obtained by coding by means of the variable-length encoder 21 the DCT coefficient information produced by passing the prediction error signal 16 through the DCT circuit 17 and quantizer 19.

As described above, motion compensation prediction is performed hierarchically and the prediction mode information and the large-region motion vector information are allocated to the upper-layer code string 31 and small-region motion vector information is assigned to the lower-layer code string 32. Therefore, even if the small-region motion vector information contained in the lower-layer code string 32 has been lost due to an error in the transmission channel/storage medium, the video decoding apparatus can perform motion compensation prediction with low accuracy using the large-region motion vector information contained in the upper-layer code string 31, so that the probability that the picture quality of the decoded image will deteriorate seriously can be reduced.

Furthermore, in the embodiment, because even the code strings in each of the upper and lower layers are arranged in descending order of importance, an error occurred in the unimportant information has no adverse effect on the important information, preventing a significant deterioration of picture quality.

Figure 4:
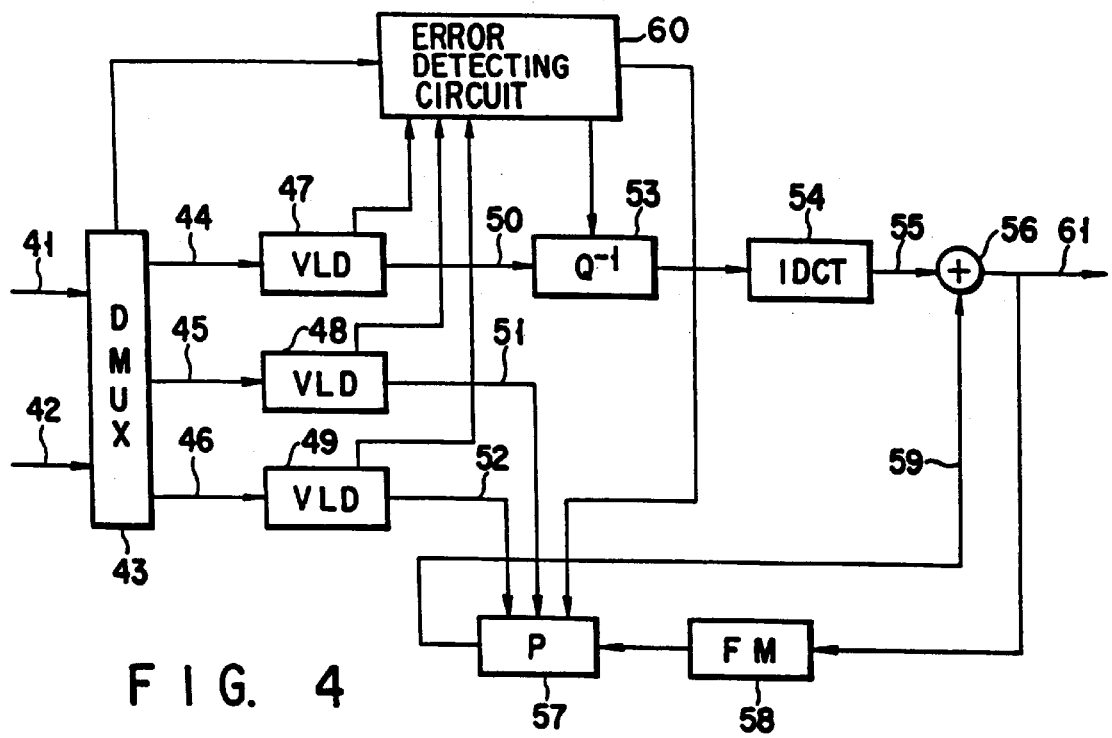
FIG. 4 is a block diagram of a video decoding apparatus corresponding to the video coding apparatus of the first embodiment.

Next, an embodiment of a video decoding apparatus according to the present invention will be explained. FIG. 4 is a block diagram of a video decoding apparatus corresponding to the video coding apparatus of FIG. 1.

In FIG. 4, the upper-layer code string 31 and lower-layer code string 32 outputted from the video coding apparatus of FIG. 1 pass through the transmission channel/storage medium and become the upper-layer code string 41 and lower-layer code string 42, which enter a demultiplexer 43, which then separates these code strings into variable-length codes 44 of quantized DCT coefficient information, variable-length codes 45 of large-region prediction mode and motion vector information, and a variable-length code 46 of small-region prediction mode and motion vector information, which are in turn supplied to variable-length decoders 47, 48, and 49, respectively.

The variable-length decoder 47 subjects the variable-length codes 44 to variable-length decoding and produces quantized DCT coefficient information 50. The quantized DCT coefficient information 50 is subjected to inverse quantization at an inverse quantizer 53. The resulting signal undergoes inverse discrete cosine transform at an inverse DCT circuit 54, which produces a prediction error signal 55. An adder 56 adds the prediction error signal 55 to the prediction signal 59 from the prediction circuit 57 and produces a reconstructed video signal 61. The reconstructed video signal 61 is outputted to the outside of the video decoding apparatus and is also stored in a frame memory 58 as a reference video signal.

On the other hand, the variable-length decoders 48 and 49 subject the variable-length codes 45, 46 to variable-length decoding and produce large-region prediction mode and motion vector information 51 and small-region prediction mode and motion vector information 52, respectively. These pieces of information 51 and 52 are inputted to the prediction circuit 57. The prediction circuit 57 predicts the video signal from the reference video signal stored in the frame memory 58, the large-region prediction mode and motion vector information 51, and the small-region prediction mode and motion vector information 52, and produces a prediction signal 59.

An error detecting circuit 60 determines whether there is an error in the upper-layer code string 41 and the lower-layer code string 42 on the basis of the state of the demultiplexer 43 and variable-length decoders 47, 48 and 49 and supplies the determination result to the prediction circuit 57. If the error detecting circuit 60 has sensed that neither the upper-layer code string 41 nor the lower-layer code string 42 has an error, the prediction circuit 57 will output the same prediction signal 59 as the prediction signal 14 in FIG. 1 on the basis of the reference video signal stored in the frame memory 58.

The above process is the process of reconstructing a picture signal in a manner that corresponds to the video coding apparatus of FIG. 1. The processes carried out at the inverse quantizer 53, inverse DCT circuit 54, adder 56, and frame memory 58 are basically the same as those at the inverse quantizer 22, inverse DCT circuit 23, adder 24, and frame memory 13 in FIG. 1. The variable-length decoders 47, 48, 49, demultiplexer 43 perform the reverse of the processes effected at the variable-length encoders 21, 28, 29 and multiplexer 30.

If the error detecting circuit 60 has sensed that at least one of the upper-layer and lower-layer code strings has an error, for example, a reconstructed image will be created using the information more important than the information in which an error has been sensed, as follows:

(1) If an error has been sensed in the DCT coefficient information in the block with motion compensation prediction mode, the prediction error signal for the block will be set to 0 and a reconstructed video signal 61 will be created using as a prediction signal 59 the motion compensation prediction signal obtained from the properly decoded mode information, large-region motion vector information, and small-region motion vector information.

(2) If an error has occurred in the small-region motion vector information, a reconstructed video signal 61 will be set to a motion compensation prediction signal created using the large-region motion vector information.

(3) If an error has occurred in the large-region motion vector information, concealment will be performed. If the large-region motion vector information can be predicted from the motion vector information of the surrounding regions or that of the already decoded frame this predicted motion vector is used. Otherwise, the picture signal of the already decoded frame will be used directly as a reconstructed video signal 61.

(4) If an error has occurred in the AC components of the DCT coefficient information in the block for which the intra-frame prediction mode has been selected, a picture signal for the block will be predicted from the DC component of the DCT coefficient information and the correctly decoded picture signal in the surrounding blocks or an picture signal for the block will be predicted from the picture signal of the already decoded frame.

When variable-length codes are used, an error may bring about synchronization failure and have an adverse effect on the subsequent codes until re-synchronization performed by detecting a synchronizing code. Should this happen, the subsequent codes will not be used in decoding. For example, when an error has occurred in the small-region motion vector information in the lower-layer code string 42, the error may spread over the motion vector information on those subsequent to the small region and the DCT coefficient information behind. In such a case, pieces of information over which the error has spread are not used for decoding. Even when such synchronization failure has taken place, an error occurred in information of little importance will not have an adverse effect on information of great importance because codes are arranged in descending order of importance in a code string, so that a serious deterioration of the reconstructed image can be prevented.

Concrete methods of sensing an error in the code string 41 or 42 at the error detecting circuit 60 are as follows.

A first method is to use error detecting codes, such as parity check codes or CRC codes. In this case, variable-length codes are subjected to error detecting coding at the multiplexer 30 in the video coding apparatus of FIG. 1 and an error detection process is carried out at the demultiplexer 43 in the video decoding apparatus of FIG. 4. The detecting result is supplied to the error detecting circuit 60.

A second method is such that when a code word that does not exist in a code word table has been detected, the code word is determined to be erroneous. When variable-length codes are used, an error can spread over not only the portion where the error has been detected, but also the code strings before and after the portion. Therefore, the error detection process is performed on all of the code words.

A third method is to determine an error by whether the motion vector information, prediction signal, DCT coefficient information, prediction error signal, and reconstructed video signal are signals impossible to appear in coding the moving image. Since the present invention is characterized by using the third method, an detailed explanation will be given.

For example, when the motion vector shown in the motion vector information has exceeded the previously determined searching range or gone outside the screen, it is determined to be erroneous.

Furthermore, an error can be detected by determining the DCT coefficient information subjected to inverse quantization at the inverse quantizer 53. If the pixel value of an input picture signal 11 is in the range of 0 to D−1 and the DCT block size is N×N, the DCT coefficient will take a value in the following range:

<Intraframe Prediction Mode>
DC component: 0 to N×D
AC component: −(N/2×D) to (N/2×D)
<Interframe Prediction Mode>
−(N/2×D) to (N/2×D)

When the decoded DCT coefficient takes a value outside the range, it will be determined to be erroneous. In this case, all or part of the DCT coefficients for the block in which an error has been detected should be determined to be 0 or the decoded value should be estimated from the decoded values of the surrounding blocks.

Additionally, an error can be detected using the pixel value of the reconstructed video signal 61. If the pixel value of the input picture signal 11 is in the range of 0 to D−1, the DCT block size is N×N, and the quantization step-size is Q (in the case of linear quantization), the range in which the pixel value of the reconstructed video signal 61 can lie is:

−N×Q to D+N×Q

When the pixel value of the reconstructed video signal 61 has exceeded the range, it will be determined to be erroneous. In that case, for example, the reconstructed video signal 61 should be obtained by the prediction error signal 55 being made 0 in the inter-frame prediction mode (motion compensation prediction mode) and part of the DCT coefficients inputted to the inverse DCT circuit 54 being made 0 in the intraframe prediction mode, or the reconstructed video signal should be estimated from the pixel values of the surrounding blocks of the reconstructed video signal 61.

As described above, with the present invention, by adding the determination of whether the decoded information or signal is information or a signal impossible to appear in the encoding to the error detection at the error detecting circuit 60 in the video decoding apparatus, a more accurate error detection can be made. This helps prevent the deterioration of quality of the reconstructed image which could take place as a result of using the erroneous information or signal directly for the reconstruction of video signals without correcting the erroneous information or signal by an error process.

The present invention may be practiced or embodied in still other ways without departing from the spirit or essential character thereof. For example, while in the embodiment, the code strings outputted from the video coding apparatus are divided into two layers, they may be divided into three layers or more. For instance, the frame synchronizing code (PSC), picture header, and mode information may be allocated to the first layer, the DC component of the DCT coefficient information in the intra-frame prediction mode (intra DC) and the large-region motion vector information be allocated to the second layer, the small-region motion vector information be allocated to the third layer, and the DCT coefficient information other than the DCT coefficient information allocated to the other layer may be allocated to the fourth layer. The DCT coefficients may be further divided into several layers, such as the low-frequency band components and the high-frequency band components.

When fixed-length coding and the variable-length coding of the difference motion vector information are used for the coding of the motion vector information as described earlier, the fixed-length coding which would have no adverse effect on the subsequent code strings due to synchronization failure is used in coding the large-region motion vector information, and placed first in each frame or specific region unit, followed by variable-length coded motion vector information. By doing this, even if an error in the variable-length coded section has caused a synchronization failure, the error will have no adverse effect on the fixed-length coded motion vector information. This makes it possible to estimate the motion vector in which an error has occurred from the fixed-length coded motion vector information and produce a prediction signal with low accuracy, so that the deterioration of picture quality of the reconstructed image due to an error can be reduced.

The method of determining whether the information reconstructed at the video decoding apparatus of FIG. 4 is information impossible to appear in coding motion pictures is applied to not only the layered code strings, but also a video decoding apparatus that decodes the original picture signal from the code strings obtained from an ordinary video coding apparatus.

A second embodiment of the present invention will be described with reference to FIG. 5. In this embodiment, because motion compensation adaptive prediction and discrete cosine transform coding are basically the same as those in the above embodiment, an explanation of them will not be given.

Figure 5:
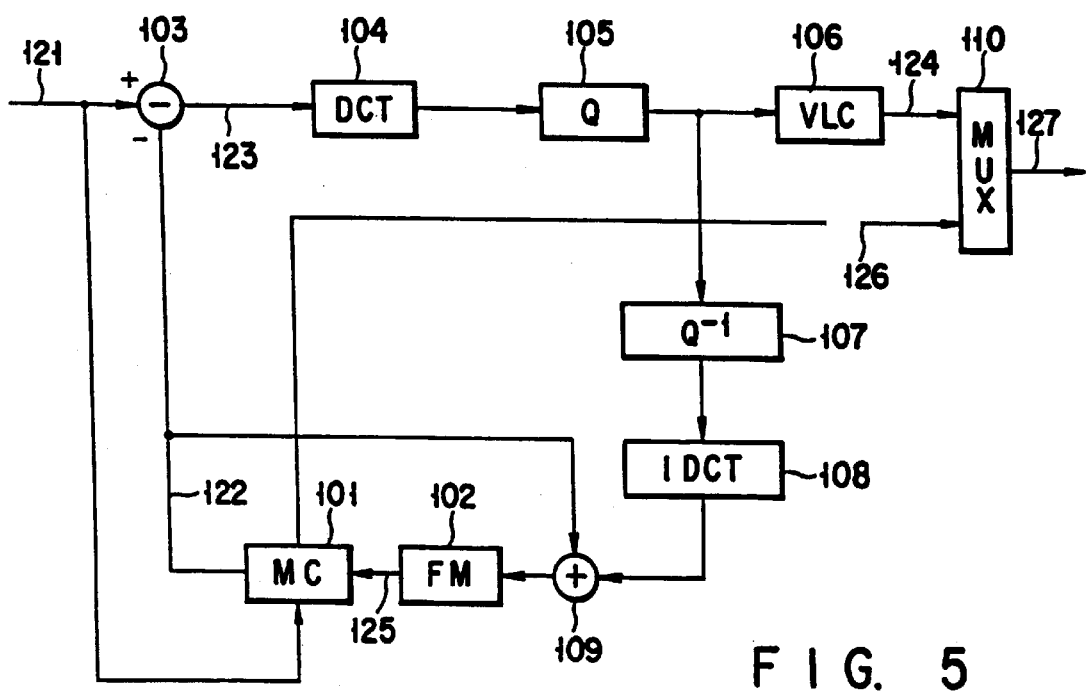
FIG. 5 is a block diagram of a video coding apparatus according to a second embodiment of the present invention.

In FIG. 5, an inputted video signal 121 is first used in prediction at a motion compensation adaptive prediction circuit 101. The motion compensation adaptive prediction circuit 101 senses the motion vector between a video signal 121 and a local decoded picture signal 125 of the local-decoded frame outputted from a frame memory 102 and produces a motion compensation prediction signal on the basis of the motion vector. The motion compensation adaptive prediction circuit 101 has a motion compensation prediction mode (interframe prediction mode) and an intra-frame prediction mode in which the video signal 101 is coded directly and selects the optimum one from these modes and outputs a prediction signal 122 corresponding to each mode. Namely, the motion compensation adaptive prediction circuit 101 outputs a motion compensation prediction signal in the motion compensation prediction mode and "0" in the intra-frame prediction mode as the prediction signal 122. The motion compensation adaptive prediction circuit 101 also outputs as motion information 126 the motion vector index indicating the vector quantized motion vector information used in motion compensation prediction.

A subtracter 103 produces a prediction error signal 123 by subtracting the prediction signal 122 from the video signal 121. A discrete cosine transform (DCT) circuit 104 subjects the prediction error signal 123 to discrete cosine transform in blocks of a fixed size and produces DCT coefficient information. The DCT coefficient information is quantized at a quantizer 105. Since in the intra-frame prediction mode, the prediction signal 122 is "0", the subtracter 103 outputs the video signal 121 directly as the prediction error signal 123.

The DCT coefficient information quantized at the quantizer 105 is branched into two pieces of information; one piece of information is subjected to variable-length coding at a variable-length encoder 106 and the other piece of information is subjected to inverse quantization at an inverse quantizer 107. The output of the inverse quantizer 107 undergoes inverse discrete cosine transform at an inverse discrete cosine transform (inverse DCT) circuit 108. That is, the inverse quantizer 107 and inverse DCT circuit 108 carry out the processing opposite to that in the quantizer 105 and DCT circuit 104 and the inverse DCT circuit 108 produces a signal approximate to the prediction error signal 123 at the output. The output of the inverse DCT circuit 108 is added to the prediction signal 122 from the motion compensation adaptive prediction circuit 101 at an adder 109, which then produces a local decoded picture signal. The local decoded picture signal is stored in the frame memory 102.

The coded prediction error signal (the variable-length codes of DCT coefficient information) 124 outputted from the variable-length encoder 106 and the motion information (motion vector index) outputted from the motion compensation adaptive prediction circuit 101 are multiplexed at a multiplexer 110, which are outputted to a transmission channel/storage medium (not shown) as an output code string 127.

Next, the motion compensation adaptive prediction circuit 101, a characteristic portion of the present invention, will be explained. The motion compensation adaptive prediction circuit 101 obtains a motion vector by vector quantization and performs motion compensation prediction using the vector-quantized motion vector.

The motion compensation adaptive prediction circuit 101 shown in FIG. 6 comprises a prediction circuit 201, an error calculator 202, a controller 203, and a code book 204. The code book 204 stores vector-quantized motion vector candidates in the form of code vectors.

The prediction circuit 201 generates a prediction signal 122 corresponding to the code vector 213 taken out from the code book 204 on the basis of the local coded picture signal 125 of the local-decoded frame from the frame memory of FIG. 5, that is, a signal obtained by performing the motion compensation prediction of the local decoded picture signal 125 using the motion vector corresponding to the code vector 213.

The error calculator 202 computes the magnitude of the difference (error) between the video signal 121 and the prediction signal 122 and generates an error level signal 211 indicating the magnitude. The magnitude of error may be determined by, for example, the absolute sum or the square sum of errors, or by the square error sum with the weighted low-frequency-band components.

The controller 203 gives a code book index 212 specifying a code vector to the code book 204 and thereby takes a code vector 213 minimizing the magnitude of the error given by the error level signal 211 out of the code book 204 and supplies it to the prediction circuit 201. The controller 203 converts the code book index 212 into a fixed-length code to produce a motion vector index and outputs it as motion information 126 to the multiplexer 110 of FIG. 5.

Next, a video decoding apparatus in the present embodiment will be explained. FIG. 7 is a block diagram of a first video decoding apparatus corresponding to the video coding apparatus of FIG. 5.

In FIG. 7, the output bit stream 127 sent from the video coding apparatus of FIG. 5 is transmitted over a transmission channel or stored in a storage medium and becomes an input bit stream 321. The input code string is supplied to a demultiplexer 310, which separates the string into a coded prediction error signal (a variable-length code of quantized DCT coefficient information) 322 and motion information (motion vector index) 323. A variable-length decoder 306, an inverse quantizer 307, and an inverse DCT circuit 308 subject the coded prediction error signal 322 to the processes opposite to those at the variable-length encoder 106, quantizer 105, and DCT circuit 104 of FIG. 1, and produce a prediction error signal 324.

An adder 309 adds the prediction error signal 324 to the prediction signal 326 from the motion compensation adaptive prediction circuit 301 and produces a reconstructed video signal 327. The reconstructed video signal 327 is outputted outside the video decoding apparatus and stored in a frame memory 302.

The motion information 323 is inputted to the motion compensation adaptive prediction circuit 301. The motion compensation adaptive prediction circuit 301 performs motion compensation prediction using the motion information 323, on the basis of the reconstructed video signal 325 of the preceding frame outputted from the frame memory 302 and outputs a prediction signal 326.

Figure 8:
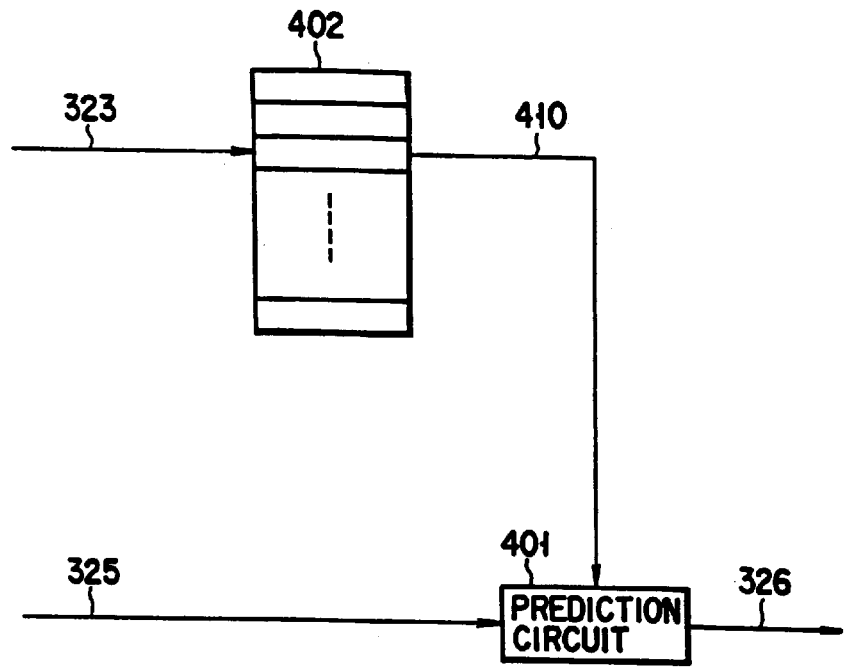
FIG. 8 is a block diagram of a motion compensation adaptive prediction circuit in the video decoding apparatus of FIG. 7.

FIG. 8 is a block diagram of the motion compensation adaptive prediction circuit 301 of FIG. 7, which contains a prediction section 401 and a code book 402. The code book 402 has the same structure as the code book 204 of FIG. 6 and stores vector-quantized motion vector candidates in the form of code vectors. From the code book 402, a code vector 410 corresponding to the motion information (motion vector index) 323, that is, the vector-quantized motion information, is taken.

The prediction section 401 creates a prediction signal 326 corresponding to the code vector 410 from the code book 402 on the basis of the reconstructed video signal of the coded frame shown in FIG. 7, that is, a signal obtained by performing the motion compensation prediction of the reconstructed video signal 325 of the coded frame, using the motion vector corresponding to the code vector 410.

As described above, the video coding/decoding apparatus according to the second embodiment performs motion compensation prediction using the vector-quantized motion information. Namely, because the motion information 126 can be expressed by a code book index specifying a code vector in the code book 204, it is possible to perform efficient motion compensation prediction while suppressing the amount of the motion information.

Furthermore, such vector-quantized motion information has a smaller bias in the occurrence than non-quantized motion vector information, so that the fixed-length coding of the vector-quantized motion information at the controller 203 as explained above enables the motion information to be coded with a relatively high coding efficiency. Use of fixed-length coding eliminates the problem that an error spreads over a wide range due to synchronization failure as found in variable-length coding when an error has been introduced at a transmission line or storage media.

Accordingly, with the present embodiment, it is possible to achieve excellent error resilience while maintaining high coding efficiency.

Figure 9:
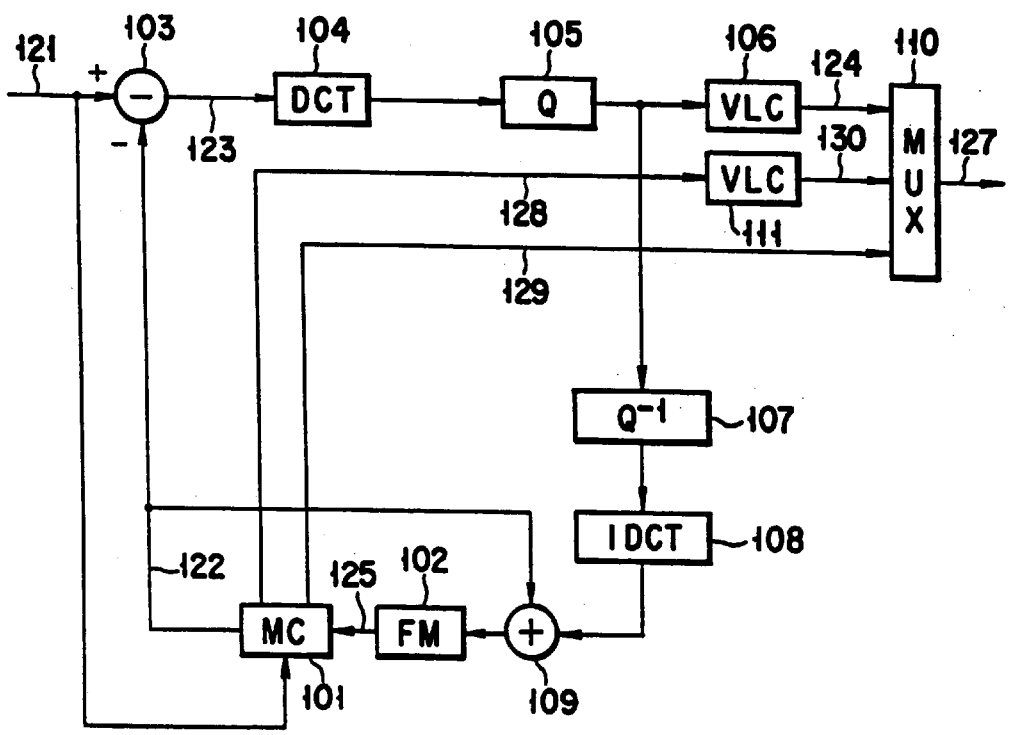
FIG. 9 is a block diagram of a video coding apparatus according to a third embodiment of the present invention.

FIG. 9 shows a video coding apparatus according to a third embodiment of the present invention. The same parts as those in FIG. 5 are indicated by the same reference symbols and an explanation will be centered on the difference from the second embodiment. The third embodiment differs from the second embodiment in the configuration of the motion compensation adaptive prediction circuit 101. Specifically, in the third embodiment, another variable-length encoder 111 is added.

In the motion compensation adaptive prediction circuit 101 of the present embodiment, motion vectors are divided into two levels, large-region representative motion vectors indicating motion in large regions and small-region motion vectors indicating motion in small regions obtained by subdividing the large regions, and searching is effected at these two levels. The large-region representative motion vectors are searched for by a widely used conventional method, such as the block matching method. The obtained motion vector information is subjected to variable-length coding and the resulting information is outputted. On the other hand, for the small-region motion vectors, the difference motion vectors obtained on the basis of the difference between the large-region representative motion vectors and the small-region motion vectors are coded by vector quantization.

The reason why motion compensation prediction is effected in a hierarchical fashion is that since the difference motion vectors based on the difference between the large-region representative motion vectors and the small-region motion vectors are generally distributed in the vicinity of difference=0 with a high probability, as compared with the motion vectors for which the difference has not been calculated, vector quantization is effected at a high coding efficiency. By combining such large-region representative motion vectors and the vector quantization of the difference motion vectors based on the difference between the large-region representative motion vectors and the small-region motion vectors, it is possible to achieve higher error resilience while maintaining almost the same coding efficiency as that of a conventional coding method that subjects all of the motion vector information to variable-length coding.

Figure 10:
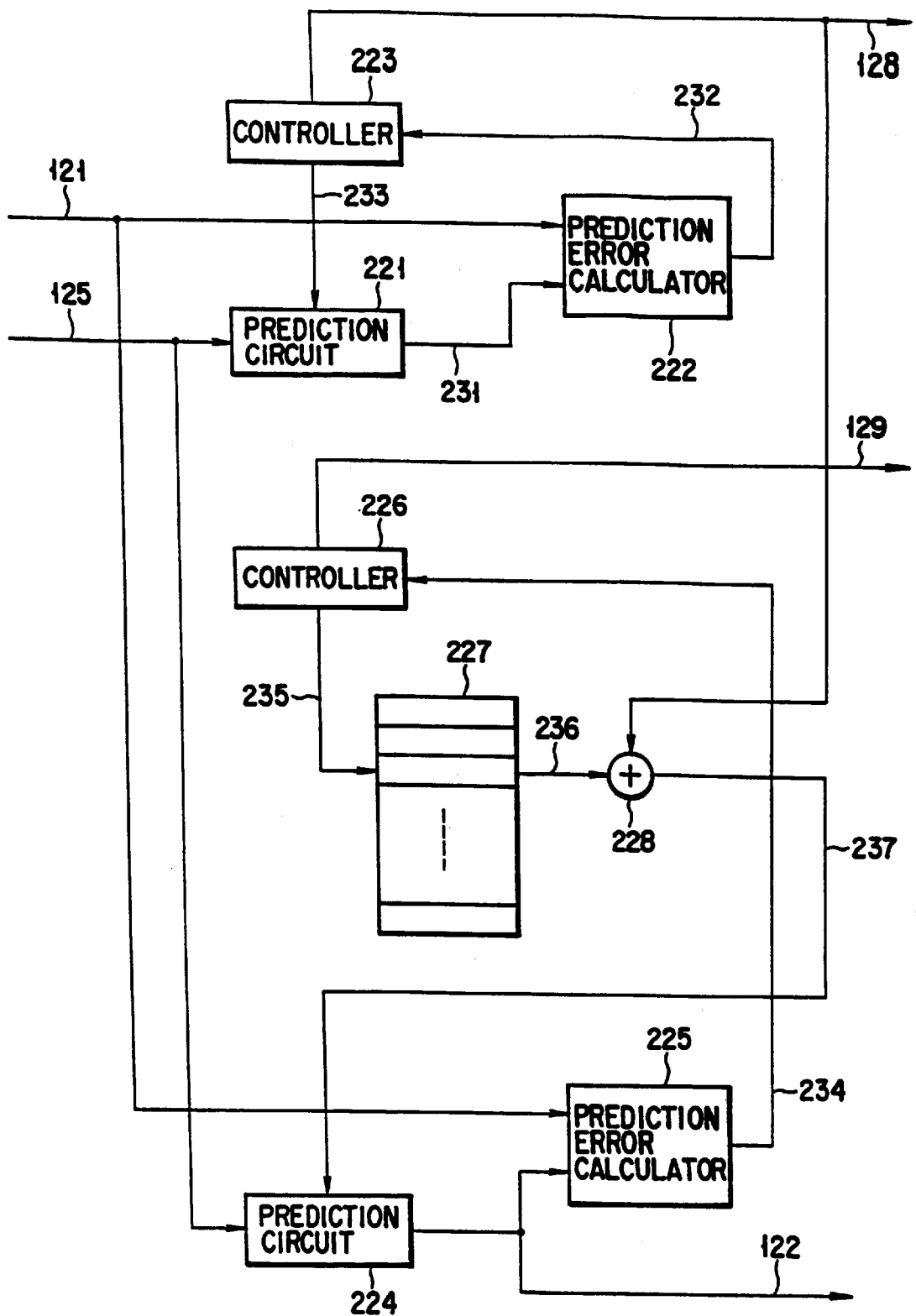
FIG. 10 is a block diagram of a motion compensation adaptive prediction circuit in the video coding apparatus of the third embodiment.

FIG. 10 is a block diagram of the motion compensation adaptive prediction circuit 101 of the present embodiment. The motion compensation adaptive prediction circuit comprises a first prediction circuit 221, a first error calculator 222, a first controller 223, a second prediction circuit 224, a second error calculator 225, a second controller 226, a code book 227, and an adder 228. The first prediction circuit 221, first error calculator 222, and first controller 223 are provided for motion compensation prediction using large-region representative motion vectors.

On the other hand, the second prediction circuit 224, second error calculator 225, and second controller 226, code book 227, and adder 228 are provided for motion compensation prediction using the motion vectors obtained by the vector quantization of the difference motion vectors based on the difference between the large-region representative motion vectors and the small-region motion vectors. The code book 227 stores the candidates of the difference motion vectors based on the difference large-region motion vectors and the small-region motion vectors in the form of code vectors.

Figures 11A, 11B:
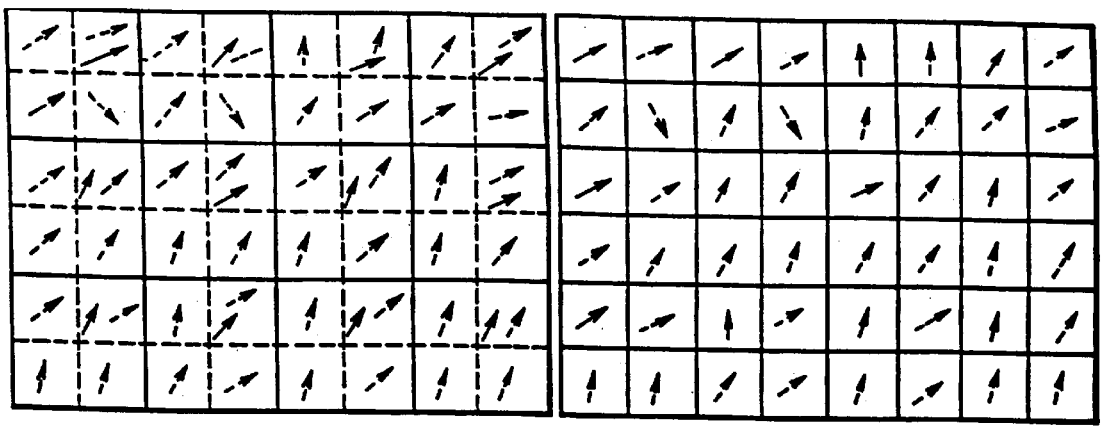
FIGS. 11A and 11B are diagrams to help explain the operation of the motion compensation adaptive prediction circuit of FIG. 10.

FIG. 11A is a drawing to help explain the operation of motion compensation prediction in a frame in the third embodiment. First, the inside of the frame is divided into large regions indicated by solid lines and the large-region representative motion vectors shown by the solid-line arrows are obtained using the block matching method. Specifically, the first controller 223 generates first motion vectors 233 one after another, each being shifted one pixel from each other, in the horizontal and vertical directions in a specific range (e.g., in the range of ±15 pixels in the horizontal and vertical directions). The first prediction circuit 221 generates a first prediction signal 231 corresponding to the first motion vector 233 on the basis of the local decoded picture signal from the frame memory 102 of FIG. 9. Then, the first error calculator 222 computes the magnitude of the difference (error) between the input picture signal 121 in a large region and the first prediction signal and generates an error level signal 232 indicating the magnitude. The magnitude of error may be determined by, for example, the absolute sum or the square sum of errors, or by the square error sum with the weighted low-frequency-band components.

The first controller 223 obtains a large-region representative motion vector 128 for which the magnitude of the error given by the error level signal 232 becomes minimal and outputs it. The variable-length encoder 111 of FIG. 9 calculates the difference between the large-region representative motion vector 128 and the adjacent large-region representative motion vectors and subjects the difference to variable-length coding.

Then, the small-region motion vectors indicated by the broken-line arrows in the small regions shown by broken lines in FIG. 11A obtained by subdividing the large regions are calculated by vector quantization as the difference from the large-region representative motion vectors. Since the purpose of the vector quantization is to effect motion compensation prediction most efficiently, the selection of a difference motion vector from the code book 227 is performed on the basis of the magnitude of an error in motion compensation prediction, not on the basis of a direct square error sum of the input vectors and the code vectors as generally implemented in vector quantization. Hereinafter, the operation will be explained.

The code book 227 stores the candidates of the difference motion vectors based on the large-region representative motion vectors and the small-region motion vectors in the form of code vectors. The second controller 226 changes code book indexes 235 one after another and takes a difference motion vector 236 corresponding to the code book index 235 out of the code book 227. The adder 228 adds the large-region representative motion vector 128 to the difference motion vector 236 to obtain a small-region motion vector candidate 237. The second prediction circuit 224 obtains a prediction signal 122 corresponding to the small-region motion vector candidate 237 on the basis of the local decoded picture signal 125 from the frame memory 102 of FIG. 9. Furthermore, the second error calculator 225 computes the magnitude of the difference (error) between the video signal 121 and the prediction signal 122 and outputs an error level signal 234 indicating the magnitude.

The second controller 226 obtains as a small-region motion vector index a code book index for which the magnitude of the error given by the error level signal 234 becomes minimal, subjects the small-region motion vector index to fixed-length coding to produce a small-region motion vector 129, and outputs a prediction signal corresponding to the small-region motion vector.

In FIG. 9, the coded prediction error signal 124 from the variable-length encoder 106, the coded large-region motion vector 130 from the variable-length encoder 111, and the coded small-region motion vector 129 from the motion compensation adaptive prediction circuit 101 are multiplexed at the multiplexer 110 and the resulting code string is sent to the transmission channel/storage medium (not shown) as an output bit stream 127.

The multiplexer 110 arranges the motion vectors in a hierarchical fashion according to importance corresponding to the degree of the picture quality deterioration of the decoded picture signal due to an error in transmission/storage and carries out different levels of error protection. A method of changing levels of error protection is, for example, to use a different error correcting/detecting code for each layer and carry out error protection in a manner that uses a stronger correcting/detecting capability for an upper-layer of greater importance. When transmission and storage can be performed via transmission channels/storage mediums having different error rates, an upper-layer with greater importance is transmitted and stored via a transmission/storage medium having a lower error rate to make an error less liable to occur in the upper-layer code string. The coding mode and quantizing step size whose error has the most significant effect are allocated to the upper layer of the highest level and the intra-frame-coded low-frequency components are allocated to the upper layer of the second highest level.

Since an error in the large-region representative motion vector 128 has an adverse effect on a wide range, it is allocated to the upper layer of the third highest level. When the variable-length encoder 111 subjects the large-region representative motion vector 128 to variable-length coding by calculating the difference between the large-region representative motion vector and the adjacent large-region representative motion vectors, it is desirable that strong protection against errors should be provided, because a synchronization failure of a variable-length code may permit an error to spread over the entire screen.

Because the vector-quantized small-region motion vector 129 has the index fixed-length coded, is has a higher error resilience than the variable-length coded large-region representative motion vector 130. As will be described later, it is possible to rearrange the indexes or learn the code book so that the magnitude of error may be minimized. Therefore, it is assumed that the small-region motion vector indexes are allocated to lower-layer of a lower level than the representative motion vectors.

The error signals whose loss would cause a minor deterioration of picture quality or the high-frequency band components in intra-frame coding are allocated to the lower layer of the lowest level. This layer may be added with only an error detecting code used in error detecting, such as CRC, or a parity check bit. Furthermore, the layer may be further divided into sublayers according to orthogonal transform sequence, such as the relatively important low-frequency-band components and the less important high-frequency-band components in terms of the subjective quality of reconstructed image.

When the types of transmission channel/storage medium having different error rates have been determined to be, for example, two layers or three layers, when the ratio of the amount of codes in each layer to the total amount of codes is restricted to a specific range, when not so many types of error correction and detecting codes can be used because of the limit of hardware, what type of code word should be used in which layer may be determined suitably. For example, the number of layers is two and there is a limit to the amount of codes in the upper layer, the most important mode information, the low-frequency-band components in intra-frame coding, and the representative motion vectors are coded in the upper layer. The vector-quantized small-region difference motion vectors, the high-frequency-band components in intra-frame coding, and the prediction error signal are coded in the upper layer when there is room in the amount of codes in the upper layer, and are coded in the lower layer when there is no room in the amount of codes in the upper layer. In that case, since the difference motion vectors are more important, they are coded in the upper layer in preference to the others.

While in the example of FIG. 11A, a single large region is subdivided into four small regions, control of the size of a large region and the rate of subdivision into small regions enables much finer control for the amount of information.

Figure 12:
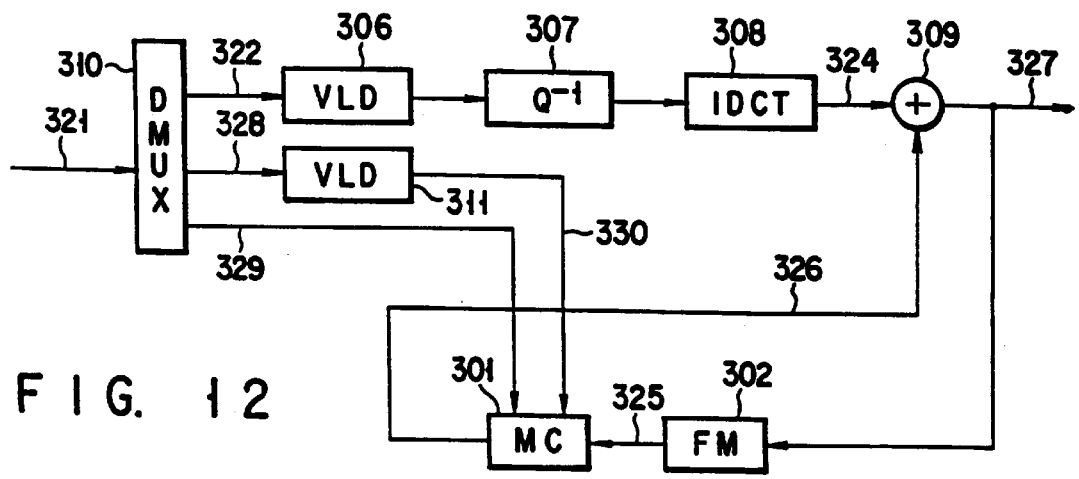
FIG. 12 is a block diagram of a video decoding apparatus corresponding to the video coding apparatus of the third embodiment of the invention.

Next, a video decoding apparatus in the present embodiment will be explained. FIG. 12 is a block diagram of a second video decoding apparatus corresponding to the video coding apparatus in the third embodiment of FIG. 9.

In FIG. 12, the output bit stream 127 sent from the video coding apparatus of FIG. 9 is transmitted over a transmission channel or stored in a storage medium and becomes an input bit stream 321. The input code string is supplied to a demultiplexer 310, which separates the string into a coded prediction error signal (a variable-length code of quantized DCT coefficient information) 322, variable-length coded large-region representative motion vector 328, and fixed-length coded small-region motion vector 329. A variable-length decoder 306, an inverse quantizer 307, and an inverse DCT circuit 308 subject the coded prediction error signal 322 to the processes opposite to those at the variable-length encoder 106, quantizer 105, and DCT circuit 104 which are shown in FIG. 9, and produce a prediction error signal 324.

An adder 309 adds the prediction error signal 324 to the prediction signal 326 from the motion compensation adaptive prediction circuit 301 and produces a reconstructed video signal 327. The reconstructed video signal 327 is outputted outside the video decoding apparatus and stored in a frame memory 302.

On the other hand, the variable-length coded large-region representative motion vector 328 is decoded at the variable-length decoder 311. The decoded large-region representative motion vector 330, together with the small-region motion vector 329, is inputted to the motion compensation adaptive prediction circuit 301. The motion compensation adaptive prediction circuit 301 performs motion compensation prediction using the large-region representative motion vector 330 and small-region motion vector 329, on the basis of the reconstructed video signal 325 outputted from the frame memory 302 and outputs a prediction signal 326.

Figure 13:
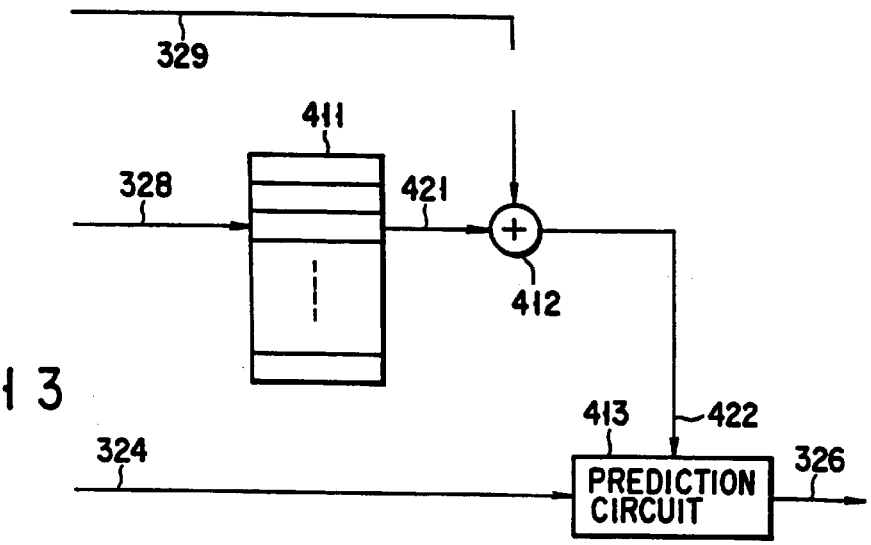
FIG. 13 is a block diagram of a motion compensation adaptive prediction circuit in the video decoding apparatus of FIG. 12.

FIG. 13 is a block diagram of the motion compensation adaptive prediction circuit 301 of FIG. 12, which contains a code book 411, an adder 412, and a prediction circuit 413. The code book 411 has the same structure as that of the code book 227 and stores candidates for vector-quantized difference motion vectors in the form of code vectors. The code book 411 outputs a difference motion vector 421, a code vector corresponding to the index of the small-region motion vector 328. The difference motion vector 421 is added to the large-region representative motion vector 329 at the adder 412 and thereby a small-region motion vector 422 is decoded. The prediction circuit 413 generates a prediction signal 326 corresponding to the small-region motion vector 422 from the adder 413 on the basis of the reconstructed video signal 325 of the coded frame from the frame memory 302 of FIG. 12.

A supplementary explanation about the present embodiment will be given. With the video decoding apparatus of FIG. 12, when an error has been detected in the input bit stream 321, decoding is done by a different process according to the type of code word into which an error has been introduced. For example, when an error has been detected in the coded prediction error signal 322, the prediction error signal 324 of the block is determined to be 0 and the prediction signal 326 obtained at the motion compensation adaptive prediction circuit 301 using the correctly decoded mode information and motion vector is used as a reconstructed video signal. When the prediction error signal is divided in a hierarchical fashion according to orthogonal transform sequence, it may be subjected to inverse orthogonal transform using only a lower-order sequence than the sequence in which an error has been introduced and the resulting signal may be used as an error signal.

On the other hand, since the small-region motion vector 329, a vector-quantized motion vector, has a high error resilience, even if an error is introduced into the vector, it will be processed in the same manner as when there is no error. When a lot of errors have been introduced in the small-region motion vector 329, the small-region motion vector containing errors will not be used to prevent a significant deterioration of picture quality and decoding is effected by using the representative motion vector in the region. Since the mode information and representative motion vector information are provided with great error protection, these information have less error probability. If an error should get mixed in, however, there is a possibility that the picture quality will deteriorate seriously. For the region of the code and the regions on which the error has an adverse effect due to synchronization failure, the reconstructed video signal 325 of the previous frame is used directly as the reconstructed video signal in those regions. When the correct motion vector has been decoded in the regions around the region in which an error has got mixed, the motion vector in the erroneous region may be estimated from the correctly decoded motion vector and the estimated motion vector may be used in decoding.

It is assumed that the code books 227 and 411 used for vector quantization of difference motion vectors have been learned by an LBG algorithm or an annealing method. The mean squared error of the input signal (in this case, the mean squared error of the difference motion vector) is generally used as a criterion in code book learning. Because the code books 227 and 411 used in the present embodiment are used in motion compensation prediction, it is desirable that learning should be done using the mean squared value or the absolute sum of prediction error as a criterion as described earlier.

Furthermore, learning may be done by a criterion that takes transmission errors in code words into account. In this case, although the performance of vector quantization decreases when there is no error, the quality of the reconstructed picture can be increased when an error has occurred.

Additionally, what is obtained by rearranging indexes after code book learning, taking error resilience into account, may be used as a code book. This equalizes the error sensitivity of each bit in the motion vector index code to prevent a large error from occurring when an error of a small number of bits, such as one bit, has occurred in an index code. Learning is performed so that an amount of increase of the motion compensation prediction error due to the injured motion vector index becomes the smallest. Of all of the combinations of motion vector code words and index code words, the one for which the increase amount is the smallest can be selected. When the code book is large, however, the number of combinations is very large, making the volume of calculations associated with learning enormous. Therefore, learning may be done using an annealing method. The volume of calculations can be reduced by taking the assumption that the number of error bits in a single code word is less than or equal to one.

The difference motion vectors may be vector-quantized for a group of small regions. For example, the different motion vectors in all of the small regions contained in a single large region may be vector-quantized in unison. This increases the coding efficiency more.

When the vector-quantized difference motion vector is coded, a flag may be added according to the frequency of appearance and another coding method may be used. For example, the difference motion vector has a high frequency of appearance of 0 and the probability that 0 will be selected from the code book as a horizontal and vertical difference motion vectors. A flag distinguishing this state from the others is provided. When 0 is selected as both of the horizontal and vertical difference motion vectors, only the flag is coded. In the other cases, a flag indicating that such is not the case is added and the further selected difference motion vector index is coded. By doing this, a difference of 0 occurring at a high frequency can be represented by a short code word, thereby improving the coding efficiency.

In the above embodiment, although neither the intra-frame prediction mode nor Not Coded mode in which the reconstructed video signal of the previous frame is used directly as the reconstructed video signal have been explained, it is possible to switch between Not Coded mode and the motion compensation prediction mode suitably. The mode switching may be effected on either a small-region or a large-region basis, or on a suitable basis different from these bases. When mode switching is effected on a small-region basis, the small-region motion vector need not be coded when the small region is intra-coding mode or Not Coded mode. In addition, when all of the small regions in a large region are intra-frame coding mode or Not Coded mode, the large-region motion vector need not be coded either. In the case where mode switching is done on a large-region basis, when the large region is intra-frame coding mode or Not Coded mode, neither is the representative motion vector nor the small-region motion vector need be coded.

While in the above embodiment, a motion compensation prediction is divided into large and small regions in a hierarchical fashion and the large-region typical vectors are subjected to variable-length coding and only the difference motion vectors in the small regions are vector-quantized, the large-region motion vectors, too, may be vector-quantized. Furthermore, a method of vector-quantizing all motion vectors without effecting hierarchical motion compensation prediction, as shown in the first embodiment, may be added and switching the vector quantizing methods may be done suitably according to the region.

When all motion vectors are vector-quantized as in the first embodiment, all pieces of motion vector information can be fixed-length coded, which makes error resilience much higher. In this case, the typical vectors may be first coded in the whole of a frame or in a group of regions and the difference between the representative vector and the motion vector in each region may be calculated and then vector-quantized. This increases the coding efficiency, as compared with when the motion vector is coded directly.

While in the above embodiment, the magnitude of the motion compensation prediction error is used as a criterion in selecting a difference motion vector from the code book 227 of FIG. 10, a motion vector may be obtained using a block matching method and a motion vector for which the difference from the obtained motion vector is the smallest may be selected from the code book.

Furthermore, while in the above embodiment, the large-region representative motion vector is obtained independently from the small-region motion vector as shown in FIG. 11A, a particular one of the small-region motion vectors may be used as a large-region representative motion vector as shown in FIG. 11B. By doing this, large-region representative motion vectors need not be coded and the amount of codes decreases further and the first prediction circuit 221, first error calculator 222, and first controller 223 are not required, making the configuration simpler.

With the present embodiment, motion compensation prediction is performed in a hierarchical fashion, for example, at levels of large and small regions. The prediction error signal at the lowest level is coded and the large-region representative motion vector, motion information used in motion compensation prediction at the highest level, is subjected to variable-length coding. At part or all of levels other than the highest level, the difference between the motion information at that level and the motion information at a higher level is used for coding. In this case, since the motion information used in multilevel motion compensation prediction usually has a strong correlation with motion information used in motion compensation prediction at a higher level, the occurrence for the difference motion information around 0 becomes high. Vector quantization of a signal with a large bias achieves a higher coding efficiency than when the signal is coded directly, so that a much higher coding efficiency can be accomplished by computing the difference from motion information at higher levels and vector-quantizing the difference.

Specifically, since motion information differs from picture to picture, if motion information is vector-quantized without obtaining the difference as in the first embodiment, more code vectors stored in code books will be needed and therefore more code books will be required. As described in the present embodiment, however, by obtaining the difference and vector-quantizing it, the motion information can be expressed in a smaller number of code vectors, which reduces the amount of codes needed for motion information.

Furthermore, since motion compensation prediction is performed in a multilevel manner, when it is combined with hierarchical coding, it becomes easier to control the allocation for the amount of codes to each layer by controlling the way of allocating motion information at each level to a layer. This enables the situation to be dealt with, even if the limits of the transmission channel imposes restrictions on the proportion of the amount of codes in each layer. Because the vector-quantized motion information has high error resilience, even if it is coded in a lower layer, a significant deterioration of picture quality is less liable to take place in the reconstructed picture at the decoding apparatus, assuring high error resilience.

Figure 14:
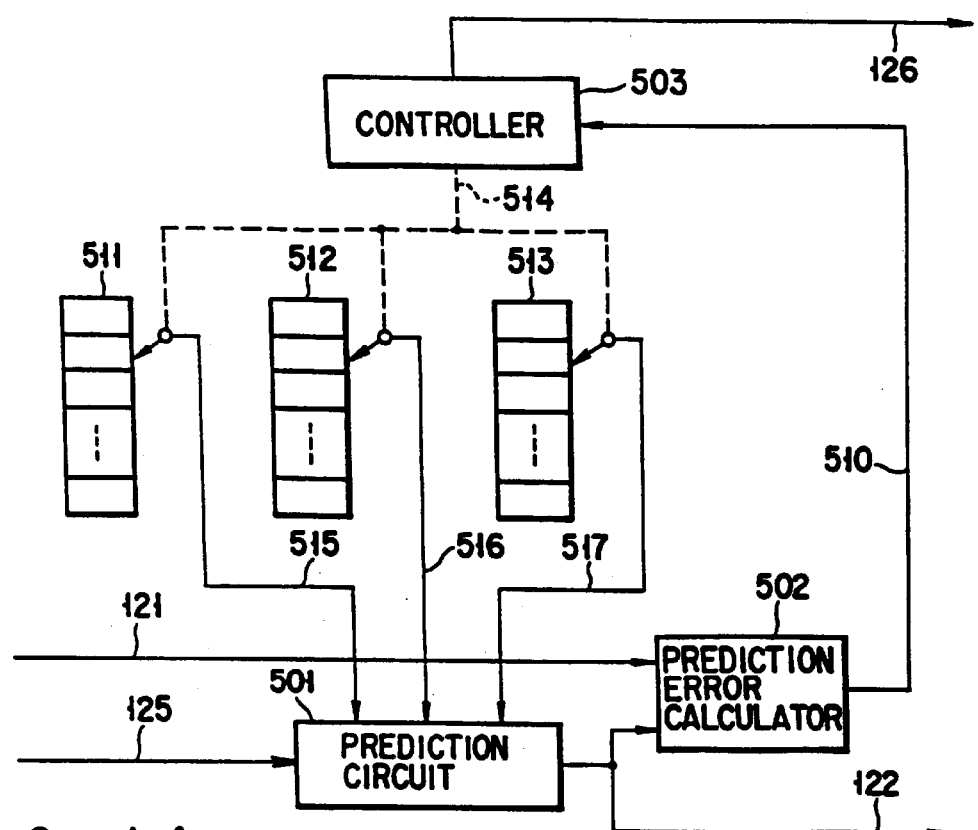
FIG. 14 is a block diagram of a motion compensation adaptive prediction circuit in a video coding apparatus according to a fourth embodiment of the present invention.

FIG. 14 is a block diagram of the motion compensation adaptive prediction circuit 101 in the video coding apparatus of a fourth embodiment according to the present invention. The entire configuration of the video coding apparatus of the fourth embodiment is the same as that of the video coding apparatus of the first embodiment of FIG. 5. The motion compensation adaptive prediction circuit 101 of the fourth embodiment divides the input video signal into a plurality of regions according to the contents of a picture and generates a prediction signal by performing the motion compensation prediction of the input video signal using the motion information obtained by combining the region shape information representing the division shape in the region with the motion vector in the region on a region basis and vector-quantizing the resulting information.

Figure 15:
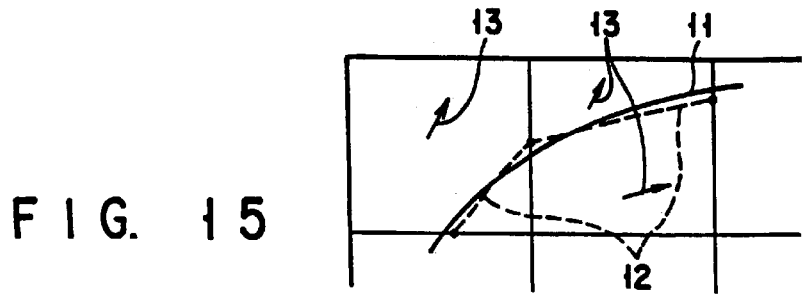
FIG. 15 is a diagram to help explain the operation of the motion compensation adaptive prediction circuit of FIG. 14.

FIG. 15 shows an example of region division. For example, a region division line 12 for linear approximation is selected so as to run along the boundary 11 of the object and a motion vector 13 is obtained in each of the divided regions. In this case, the region shape and motion vector 13 in each divided region for which a motion compensation prediction error is the smallest are selected from the code vectors previously stored in the code book.

The motion compensation adaptive prediction circuit 101 of FIG. 14 comprises a prediction circuit 501, an error calculator 502, a controller 503, and a first to third code books 511, 512, and 513. The first code book 511 stores candidates for the region shape in the form of code vectors. The second and third code books 512 and 513 store candidates for the motion vector in each of the two divided regions in the form of code vectors, respectively.

The controller 503 changes code book indexes 514 one after another. The region shape information 515 corresponding to the code book index 514 and motion vectors 516 and 517 are taken from the code books 511, 512, and 513, respectively. On the basis of a local decoded picture signal 125 from a frame memory 102 of FIG. 5, the prediction circuit 501 obtains a prediction signal 122 corresponding to the local decoded picture signal. The error calculator 502 computes the magnitude of the difference (error) between the input video signal 121 and the prediction signal 122 and outputs an error level signal 510 indicating the magnitude. The controller 503 obtains a code book index for which the magnitude of the difference given by the error level signal 510 is the smallest, subjects the index to fixed-length coding to produce motion information 126, and outputs the information and a prediction signal 122 corresponding to the information.

Figure 16:
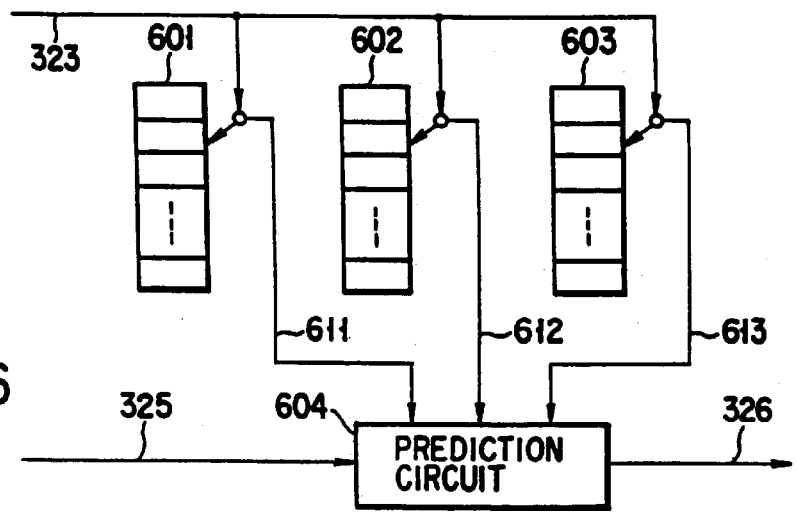
FIG. 16 is another block diagram of the motion compensation adaptive prediction circuit in the video coding apparatus of the fourth embodiment.

Next, a video decoding apparatus in the fourth embodiment will be described. FIG. 16 shows a configuration of a motion compensation adaptive prediction circuit 301 according to an embodiment of the video decoding apparatus of the fourth embodiment. The motion compensation adaptive prediction circuit corresponds to the motion compensation adaptive prediction 101 in the video coding apparatus of FIG. 14. The entire configuration of the video decoding apparatus of the fourth embodiment is the same as that of the video decoding apparatus of the second embodiment in FIG. 7.

The motion compensation adaptive prediction circuit 301 of FIG. 16 contains a first to third code books 601, 602, and 603, and a prediction circuit 604. Like the first to third code books 511, 512, and 513 of FIG. 14, the first code book 601 stores candidates for the region shape in the form of code vectors. The second and third code books 602 and 603 store candidates for the motion vector in each of the two divided regions in the form of code vectors, respectively.

The region shape information 611 corresponding to the code book index indicated by the motion information 323 and motion vectors 612 and 613 are taken from the code books 601, 602, and 603, respectively, and are supplied to the prediction circuit 604. The prediction circuit 604 generates a prediction signal 326 corresponding to the region shape information 611 and motion vectors 612 and 613 on the basis of the reconstructed video signal from the frame memory 102 of FIG. 3.

As described above, with the present embodiment, the video signal is divided into a plurality of regions according to the contents of the picture, that is, along the objects in the picture. For each divided region, motion compensation prediction is performed using the motion information obtained by combining the region shape information 515 with the motion vectors 516, 517 and vector-quantizing the resulting information. This makes it possible to divide the prediction region along the boundaries of the objects even in the portions where objects moving differently are in contact with each other and make a prediction using pieces of motion information differing from object to object. As a result, the efficiency of motion compensation prediction is improved and quality of reconstructed video signal is raised.

Furthermore, when region division prediction is carried out at the prediction circuit 501, motion compensation prediction is performed using the motion information obtained by combining the region shape information 515 with the motion vectors 516, 517 and vector-quantizing the resulting information. This enables the motion information 126 containing the region shape information to be expressed efficiently in a small amount of codes, which solves the problem that the amount of codes increases because of the region shape information, which has been the disadvantage of the conventional segmentation based compensation coding method.

Furthermore, because vector-quantized information can be subjected to fixed-length coding at a high coding efficiency, it is possible to prevent the deterioration of picture quality of the reconstructed picture due to synchronization failure caused by an error, which has been a problem with widely used conventional variable-length coding. This minimizes the deterioration of picture quality due to an error when the output code strings from the video coding apparatus are transmitted and stored via an error-prone medium.

Figure 17:
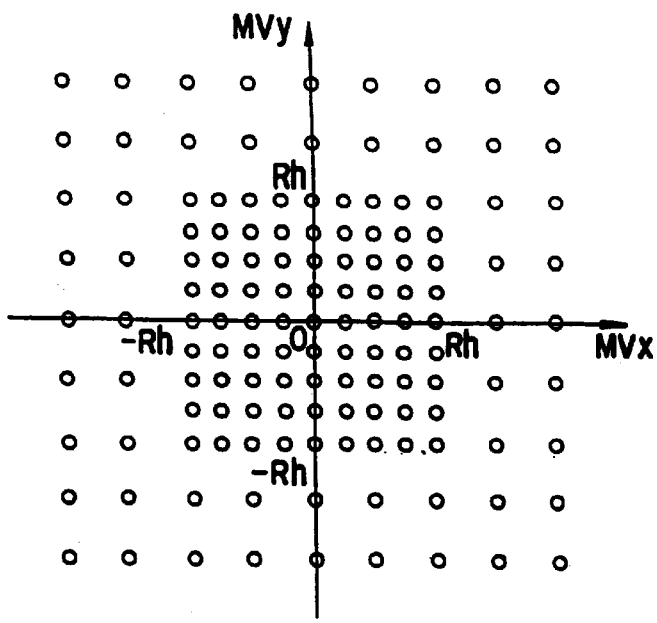
FIG. 17 illustrates an example of motion vector code vectors stored in a motion vector code book used in the video coding apparatus and video decoding apparatus in the second, third, or fourth embodiment.
Figure 18:
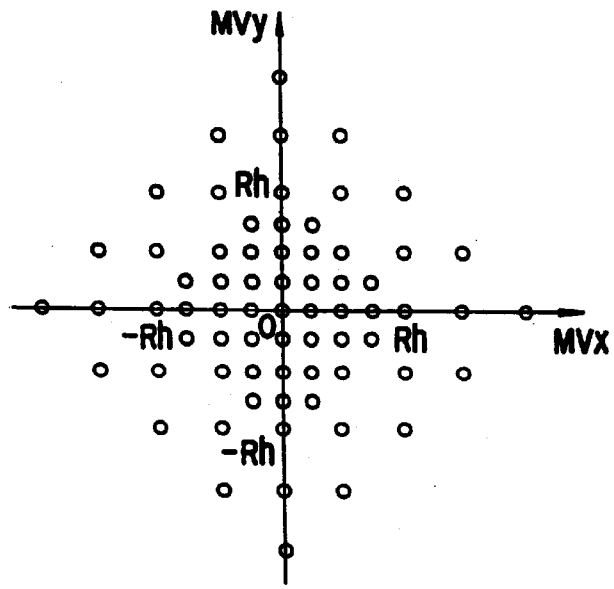
FIG. 18 illustrates another example of motion vector code vectors stored in a motion vector code book used in the video coding apparatus and video decoding apparatus in the second, third, or fourth embodiment.

In the present embodiment, a preferable structure of the code books used in the second to fourth embodiments will be explained. FIGS. 17 and 18 show examples of code vectors of candidates for motion vectors stored in the motion vector code books 204, 227, 512 and 513 in the video coding apparatuses in the second to fourth embodiments and in the motion vector code books 402, 411, 602 and 603 in the video decoding apparatuses in the second to fourth embodiments.

In FIGS. 17 and 18, the horizontal axis (MVx) and the vertical axis (MVy) indicate the horizontal component and vertical component of a motion vector, respectively. In the figure, a point marked with the symbol ○ is a code vector of a candidate for each motion vector. Hereinafter, a motion vector is expressed as (MVx, MVy) by pairing its horizontal component MVx with its vertical component MVy.

In the examples in FIGS. 17 and 18, motion vectors with small movement, or candidates for motion vectors near (0, 0) have many code vectors. In other words, candidates for motion vectors with small movement are arranged with fine pixel accuracy. Therefore, candidates for motion vectors with small movement are searched for with fine pixel accuracy. Motion vectors with large movement, or candidates for motion vectors far away from (0, 0), are arranged with less fine pixel accuracy than the candidates for motion vectors with small movement and are searched for with less fine pixel accuracy. The reason why more code vectors are provided for candidates for motion vectors with smaller movement is that motion vectors with small movement have a high frequency of appearance and search with finer pixel accuracy helps reduce the motion compensation error signal, improving the coding accuracy, whereas motion vectors with large movement have a low frequency of appearance and do not have a great effect on the reduction of the motion compensation error signal. Therefore, searching accuracy is made low to some extent to reduce the number of code vectors and then decrease the number of codes related to the motion vector information, which helps improve the coding efficiency. For example, in the examples of FIGS. 17 and 18, motion vector searching is effected with ½ pixel accuracy in the following ranges, respectively:

$$-Rh \leq MVx \leq Rh, \quad -Rh \leq MVy \leq Rh \text{ and}$$

$$-Rh \leq MVx + MVy \leq Rh$$

In the other ranges, motion vector searching is done with an integer pixel accuracy.

In FIGS. 17 and 18, motion vector codes are arranged on the basis of a particular rule and the correspondence between motion vectors and code book indexes can be obtained by calculations. Hereinafter, a method of computing code book index allocations will be described.

Code book indexes are allocated to motion vector searching candidates spirally, starting at (0, 0) toward motion vectors with larger movement in sequence. In the example of FIG. 17, code index i is computed as follows:

$$\text{When } MVx = MVy = 0, \; i = 0 \tag{1}$$

$$\text{When } MVy = r, \; -r < MVx \leq r, \; r \leq Rh, \; i = 2r - 2x + Sh(r) \tag{2}$$

$$\text{When } MVx = -r, \; -r < MVy \leq r, \; r \leq Rh \; i = 6r - 2y + Sh(r) \tag{3}$$

$$\text{When } MVy = -r, \; -r \leq MVx < r, \; r \leq Rh \; i = 10r + 2x + Sh(r) \tag{4}$$

$$\text{When } MVx = r, \; -r \leq MVy < r, \; r \leq Rh \; i = 14r + 2y + Sh(r) \tag{5}$$

$$\text{When } MVy = r, \; -r < MVx \leq r, \; r > Rh \; i = r - x + Si(r) \tag{6}$$

$$\text{When } MVx = -r, \; -r < MVy \leq r, \; r > Rh \; i = 3r - y + Si(r) \tag{7}$$

$$\text{When } MVy = -r, \; -r \leq MVx < r, \; r > Rh \; i = 5r + x + Si(r) \tag{8}$$

$$\text{When } MVx = r, \; -r = MVy < r, \; r > Rh \; i = 7r + y + Si(r) \tag{9}$$

where Sh(r) and Si(r) are $$Sh(r) = \sum_{i=0}^{2r-1} (8i + 1) \tag{10}$$

-continued $$Sh(r) = \sum_{i=Rh+1}^{r-1} 8i + Sh(Rh+1/2) \quad (11)$$

In the example of FIG. 18, code book indexes are computed as follows:

MVx=MVy=0, i=0 (12)

When $MVx+MVy=r$, $0<MVx\leq r$, $0\leq MVy<r$, $r\leq Rh$, $i=2y+Sh(r)$ (13)

When $MVx+MVy+r$, $-r<MVx\leq 0$, $0<MVy\leq r$, $r\leq Rh$,
$i=2r-2x+Sh(r)$ (14)

When $MVx+MVy=r$, $-r\leq MVx<0$, $-r<MVy\leq 0$, $r\leq Rh$,
$i=4r-2y+Sh(r)$ (15)

When $MVx+MVy=r$, $0\leq MVx<r$, $-r\leq MVy<0$, $r\leq Rh$,
$i=6r+2x+Sh(r)$ (16)

When $MVx+MVy=r$, $0<<MVx\leq r$, $0\leq MVy<r$, $r>Rh$, $i=y+Si(r)$ (17)

When $MVx+MVy+r$, $-r<MVx\leq 0$, $0<MVy\leq r$, $r>Rh$,
$i=r-x+Si(r)$ (18)

When $MVx+MVy=r$, $-r\leq MVx<0$, $-r<MVy\leq 0$, $r>Rh$,
$i=2r-y+Si(r)$ (19)

When $MVx+MVy=r$, $0\leq MVx<r$, $-r\leq MVy<0$, $r>Rh$,
$i=3r+x+Si(r)$ (20)

where Sh(r) and Si(r) are:

$$Sh(r) = \sum_{i=0}^{2r-1} (4i+1) \quad (21)$$

$$Sh(r) = \sum_{i=Rh+1}^{r-1} 4i + Sh(Rh+1/2) \quad (22)$$

By finding the correspondence between motion vectors and code book indexes by calculations in coding and decoding, there is no need to prepare code books as tables in advance, making the storage capacity needed to store the code books.

Figure 19:
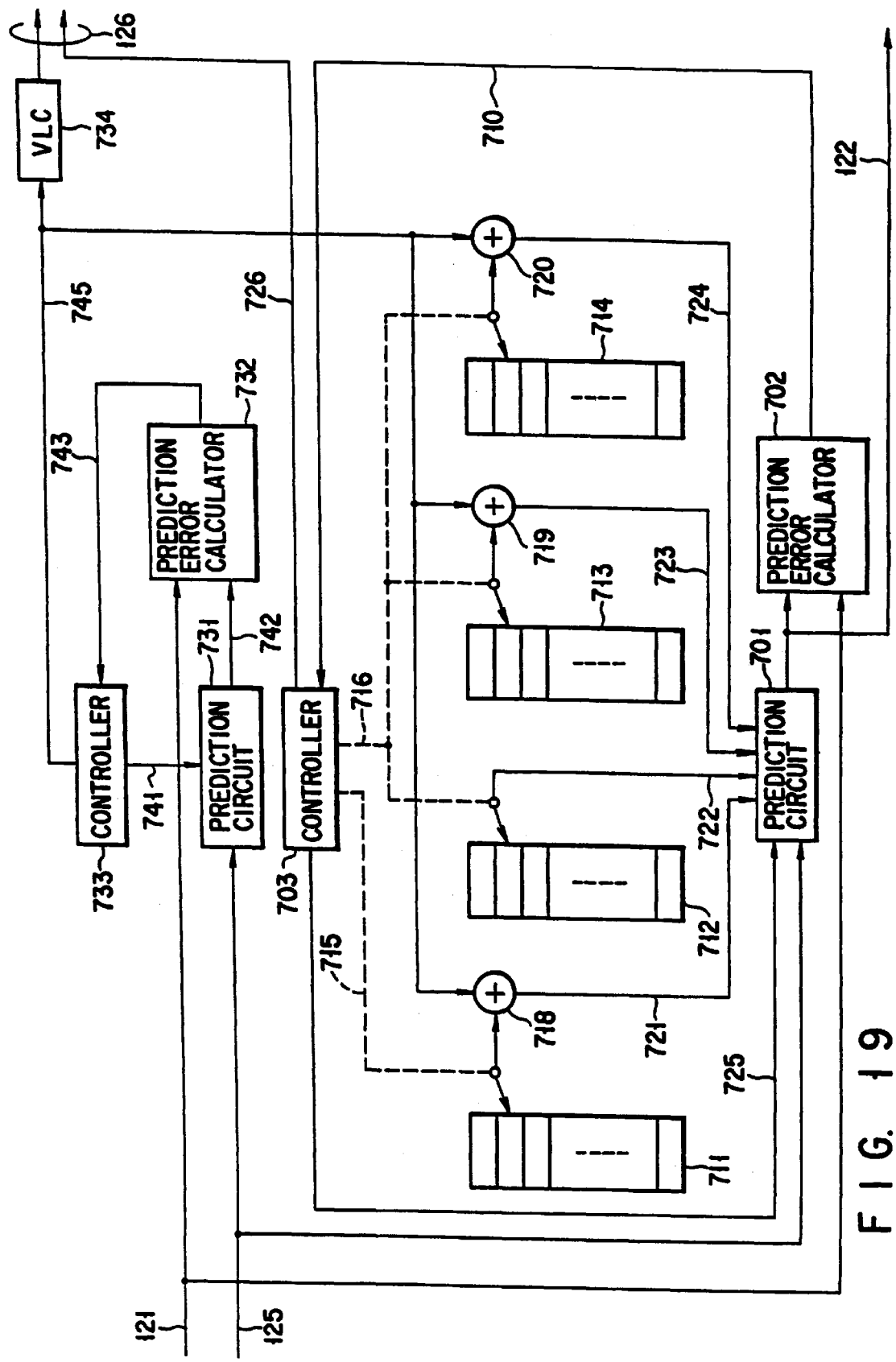
FIG. 19 is another block diagram of the motion compensation adaptive prediction circuit in the video decoding apparatus corresponding to the video coding apparatus according to the second embodiment of the invention.

FIG. 19 is another block diagram of the motion compensation adaptive prediction circuit 101 in the video coding apparatus of the second embodiment of the invention. the entire configuration of the video coding apparatus of the present embodiment is the same as that of the video coding apparatus of the second embodiment in FIG. 5. The motion compensation adaptive prediction circuit 101 of the present embodiment performs motion compensation prediction at two levels, large regions and small regions obtained by subdividing the large regions. It further divides part of small regions and performs the motion compensation prediction of them. Namely, the present embodiment is a combination of motion compensation prediction in the video coding apparatus of the third embodiment and motion compensation prediction in the video coding apparatus of the fourth embodiment.

The motion compensation adaptive prediction circuit 101 of FIG. 19 comprises a first prediction circuit 731, a first error calculator 732, a first controller 733, a second prediction circuit 701, a second error calculator 702, a second controller 703, code books 711, 712, 713, 714, adders 718, 719, 720, and a variable-length encoder 734. The first prediction circuit 731, first error calculator 732, and first controller 733 are provided for motion compensation prediction using large-region representative motion vectors.

On the other hand, the second prediction circuit 701, second error calculator 702, and second controller 703, code books 711, 712, 713, 714, and adders 718, 719, 720 are provided for motion compensation prediction using the motion vectors obtained by the vector quantization of the difference motion vectors based on the difference between the large-region representative motion vectors and the small-region motion vectors. The first code book 711 stores small-region motion vector candidates used in motion compensation prediction without region division (block-based motion compensation) in the form of code vectors. The second code book 712 stores candidates for region shape information in the form of code vectors. The third and fourth code books 713, 714 store candidates for the difference motion vectors based on large-region representative motion vectors and small-region motion vectors in the form of code vectors.

Figure 20:
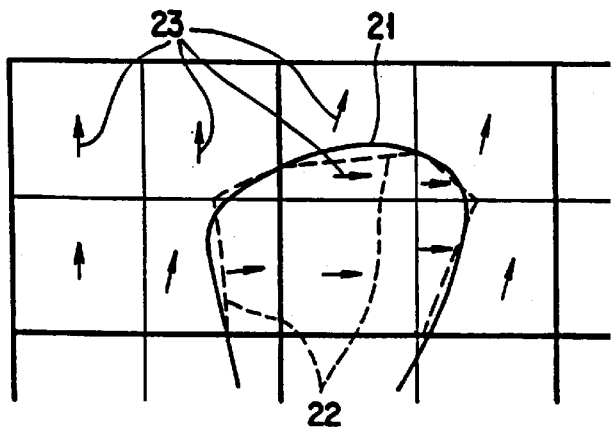
FIG. 20 is a diagram to help explain the operation of the motion compensation adaptive prediction circuit of FIG. 19.

FIG. 20 is a drawing to help explain the operation of motion compensation prediction in the present embodiment. First, the inside of the frame is divided into large regions shown by solid bold lines and the large-region representative motion vectors (not shown) are obtained using a block matching method. Specifically, the first controller 733 generates first motion vectors 741 one after another, each being shifted, for example, one pixel from each other, in the horizontal and vertical directions in a specific range (e.g., in the range of ±15 pixels in the horizontal and vertical directions). The first prediction circuit 731 generates a first prediction signal 742 corresponding to the first motion vector 741 on the basis of the local decoded picture signal 125 from the frame memory 102 of FIG. 5. Then, the first error calculator 732 computes the magnitude of the difference (error) between the input picture signal 121 in a large region and the first prediction signal 742 and generates an error level signal 743 indicating the magnitude. The magnitude of error may be determined by, for example, the absolute sum or the square sum of errors, or by the square error sum with the weighted low-frequency-band components.

The first controller 733 obtains a large-region representative motion vector 745 for which the magnitude of the error given by the error level signal 743 is the smallest and outputs it. The variable-length encoder 734 calculates the difference between the large-region representative motion vector 745 and the adjacent large-region representative motion vectors and subjects the difference to variable-length coding.

Then, motion compensation prediction is performed on the small regions indicated by fine solid lines in FIG. 20 obtained by subdividing a large region. Here, motion vectors are searched for by vector quantization in two cases, a case where small regions are subdivided and a case where small regions are not subdivided. The case that produces a smaller error is selected.

The code vectors, candidates for motion vectors used in motion compensation prediction without region division, are stored in the first code book 711 in the form of the difference from the code vector of the obtained large-region representative motion vector 745. The second controller 703 outputs to the second prediction circuit 701 a flag 725 indicating motion compensation prediction without region division, and changes code book indexes 715 sequentially to take the corresponding difference motion vectors out of the code book 711. The difference motion vectors are added to the large-region representative motion vector 745 at the adder 718 to produce a small-region motion vector candidate 721.

The second prediction circuit 701 obtains a prediction signal 122 corresponding to the small-region motion vector candidate 721 on the basis of the local decoded picture signal 125 of the previous frame from the frame memory 102 of FIG. 5. The second error calculator 702 computes the magnitude of the difference (error) between the input video signal 121 and the prediction signal 122 and outputs an error level signal 710 indicating the magnitude of the error. The second controller 703 obtains a code book index for which the magnitude of the error given by the error level signal 710 is the smallest.

On the other hand, the second code book 712 stores candidates for region shape in segmentation based compensation in the form of code vectors. The third and fourth code books 713 and 714 store code vectors, motion vector candidates in the two divided regions, in the form of the difference from the large-region representative motion vector 745. The second controller 703 outputs to the second prediction circuit 701 a flag 725 indicating region-division motion compensation prediction, and changes code book indexes 716 sequentially to take the region-division shape information 722 and difference motion vector corresponding to the code book index 716. The difference motion vectors taken out of the code books 713 and 714 are added to the large-region representative motion vector 745 at the adders 719 and 720 to produce motion vector candidates 723 and 724. These motion vector candidates 723, 724, together with the region shape information 721, are inputted to the second prediction circuit 701, which produces the corresponding prediction signal 122. The second error calculator 702 computes the magnitude of the difference (error) between the input video signal 121 and the prediction signal 122. The second controller 703 obtains a code book index for which the magnitude of the error given by the error level signal 710 is the smallest.

The second controller 703 selects the one for which the motion compensation prediction is the smallest from the motion compensation predictions with and without region division thus obtained, and outputs the code book index corresponding to the selected information. These selected information and code book index, together with the large-region representative motion vector variable-length coded at the variable-length encoder 734, are outputted as motion information 126.

Next, a video decoding apparatus in the present embodiment will be explained. FIG. 21 is a block diagram of the motion compensation adaptive prediction circuit 301 in the video decoding apparatus of the second embodiment of the invention. The motion compensation adaptive prediction circuit corresponds to the motion compensation adaptive prediction circuit 101 in the video coding apparatus of FIG. 19. The entire configuration of the video decoding apparatus according to the present embodiment is the same as that of the video decoding apparatus of FIG. 7.

The motion compensation adaptive prediction circuit 301 of FIG. 21 comprises a prediction circuit 800, a first to fourth code books 811, 812, 813, and 814, a decoder 825, and a variable-length decoder 827. Like the first to fourth code books 711, 712, 713, and 714 of FIG. 19, the first code book 811 stores small-region motion vector candidates used in motion compensation prediction without region division in the form of code vectors. The second code book 812 stores candidates for region shape information in the form of code vectors. The third and fourth code books 813, 814 store candidates for the difference motion vectors between large-region representative motion vectors and small-region motion vectors in the form of code vectors.

The variable-length decoder 827 decodes a large-region representative motion vector 828 from motion information 323. The decoder 825 decodes a flag 816 indicating which of region division and non-region division is used in small-region motion compensation prediction and code book indexes 815 and 816.

For a small region on which motion compensation prediction has been performed, the first code book 811 outputs the difference motion vector corresponding to the code book index 815. The difference motion vector is added to the large-region representative motion vector 828 at the first adder 818 to decode a small-region motion vector 821. The prediction circuit 800 produces a prediction signal 326 corresponding to the decoded vector.

For the small region on which segmentation based compensation prediction has been performed, the region shape information 822 is taken out of the second code book 812 in accordance with the code book index 816 and is supplied to the prediction circuit 800. Then, the difference motion vectors in the respective divided regions are taken out of the third and fourth code books 813 and 814. These difference motion vectors are added to the large-region representative motion vector 828 at the second and third adders 819 and 820, respectively, to decode small-region motion vectors 828, 824, which are supplied to the prediction circuit 800. The prediction circuit 800 creates a prediction signal 326 according to the region shape information 822 and two small-region motion vectors 823 and 824 and outputs it.

When errors are injected in transmitted or store video code strings, to suppress the deterioration of the reconstructed picture, the code strings may be arranged in a multilevel fashion according to importance corresponding to the degree of the deterioration of quality of the decoded picture due to errors, different error protection may be provided, and transmission and storage may be carried out via mediums having different error rates.

For example, in the multiplexer 110 of FIG. 5, the coding mode and quantizing step size whose errors have the most serious effect are allocated to the highest-level layer and the low-frequency-band components in intra-frame coding are allocated to the next highest-level layer. When motion compensation prediction is performed in a hierarchical fashion as with the motion compensation adaptive prediction circuit 101 of FIG. 19, errors in representative motion vectors have an adverse effect on a wide range, so that they are allocated to the third highest-level layer. Since the vector-quantized motion information has the index fixed-length coded and has high error resilience, it does not need so strong protection against errors. The prediction error signal whose loss due to an error would cause a little deterioration of picture quality and the high-frequency-band components in intra-frame coding are allocated to the lowest-level layer. This layer may be added with only an error detecting code, such as CRC, or a parity check bit. Furthermore, the layer may be further divided into sublayers according to orthogonal transform sequences, such as the relatively important low-frequency-band components and the less important high-frequency-band components.

When the types of transmission channel/storage medium having different error rates have been determined to be, for example, two layers or three layers, when the ratio of the amount of codes in each layer to the total amount of codes is restricted to a specific range, when not so many types of error correction and detecting codes can be used because of the limits of hardware, what type of information word should be used in which layer may be determined suitably. For example, the number of layers is two and there is a limit to the proportion of the amount of codes in the upper layer, the most important mode information, the low-frequencyband components in intra-frame coding, and the representative motion vectors are coded in the upper layer. The vector-quantized small-region difference motion vectors, the high-frequency-band components in intra-frame coding, and the prediction error signal are coded in the upper layer when there is room in the amount of codes in the upper layer, and are coded in the lower layers when there is no room in the amount of codes in the upper layers. In that case, since the motion vectors are more important, they are coded in the upper layer in preference to the others.

In the video decoding apparatus of FIG. 7, when an error has been detected in the input bit stream 321, it is desirable that decoding should be done by a different process according to the type of code word in which an error occurs. When an error has been detected in the prediction error signal, the prediction error signal of the block is determined to be 0 and the motion compensation prediction signal using the correctly decoded mode information and motion information is used as the reconstructed picture. When the prediction error signal has been made hierarchical according to orthogonal transform sequence, however, the signal may be subjected to inverse orthogonal transform using only a lower-order sequence than the sequence in which an error has got mixed. Since the vector-quantized motion information has high error resilience, even if an error occurs, it will be processed in the same manner as when there is no error. When a great many errors have got mixed in, the erroneous motion information will not be used to prevent a significant deterioration of picture quality and decoding is effected by using the representative motion vector in the region when motion compensation is performed in a hierarchical fashion, otherwise decoding is effected by estimating motion information in the region from the correctly decoded motion information in the surrounding regions. Since the mode information and representative motion vector information are provided with great error protection, the possibility that an error will occur is weak. If an error should occur, however, there is a possibility that the picture quality will deteriorate seriously. For the region of the code and the regions on which the error has an adverse effect due to synchronization failure, the local decoded picture of the previous frame is used directly as the decoded picture. When the correct motion vector has been decoded in the regions around the region in which an error has got mixed, the motion vector in the erroneous region may be estimated from the correctly decoded motion vector and the estimated motion vector may be used in decoding.

For the motion information, motion vectors in several regions may be vector-quantized in unison. For example, when motion compensation prediction is performed in a hierarchical fashion, the pieces of motion information on all small regions contained in a large region may be vector-quantized in unison. This increases the coding efficiency.

While in the fourth and sixth embodiments, the vector-quantized motion information undergoes fixed-length coding, it may be subjected to variable-length coding. This reduces error resilience, but increases coding efficiency.

In the fourth and sixth embodiments, although neither the intra-frame prediction mode nor the Not Coded mode in which the local decoded picture of the previous frame is used directly as the reconstructed picture have been explained, it is possible to switch between the motion compensation prediction mode and these modes suitably. When motion compensation prediction is effected in a hierarchical fashion, the mode switching may be effected on either a small-region or a large-region basis, or on a suitable basis different from these bases. When mode switching is effected on a small-region basis, the small-region motion information need not be coded when the small region is intra-frame coding mode or the Not Coded mode. In addition, when all of the small regions in a large region are intra-frame coding mode or Not Coded mode, the large-region motion vector need not be coded either. In the case where mode switching is done on a large-region basis, when the large region is in the intra-frame coding mode or the Not Coded mode, neither the large-region representative motion vector nor the small-region motion information need be coded.

FIG. 22 is a block diagram of a video coding apparatus according to a fifth embodiment of the present invention. The same parts as those in FIG. 5 are indicated by the same reference symbols. Explanation will be focused on what differs from the second embodiment. The fifth embodiment differs from the second embodiment in that the motion vector information outputted from a motion compensation adaptive prediction circuit 101 is coded at a vector encoder 131 and the coded motion vector information 136 is inputted to a multiplexer 110.

Next, the motion compensation adaptive prediction circuit 101 and motion vector encoder 131, a characteristic portion of the fifth embodiment, will be described.

Figure 23:
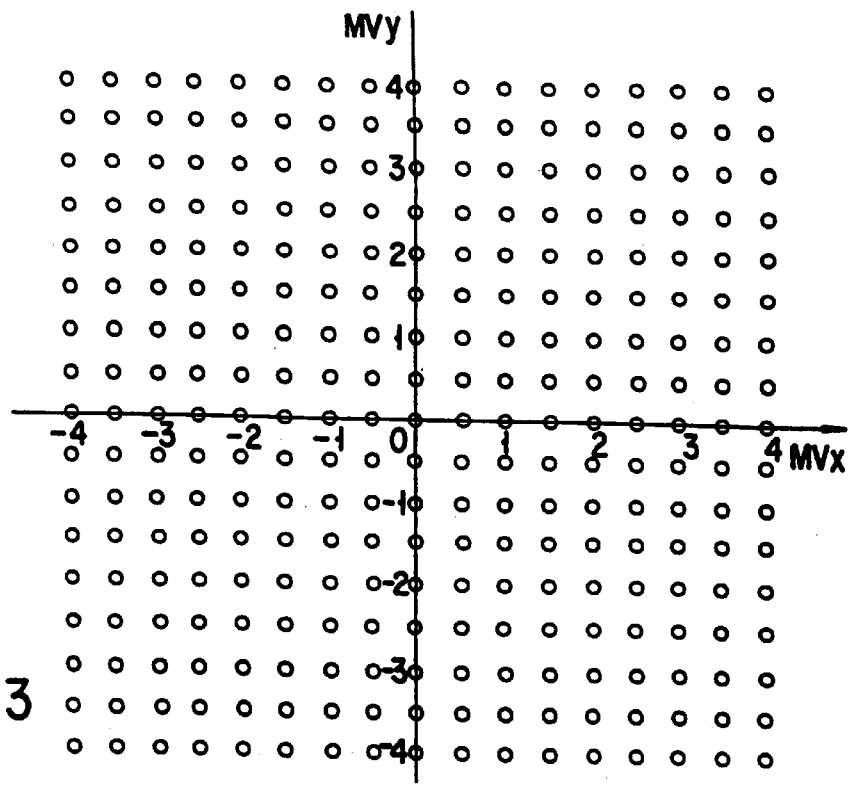
FIG. 23 shows an example of candidates for a motion vector to be searched for at the motion compensation adaptive prediction circuit of FIG. 22.

FIG. 23 shows an example of candidates for the motion vector to be searched for at the motion compensation adaptive prediction circuit 101. In FIG. 23, the horizontal axis (MVx) and the vertical axis (MVy) indicate the horizontal component and vertical component of a motion vector, respectively. In the figure, a point marked with the mark ○ is a candidate for the motion vector to be searched for. In the example of FIG. 23, motion vector candidates are arranged with ½ pixel accuracy in the horizontal and vertical directions. From these candidates, a motion vector for which the motion compensation prediction signal is the smallest is searched for. Hereinafter, a motion vector is expressed as (MVx, MVy) by pairing its horizontal component MVx with its vertical component MVy.

The motion vector information 126 thus obtained at the motion compensation adaptive prediction circuit 101 is coded at the motion vector encoder 131, which produces coded motion vector information 136. The code word constituting the coded motion vector information 136 is characterized by having the correlation with the Euclidean distance between motion vectors shown by the motion vector information 126 and the Hamming distance between code words corresponding to the Euclidean distance. In other words, a code word for the coded motion vector information 136 is determined so that the smaller the Euclidean distance between motion vectors forming a pair, the Hamming distance between code words corresponding to the pair of motion vectors may become smaller.

To realize this concretely, the motion vector encoder 131 is composed of an index generator that generates index information (hereinafter, referred to as a motion vector index) indicating the motion vector on the basis of the supplied motion vector information 126 and a code converter that converts the motion vector index into, for example, Gray code. In this case, motion vector indexes are allocated to motion vector searching candidates spirally, starting at (0, 0) toward motion vectors with larger movement in sequence. For the motion vector searching candidates marked with the symbol ○ of FIG. 23, motion vector index i is computed as follows:

When $MVx=MVy=0$, $i=0$ (23)

When $MVy=r, -r<MVx\leq r$ $i=2r-2x+S(r)$ (24)

When $MVx=-r, -r<MVy\leq r$ $i=6r-2y+S(r)$ (25)

When $MVy=-r, -r \leq MVx<r$ $i=10r+2x+S(r)$ (26)

When $MVx=r, -r \leq MVy<r$ $i=14r+2y+S(r)$ (27)

where S(r) is:

$$Sh(r) = \sum_{i=0}^{2r-1} (8i+1)$$ (28)

The motion vector encoder 131 performs code conversion on the motion vector indexes thus generated by calculation, using such code words as make the Hamming distance between code words whose indexes are close to each other. This can be achieved by, for example, using Gray code. Gray code can be generated by, for example, the method described in reference 2: Ysuhiko Okumura, "C Language Algorithm Dictionary," pp. 358–360. As shown in FIGS. 17 and 18, by arranging candidates for motion vectors with small movement with high pixel accuracy and candidates for motion vectors with large movement with low pixel accuracy, motion vectors with smaller movement may be searched for with higher pixel accuracy and motion vectors with larger movement may be searched for with lower pixel accuracy.

By coding the motion vector information at the motion vector encoder 131 as describe above, a higher error resilience can be achieved than in the prior art. Specifically, Gray code used in coding motion vector indexes has the nature of the difference between the decoded value at the time when a one-bit error has occurred and the correct value being N or less when the code word length is N (bits). Therefore, if an error is of one bit per code word or less, the probability that a significant error will occur will be lower than when motion vector indexes made up of normal binary codes are used as code words for the motion vector information. Incidentally, with normal binary codes, when the code length is determined to be N (bits) as described above, the difference between the decoded value at the time when a one-bit error has occurred and the correct value will be 2N−1 at maximum, with the result that a significant error is liable to take place.

The motion vector indexes are allocated in sequence, starting at (0, 0) toward motion vectors with larger movement. Therefore, if the difference between the correct index and the erroneous index is small, the motion vector will not make a substantial error.

Therefore, for errors of one bit per code word or less occurring on normal transmission channels or storage mediums, the probability that a significant error will occur in motion vectors is lower than in the prior art, with the result that the error resilience of the reconstructed picture is improved.

Figure 24:
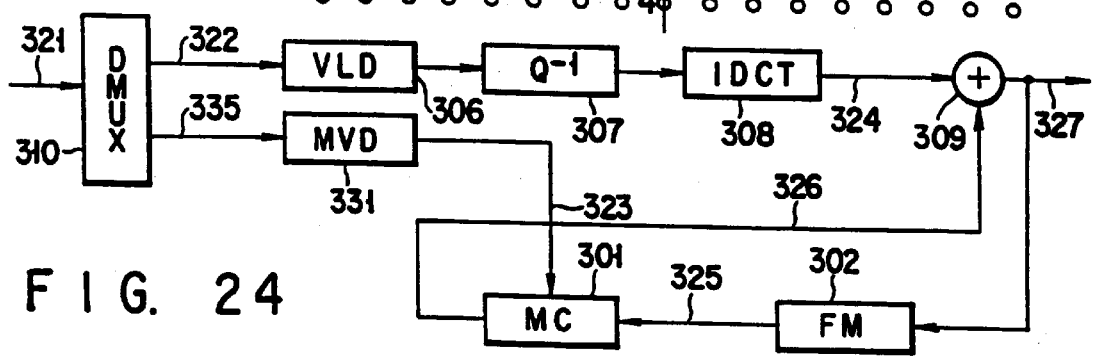
FIG. 24 is a block diagram of a video decoding apparatus corresponding to the video coding apparatus of the fifth embodiment.

FIG. 24 is a block diagram of a video decoding apparatus corresponding to the video coding apparatus of FIG. 22. In FIG. 24, the output bit stream 127 sent from the video coding apparatus of FIG. 22 is transmitted over a transmission channel and stored in a storage medium and becomes an input bit stream 321. The input code string is supplied to a demultiplexer 310, which separates the string into a coded prediction error signal (a variable-length code of quantized DCT coefficient information) 322 and coded motion vector information 335. A variable-length decoder 306, an inverse quantizer 307, and an inverse DCT circuit 308 subject the coded prediction error signal 322 to the processes opposite to those at the variable-length encoder 106, quantizer 105, and DCT circuit 104 of FIG. 22, and produce a prediction error signal 324. An adder 309 adds the prediction error signal 324 to the prediction signal 326 from the motion compensation adaptive prediction circuit 301 and produces a reconstructed video signal 327. The reconstructed video signal 327 is outputted outside the video decoding apparatus and stored in a frame memory 302.

On the other hand, the coded motion vector information 335 is supplied to the motion vector decoder 331, which decodes it in the reverse process of the motion vector encoder 131. The decoded motion vector information 323 is inputted to the motion compensation adaptive prediction circuit 301. The motion compensation adaptive prediction circuit 301 performs motion compensation prediction using the motion vector information 323 on the basis of the reconstructed picture 325 of the coded frame outputted from the frame memory 302 and outputs a prediction signal 326.

Figure 25:
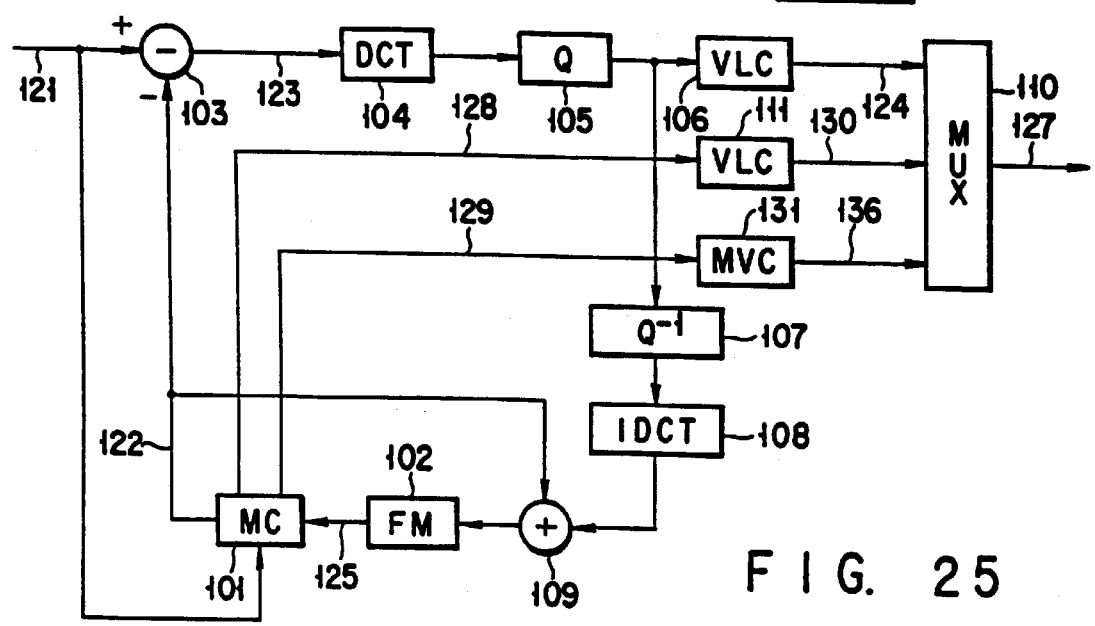
FIG. 25 is a block diagram of a video coding apparatus according to a sixth embodiment of the present invention.

FIG. 25 is a block diagram of a video coding apparatus according to a sixth embodiment of the present invention. The same parts as those in FIG. 22 are indicated by the same reference symbols. Explanation will be focused on what differs from the fifth embodiment. The sixth embodiment differs from the fifth embodiment in the configuration of the motion compensation adaptive prediction circuit 101 and motion vector encoder 131, as well as in that another variable-length encoder 111 is provided.

In the motion compensation adaptive prediction circuit 101 of the present embodiment, motion vectors are divided into two layers, one layer of large-region representative motion vectors indicating motion in large regions and the other layer of small-region motion vectors indicating motion in small regions obtained by subdividing the large regions, and searching is effected in these two layers. The large-region representative motion vectors are searched for by a widely used conventional method, such as a block matching method. The obtained motion vector information is subjected to variable-length coding at the variable-length encoder 111. On the other hand, for the small-region motion vectors, the difference motion vectors obtained on the basis of the difference between the large-region representative motion vectors and the small-region motion vectors are coded at the difference motion vector encoder 131.

FIG. 26 is a drawing to help explain the motion compensation prediction operation within a frame in the present embodiment. First, the inside of a frame is divided into large regions shown by thick solid lines and the large-region representative motion vectors shown by the solid-line arrows are obtained by a block matching method. Then, the small-region motion vectors shown by the broken-line arrows in small-regions indicated by broken lines in FIG. 26 obtained by subdividing the large regions, are determined in the form of the difference from the large-region representative motion vectors.

Searching candidates for difference motion vectors may be, for example, what are shown in FIGS. 17 and 18. Specifically, a large-region representative motion vector is added to difference motion vectors as shown in FIG. 17 or 18 and the results are determined to be searching candidates for the motion vector in the small region. From these, the one for which the motion compensation prediction is the smallest is searched for.

The reason why motion compensation prediction is performed in a hierarchical fashion is that the difference motion vectors based on the difference between large-region motion vectors and small-region motion vector are generally distributed near difference=(0, 0), as compared with motion vectors without taking difference and therefore similar motion compensation prediction can be achieved even for searching candidates for motion vectors with small movement, as compared with the case where the difference is not computed, improving the coding efficiency. In addition, the coding efficiency is further improved by making the searching accuracy changeable as shown in FIGS. 17 and 18 and searching near the difference=(0. 0) with high accuracy and the portions with a large difference with low accuracy. Furthermore, if only the large-region representative motion vector are provided with strong error protection, the decoding apparatus can perform motion compensation prediction with low accuracy using large-region representative motion vectors, even if an error occurs the difference vector information, which improves error resilience.

The coding of difference motion vectors 129 at the motion vector encoder 131 is effected using such code words as allow the Hamming distance between code words to get shorter as the Euclidean distance between difference motion vectors gets shorter. As with the motion vector encoder 131 of the second embodiment, this can be achieved by allocating indexes to the difference motion vectors spirally, staring at difference=(0, 0) toward larger difference motion vectors in sequence, and coding these indexed using Gray code. In the examples of searching candidates for difference motion vectors in FIGS. 17 and 18, the indexes may be computed using equations (1) to (11) and equations (12) to (22).

In FIG. 25, the coded prediction error signal 124 from the variable-length encoder 106, the coded large-region motion vector 130 from the variable-length encoder 111, and the coded difference motion vector information 136 from the motion vector encoder 131 are multiplexed at the multiplexer 110. The resulting signal is sent to the transmission channel/storage medium (not shown) as an output bit stream 127.

The multiplexer 110 arranges the motion vectors in a hierarchical fashion according to importance corresponding to the degree of the picture quality deterioration of the decoded picture signal due to errors in transmission/storage and carries out different levels of protection against errors. A method of changing levels of protection against errors is, for example, to use a different error correcting/detecting code for each layer and carry out error protection in a manner that uses a stronger correcting/detecting capability for an upper-layer of greater importance. When transmission and storage can be performed via transmission channels/storage mediums having different error rates, an upper-layer with greater importance is transmitted and stored via a transmission/storage medium having a lower error rate to make an error less liable to occur in the upper-layer code string. The layers are allocated as follows.

First, the coding mode information whose error has the most adverse effect is allocated to the highest-level layer.

Since an error in a large-region representative motion vector has an adverse effect on a wide range, it is allocated to the nest highest-level layer. When the variable-length encoder 111 subjects the large-region representative motion vector 128 to variable-length coding by calculating the difference from the adjacent large-region representative motion vectors, it is desirable that strong protection against errors should be provided, because a synchronization failure of a variable-length code may permit an error to spread over the entire screen.

A code word has been allocated to the coded small-region difference motion vector information 136 so that the Hamming distance between code words may get shorter as a difference motion vector has a shorter Euclidean distance. As a result, it has a higher error resilience than variable-length coded large-region typical vectors. Therefore, small-region difference motion vector information is allocated to a lower-level layer than that to which the large-region typical motion vectors have been allocated.

The error signals whose loss would cause a minor deterioration of picture quality are allocated to the lower layer. This layer may be added with only an error detecting code used in error detecting, such as CRC, or a parity check bit. Furthermore, the layer may be further divided into sublayers according to orthogonal transform sequence, such as the relatively important low-frequency-band components and the less important high-frequency-band components in terms of subjective quality.

When the types of transmission channel/storage medium having different error rates have been determined to be, for example, two layers or three layers, when the ratio of the amount of codes in each layer to the total amount of codes is restricted to a specific range, when not so many types of error correcting and detecting codes can be used because of the limits of hardware, what type of code word should be used in which layer may be determined suitably. For example, the number of layers is two and there is a limit to the proportion of the amount of codes in the upper layer, the most important mode information and the representative motion vectors are coded in the upper layer. The small-region difference motion vector information and the error signal are coded in the upper layer when there is room in the amount of codes in the upper layer, and are coded in the lower layer when there is no room in the amount of codes in the upper layer. In that case, since the small-region difference motion vectors are more important, they are coded in the upper layer in preference to the others. While in the example of FIG. 26, a single large region is subdivided into four small regions, control of the size of a large region and the rate of subdivision into small regions enables much finer control.

Next, a decoding apparatus of the present embodiment will be explained. FIG. 27 is a block diagram of a video decoding apparatus corresponding to the video coding apparatus of the sixth embodiment of FIG. 25. The same parts as those of the video decoding apparatus of the fifth embodiment in FIG. 24 are indicated by the same reference symbols. Explanation will be focused on what differs from the fifth embodiment. The sixth embodiment differs from the fifth embodiment in the configuration of the motion compensation adaptive prediction circuit 301 and motion vector decoder 331, in that another variable-length decoder 311 is added and the demultiplexer 310 separates the input bit stream 321 into three codes, a coded prediction error signal (a variable-length code of quantized DCT coefficient information) 322, variable-length coded large-region representative motion vector 328, and coded small-region difference motion vector 336.

The variable-length coded large-region representative motion vector 328 is decoded at the variable-length decoder 311. The coded small-region difference motion vector 336 is decoded at the difference motion vector decoder 331. The decoded large-region representative motion vector 330 and small-region difference motion vector 329 are inputted to the motion compensation adaptive prediction circuit 301. The motion compensation adaptive prediction circuit 301 adds the large-region representative motion vector 330 to the small-region difference motion vector 329 to produce a small-region motion vector, performs motion compensation prediction on the basis of the reconstructed video signal 325 of the coded frame outputted from the frame memory 302, and produces and outputs a prediction signal 326.

A supplementary explanation about the present embodiment will be given. With the video decoding apparatus of FIG. 25, when an error has been detected in the input bit stream 321, decoding is done by a different process according to the type of code word in which an error occurred. For example, when an error has been detected in the coded prediction error signal 322, the prediction error signal 324 of the block is determined to be 0 and the prediction signal 326 obtained at the motion compensation adaptive prediction circuit 301 using the correctly decoded mode information and motion vector is used as a reconstructed video signal. When the prediction error signal is divided in a hierarchical fashion according to orthogonal transform sequence, it may be subjected to inverse orthogonal transform using only a lower-order sequence than the sequence in which an error occurred and the resulting signal may be used as an error signal. Furthermore, in the region for which the intra-frame prediction mode has been selected, when all of the error signals are made 0 and a reconstructed picture is formed, this will cause a great distortion in coding. Therefore, the reconstructed picture is created by decoding the reconstructed picture using only the correctly decoded low-frequency-band components, by estimating the motion vector in the region on the basis of the correctly decoded motion vector information around the erroneous region, performing motion compensation prediction, and producing a prediction signal as the reconstructed picture, by using the reconstructed picture of the previous frame, or by performing interpolating prediction on the basis of the correctly decoded reconstructed picture around the region.

On the other hand, since the small-region motion vector information 329 has a high error resilience, even if a small numbers of errors occur, it will be processed in the same manner as when there is no error. When a lot of errors occur, however, the small-region motion vector containing errors will not be used to prevent a significant deterioration of picture quality and decoding is effected by using the representative motion vector in the region. Since the mode information and representative motion vector information are provided with strong error protection, the possibility that an error will occur is low. If an error should occur, however, there is a possibility that the picture quality will deteriorate seriously. For the region of the code and the regions on which the error has an adverse effect due to synchronization failure, the local decoded picture of the previous frame is used directly as the decoded picture. When the correct motion vector has been decoded in the regions around the region in which an error occurs, the motion vector in the erroneous region may be estimated from the correctly decoded motion vectors and the estimated motion vector may be used in decoding.

Figure 28:
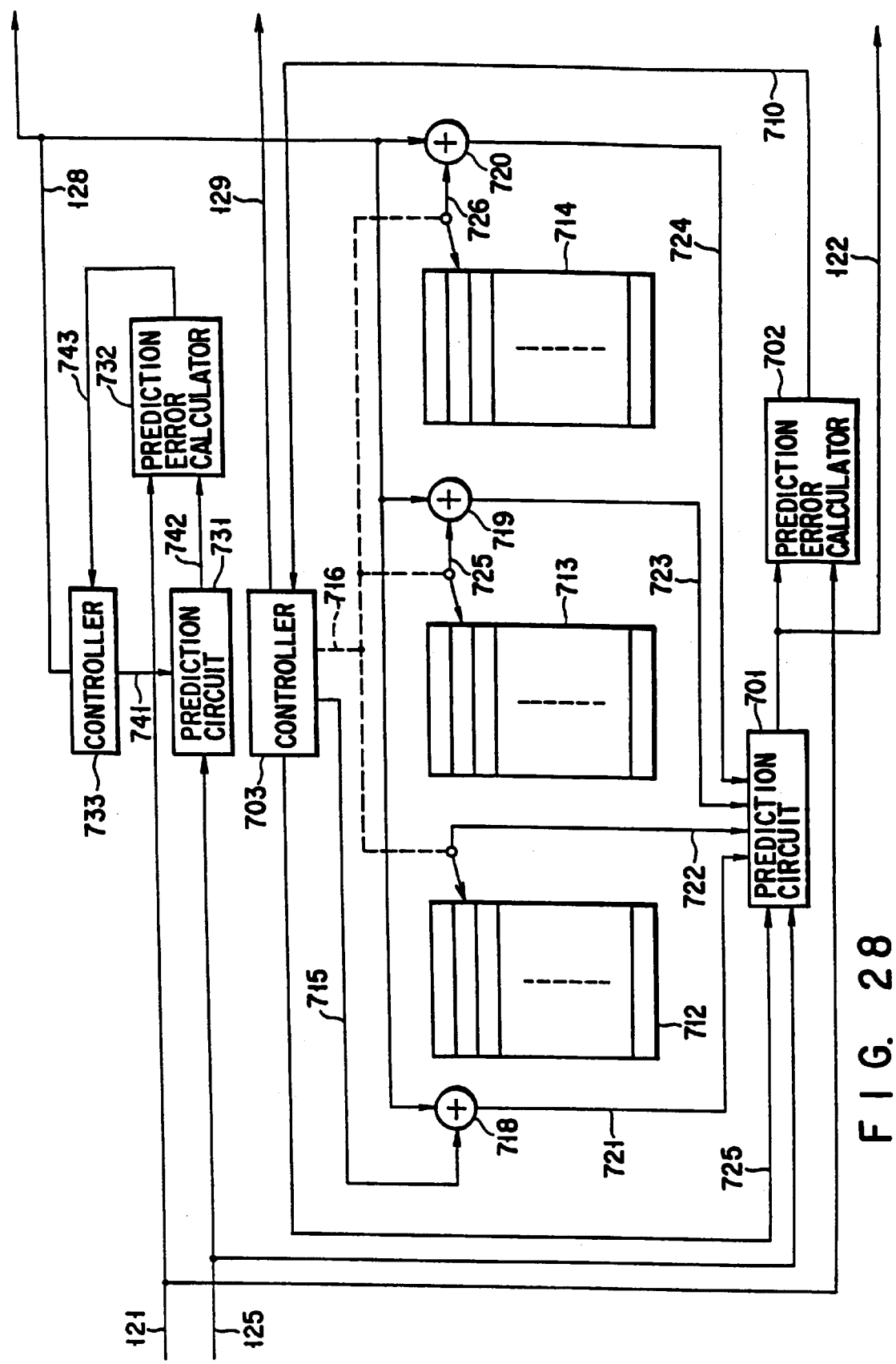
FIG. 28 is a block diagram of the motion compensation adaptive prediction circuit in a video coding apparatus according to a seventh embodiment of the present invention.

FIG. 28 is a block diagram of a motion compensation adaptive prediction circuit 101 in a video coding apparatus according to a seventh embodiment of the present invention. The entire configuration of the video coding apparatus of the seventh embodiment is the same as that of the video coding apparatus of the fifth embodiment of FIG. 25. A motion vector encoder 131 performs a different process from that in the video coding apparatus of the fifth embodiment.

In the motion compensation adaptive prediction circuit 101 of the present embodiment, motion compensation prediction of the input video signal is performed in two layers, one layer of large regions and the other layers of small regions obtained by subdividing the large regions. Part of the small regions are further divided into a plurality of regions according to the contents of the picture. The motion compensation adaptive prediction circuit creates a prediction signal by performing the motion compensation prediction of the input video signal using the motion information obtained by vector-quantizing a combination of the region-division shape information indicating the region shape and the motion vector in each divided region.

FIG. 29 is a drawing to help explain the operation of motion compensation prediction in the present embodiment. First, the inside of the frame is divided into large regions shown by thick solid lines and the large-region representative motion vectors (not shown) are obtained using a block matching method. Then, motion compensation prediction is performed on the small regions shown by thin solid lines of FIG. 25 obtained by subdividing the large regions. Here, motion vector searching is done in the case where the small regions are not subdivided and the case where they are subdivided. In the case where the small regions are not subdivided, motion vector searching is effected in the same manner as motion vector searching at the motion compensation adaptive prediction circuit 101 in the video coding apparatus of the third embodiment. On the other hand, in the case where the small regions are subdivided, motion vector searching is effected in such a manner that region division lines 22 for linear approximation are selected so as to run along the boundary 21 of the object in the small regions and a motion vector 23 is obtained in each of the divided regions. In this case, the region shape and motion vector in each divided region for which a motion compensation prediction error is the smallest are selected from the code vectors previously stored in the code book.

The motion compensation adaptive prediction circuit 101 of FIG. 28 comprises a first prediction circuit 731, a first error calculator 732, a first controller 733, a second prediction circuit 701, a second error calculator 702, a second controller 703, a first to third code books 712, 713, 714, and adders 718, 719, 720. The first prediction circuit 731, first error calculator 732, and first controller 733 are provided for motion compensation prediction using large-region representative motion vectors. On the other hand, the second prediction circuit 701, second error calculator 702, and second controller 703, code books 712, 713, 714, and adders 718, 719, 720 are provided for small-region motion compensation prediction. The first code book 712 stores candidates for region shape information in the form of code vectors. The second and third code books 713, 714 store candidates for the difference motion vectors based on the difference between large-region representative motion vectors and small-region motion vectors in the form of code vectors.

To search for a large-region typical vector, the first controller 733 generates searching candidates 741 for a first motion vector one after another. The first prediction circuit 731 generates a first prediction signal 742 corresponding to the first motion vector 741 on the basis of the local decoded picture signal 125 from the frame memory 102 of FIG. 25. Then, the first error calculator 732 computes the magnitude of the difference (error) between the input picture signal 121 in the large region and the first prediction signal 742 and generates an error level signal 743 indicating the magnitude. The magnitude of error may be determined by, for example, the absolute sum or the square sum of errors, or by the square error sum with the weighted low-frequency-band components. The first controller 733 obtains a large-region representative motion vector 128 for which the magnitude of the error given by the error level signal 743 is the smallest and outputs it.

Then, motion compensation prediction is performed on the small regions (the regions shown by thin solid lines in FIG. 29) obtained by subdividing the large regions.

First, the second controller 703 generates candidates 715 for difference motion vectors without region division one after another. The adder 718 adds these candidates to the previously obtained large-region representative motion vectors 128 to produce candidates 721 for small-region motion vectors. The second prediction circuit 701 generates a first prediction signal 122 corresponding to the candidate 721 for a small-region motion vector on the basis of the local decoded picture signal 125 from the frame memory 102 of FIG. 25. Then, the second error calculator 702 computes the magnitude of the difference (error) between the input picture signal 121 and the prediction signal 122 and generates an error level signal 710 indicating the magnitude. The second controller 703 obtains a motion vector for which the magnitude of the error given by the error level signal 710 is the smallest.

On the other hand, the first code book 712 stores candidates for region shape in segmentation based compensation prediction in the form of code vectors. The second and third code books 713, 714 store code vectors, candidates for motion vectors in the two divided regions, in the form of the difference from the large-region representative motion vector 128. Then, the second controller 703 changes the code book indexes 716 one after another and output them and takes out the region shape information 722 and difference motion vectors 725 and 726 corresponding to the code book index 716 from the first to third code books 712 to 714. The second and third adders 719, 720 add the difference motion vectors 725 and 726 to the large-region representative motion vector 128 to produce candidates 723, 724 for motion vectors. The motion vector candidates 723, 724, together with the region shape information 722, is inputted to the second prediction circuit 701, which produces a prediction signal 122 corresponding to the input. The second error calculator 702 computes the magnitude of the difference (error) between the input video signal 121 and the prediction signal 122 and generates an error level signal 710 indicating the magnitude. The second controller 703 obtains a code book index for which the magnitude of the error given by the error level signal 710 is the smallest.

The second controller 703 selects the one for which the magnitude of the motion compensation error is the smallest from motion compensation prediction with region division and motion compensation prediction without region division and outputs the selection information. The second controller also outputs as the motion vector information 129 the corresponding difference motion vector when motion compensation prediction without region division has been selected and the corresponding code book index when motion compensation prediction with region division.

The motion vector information 129 is coded at the motion vector encoder 131 of FIG. 25. When motion compensation prediction without region division has been selected, the motion vector information 129 is coded as the difference motion vector information 126 is in the video coding apparatus of the sixth embodiment. On the other hand, when motion compensation prediction with region division has been selected, the code book index may be used directly as a code word. In addition, the code books 713 and 714 may be sorted in the order of the sums of the magnitudes of difference motion vectors and code book index is coded using the Gray code. This improves resilience to errors in the region-division motion vectors.

Next, a video decoding apparatus of the present embodiment will be explained. FIG. 30 is a block diagram of a motion compensation adaptive prediction circuit according to an embodiment of the video decoding apparatus of the seventh embodiment. The entire configuration of the video decoding apparatus of the seventh embodiment is the same as that of the video decoding apparatus of the fifth embodiment of FIG. 27.

The motion compensation adaptive prediction circuit 101 of FIG. 30 comprises a prediction circuit 800, a first to third code books 812, 813, 814, and a controller 825. The first code book 812 stores candidates for region shape information in the form of code vectors. The second and third code books 813, 814 store candidates for the difference motion vectors based on the difference between large-region representative motion vectors and small-region motion vectors in the form of code vectors.

The controller 825 outputs a flag 826 indicating which of region division and non-region division is used in small-region motion compensation prediction, a difference motion vector 815 by non-segmentation based compensation, and a code book index 816 for segmentation based compensation.

For the small regions on which motion compensation prediction without region division has been performed, the first adder 818 adds the large-region typical vector 330 decoded at the variable-length decoder 311 to the difference motion vector 815 to decode the small-region motion vector 821. Then, the prediction circuit 800 produces a prediction signal 326 corresponding to the decoded vector 821.

For the small regions on which region-division motion compensation has been performed, the region shape information 822 is taken out of the first code book 812 in accordance with the code book index 816 and supplied to the prediction circuit 800. At the same time, the difference motion vectors in the respective divided region are taken out of the second to third code books 813 and 814. The second and third adders 819, 820 add the difference motion vectors to the large-region representative motion vector 828 to decode small-region motion vectors 823, 824, which are supplied to the prediction circuit 800. The prediction circuit 800 produces a prediction signal according to the region-division shape information 822 and two motion vectors 823, 824, and outputs it.

Explained next will be a method of creating the first to third code books in segmentation based compensation using vector quantization in the video coding/decoding apparatus of the seventh embodiment.

Code books are created using a plurality of video signals before coding. First, in preparation of code book creation, the region shape and motion vector in each region that have not been vector-quantized are searched for. In searching, all of the combinations of region shapes and motion vectors might be searched for the one for which the magnitude of the prediction error is the smallest. This would result in a vast number of combinations to be searched for, requiring a tremendous volume of calculations. To overcome this shortcoming, the following simplified searching is effected.

Figure 32:
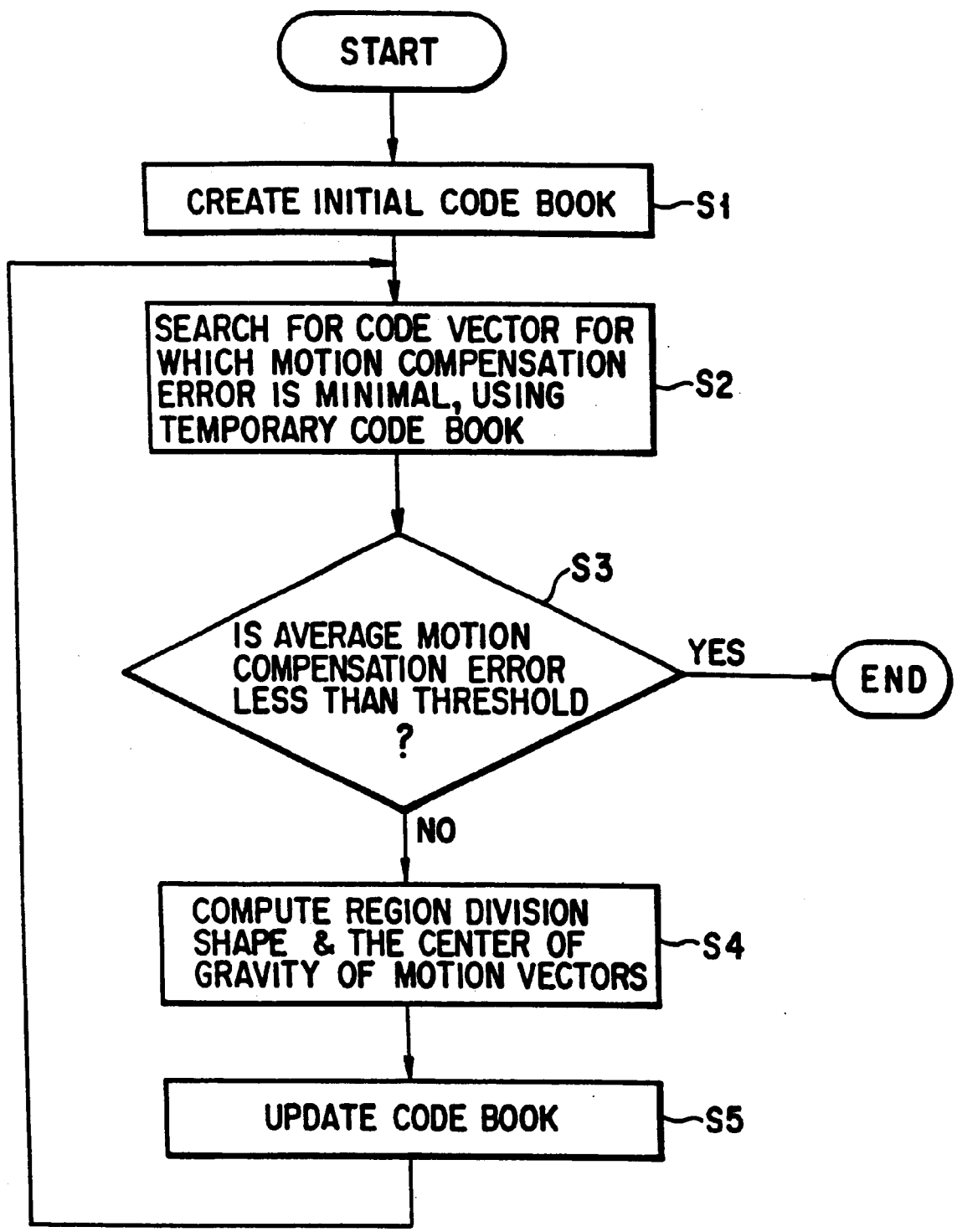
FIG. 32 is a flowchart of the procedure for creating a code book for segmentation based compensation using vector quantization.

FIGS. 31A, 32B and 31C are drawings to help explain a method of searching for a region shape and a motion vector. First, a video signal is divided into small regions shown by solid lines and non-segmentation based vectors in motion compensation prediction without region division are obtained. Then, a small region is divided horizontally, vertically, or diagonally with low accuracy and a region shape for which the magnitude of the motion compensation prediction error is the smallest is obtained. At this time, the non-segmentation based vector in an adjacent region is used as the motion vector in each divided region. For instance, when a small region is divided into the left and right sub-region with a vertical dividing line as shown in FIG. 31A, the non-segmentation based vector in the left adjacent small region is used for the left sub-region and the non-segmentation based vector in the right adjacent small region is used for the right sub-region. When a small region is divided into the upper and lower sub-region with a horizontal dividing line as shown in FIG. 31B, the non-segmentation based vector in the top adjacent small region is used for the upper sub-region and the non-segmentation based vector in the bottom adjacent small region is used for the lower sub-region. When a small region is divided diagonally as shown in FIG. 31C, the non-segmentation based vector in the diagonally adjacent small region is used. By performing motion compensation prediction using such region shape and motion vector, the magnitude of the prediction error is determined and a region division pattern and motion vector for which the error is the smallest are obtained.

In the above process, the motion vector in a divided region may be obtained on the basis of the non-segmentation based vectors in adjacent small regions. Specifically, for example, the average value of non-segmentation based vectors or the weighted mean value according to the distance from a divided region may be used as the motion vector in the divided region. In addition, the motion vector in a divided region may be obtained using a median filter.

Then, the low-accuracy region-division shape and motion vector thus obtained are each forced to deviate little by little. In this way, the region shape and motion vector are obtained with high accuracy. For the region shape, as shown in FIG. 31D, the pixel positions of two intersections 901 where the region dividing line crosses the boundary of the small region are moved several pixels (in the range shown by the arrows 902 in the figure) from the rough region dividing line (the diagonal solid line in the figure). For the motion vector, searching is effected, centering around the motion vector in each region obtained with low accuracy or around the non-segmentation based vector in the small region.

As described above, a non-segmentation based vector is first searched for and on the basis of the vector, a region shape and a motion vector are obtained, thereby limiting the number of candidates to be searched for. Furthermore, the searching is done with high accuracy by deviating the region shape and motion vector a little. Therefore, the number of searches is reduced remarkably, as compared with searching all combinations of region shapes and motion vectors, with the result that the volume of calculations needed for searching decreases.

On the basis of the region shape and motion vector thus obtained, a code book is created. An LBG algorithm or a simulated annealing method may be used to create code books. In general, the square error from the input signal (in this case, the region shape and motion vector) is used as a criterion in creating code books. Since code books in the present embodiment are used for motion compensation prediction, learning is effected using the magnitude (e.g., the square sum or the absolute sum) of motion compensation prediction errors as a criterion.

Hereinafter, a method of creating a code book using an LBG algorithm will be explained. A code book is created through the procedure as shown by the flowchart in FIG. 32.

First, an initial code book is created on the basis of the obtained region shape and motion vector (step S1). In this step, a technique known as splitting is used. Specifically, the center of gravity of all region shapes and difference motion vectors (the difference vectors between non-segmentation based vectors and segmentation based vectors) is calculated and the computed center of gravity is determined to be the first code book y0. Then, the first code book is changed a little to produce two code books y'1, y'2. If a region dividing line the first code book is y0. r and difference motion vectors in the two divided regions are y0. mv1, y0. mv2, respectively, they will be expressed as:

y'1. r=rotate right (y0. r1)
y'2. 4=rotate left (y0, r1)
y'1. mv1=y0. mv1+dmv1
y'2. mv1=y0. mv1−dmv1
y'1. mv2=y0. mv2+dmv2
y'2. mv2=y0. mv2−dmv2 where rotate right: the process of rotating the region dividing line clockwise rotate left: the process of rotating the region dividing line counterclockwise dmv1, dmv2: minute vectors Next, the individual regions are classified, depending on to which of y'1 and y'2 the corresponding region shapes and motion vectors are closer. The center of gravity is computed for each class and the computed center of gravity is determined to be the next code book. The number of code books is increased by repeating the above processes. The processing is ended when the number of code books has reached a specific number. The finally obtained code book is determined to be the initial code book.

Then, with the initial code book thus obtained at step S1 being a temporary code book, a code vector for which the magnitude of the motion compensation error is the smallest is searched for (step S2). If at step S3, the average motion compensation error is less than the threshold value, the center of gravity will be computed for each of the code vectors searched for at step S2 (step S4). The computed center of gravity is determined to be the next temporary code book and updating is done (step S5).

The processes of code book searching (step S2), center-of-gravity calculation (step S4), temporary code book update (step S5) are repeated. Code book learning is repeated until the average of the magnitudes of motion compensation errors based on the temporary code book has been determined to be less than a predetermined value at step S4.

In the code book learning, when the magnitude of a prediction error in segmentation based compensation using the temporary code book is larger than the magnitude of a prediction error in non-segmentation based compensation, the region may be excluded from the center-of-gravity calculation in code book learning. The reason for this is that even if a code book with a great magnitude of motion compensation error is contained in the other code books, there is a strong possibility that it will not be selected in searching for a motion vector at the coding apparatus, because the video coding apparatus of the seventh embodiment performs both of non-segmentation based compensation and segmentation based compensation by vector quantization and selects the one for which the compensation prediction error is smaller.

In code book learning, when the motion vectors in two regions computed as the center of gravity are the same, they are not included in the updated code book. In addition, when the motion vectors in two regions are very close to each other in value, they may not be used for code book update. The reason for this is that when the motion vectors in the individual divided regions differ greatly from each other, segmentation based compensation makes a greater contribution to the improvement of code efficiency than non-segmentation based compensation and that when two motion vectors are very close in value, segmentation based compensation does not make a contribution to a remarkable improvement in the coding efficiency.

In searching for the region shape and motion vector and in code book learning, such a criterion for evaluating prediction errors as allows motion vector (0, 0) to be selected easily may be used. The reason for this is that visual quality of reconstructed video signal is improved by performing segmentation based compensation on a still portion (motion vector=(0, 0), such as a background where the distortion of coding tends to be conspicuous or the boundary of a person, and the boundary portion of a moving object.

While with the video coding/decoding apparatus of the seventh embodiment, the code book indexes of the vector-quantized region shape and motion vector information are fixed-length coded directly, they may be variable-length coded. Doing this way reduces the error resilience a little, but makes the coding efficiency higher.

With the video coding apparatuses explained in the fourth to seventh embodiments, the maximum value of the index of the motion vector information obtained by searching may be obtained on a frame basis or on a region unit basis in coding motion vector information at the motion vector encoder 131, be coded and contained in the code string 127 and a code containing the necessary minimum of bits may be used in coding the maximum value of the index. By doing this, the amount of coded decreases more as more indexes have small values. Therefore, with motion compensation adaptive prediction circuit 101, motion vectors may be searched for using such a criterion as allows motion vectors whose indexes have small values to be selected easily. On the other hand, with the video decoding apparatus, the maximum value of the motion vector index is first decoded and the individual motion vector indexes are is decoded on the assumption that the necessary minimum of code has been used in coding the maximum value. In addition, if the decoded index has exceeded the maximum value, the index may be determined to have been decoded erroneously because of the mixing of an error and be not be used for picture reconstruction.

The above approach may be applied to motion vector indexes in non-segmentation based compensation and code book indexes in segmentation based compensation in the fifth and seventh embodiments. In this case, the code book for segmentation based compensation may be such that smaller values are allocated as code book indexes to difference motion vectors closer to (0, 0). The reason for this is that since motion vectors closer to difference motion vector (0, 0) have a higher frequency of appearance, such indexing permits small code book indexes to appear more frequently, making the index maximum smaller and consequently reducing the number of bits needed to represent indexes, with the result that the amount of codes is decreased.

With the motion compensation adaptive prediction circuit 101 in the video coding apparatus of the seventh embodiment and the motion compensation adaptive prediction circuit 301 in the video decoding apparatus of the seventh embodiment, instead of adding the representative motion vector in the large region containing the small region directly to the small-region difference motion vector in small-region motion compensation, a small-region prediction motion vector to predict a motion vector in the small region from the large-region representative motion vector around the small region may be created and what is obtained by adding the small-region prediction motion vector to the difference motion vector may be determined to be the motion vector in the small region.

Figure 33A:
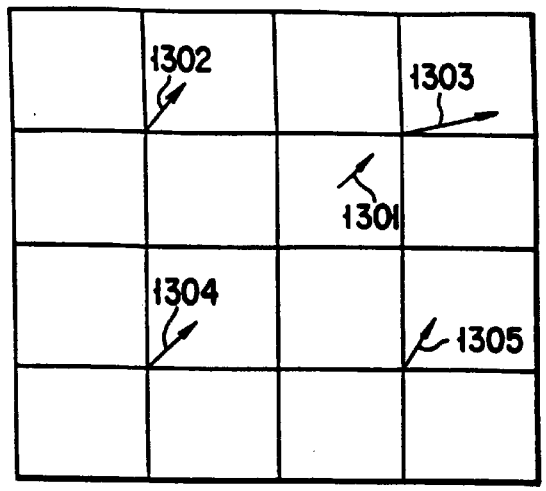
FIGS. 33A and 33B are diagrams to help explain a method of predicting small-region motion vectors from large-region representative motion vectors in the video coding apparatus and video decoding apparatus of the seventh embodiment.
Figure 33B:
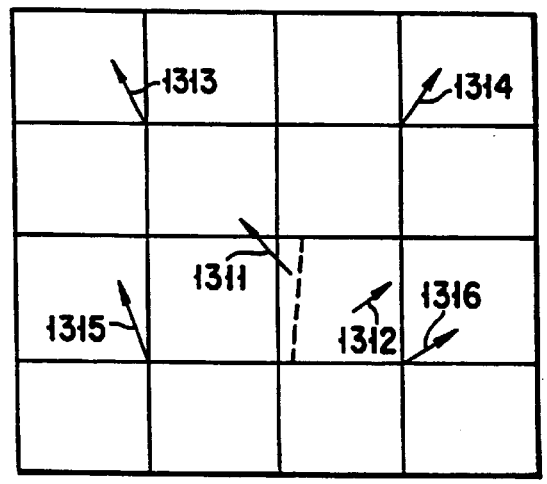

FIGS. 33A and 33B are drawings to help explain how to find small-region prediction vectors. For instance, small-region prediction motion vector 1301 in FIG. 33A is found on the basis of the adjacent large-region representative motion vectors 1302, 1303, 1304, 1305, using, for example, the average of them, or the weighted average in proportion to the distance between the center of the small region and the center of each large region, or using a median filter.

In segmentation based compensation, region division prediction motion vectors to predict the motion vector in each divided region may be found on the basis of the large-region motion vector adjacent to each divided region. For example, how to find region division prediction motion vectors 1311 and 1312 corresponding to the respective divided regions in FIG. 33B will be described. One region division prediction motion vector 1311 is found on the basis of the large-region motion vectors 1213, 1314, 1315, 1316 adjacent to the region, and the other region division prediction motion vector 1311 is found on the basis of the large-region motion vectors 1314, 1316. When the area of one divided region is sufficiently larger than that of the other divided region as shown in FIG. 33B, the region division prediction motion vector 1312 in the region occupying the larger area may be replaced with the representative motion vector 1316 in the large region containing the region, and the region division prediction motion vector 1311 in the other region may be replaced with the representative motion vector 1315 in the large region bordering the region widely.

The prediction motion vector thus obtained usually has a smaller difference from the motion vector in the region than the large-region representative motion vector. Accordingly, the probability that difference motion vectors with small values near (0, 0) will appear becomes high, improving the coding efficiency.

Figure 34:
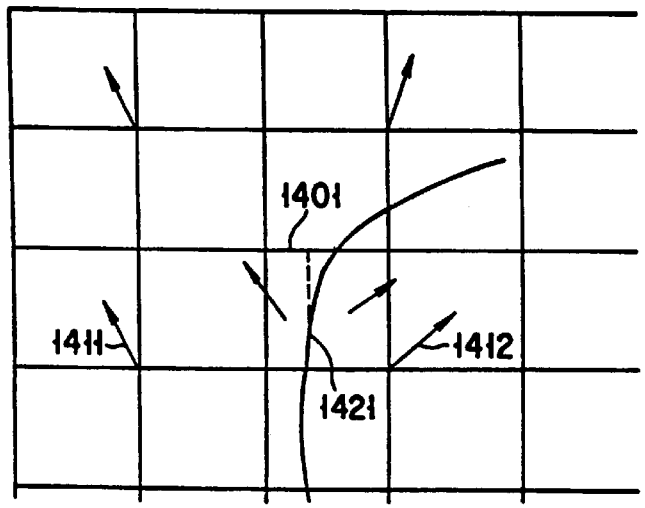
FIG. 34 is a diagram to help explain a method of switching between vector quantization code books in the video coding apparatus and video decoding apparatus of the seventh embodiment.

In the seventh embodiment, a plurality of code books for region shapes and difference motion vectors in segmentation based compensation by vector quantization may be prepared and the code books may be switched on the basis of the adjacent large-region representative motion vectors. For instance, when the large-region representative motion vectors 1411 and 1412 adjacent to the right and left of the small region 1401 differ greatly as shown in FIG. 34, there is a strong possibility that the small region 1401 contains two objects making different motions. Thus, the accuracy of motion compensation is improved more by dividing the small region by a dividing line 1421 that splits the small region into a right and left sub-regions and performing motion compensation, which then improves the code efficiency. Therefore, a code book containing more region shapes that split the region into a right and left sub-regions is selected and segmentation based compensation by vector quantization is performed.

In the sixth and seventh embodiments, although neither the intra-frame prediction mode nor the Not Coded mode in which the local decoded picture of the previous frame is used directly as the reconstructed picture have been explained, it is possible to switch between the motion compensation prediction mode and these modes suitably. The mode switching may be effected on either a small-region or a large-region basis, or on a suitable basis different from these bases. When mode switching is effected on a small-region basis, the small-region motion information need not be coded when the small region is put in the intra-frame coding mode or the Not Coded mode. In addition, when all of the small regions in a large region are put in the intra-frame coding mode or the Not Coded mode, the large-region motion vector need not is be coded either. In the case where mode switching is done on a large-region basis, when the large region is in the intra-frame coding mode or the Not Coded mode, neither the large-region representative motion vector nor the small-region motion information need be coded.

In searching for motion vectors at the motion compensation adaptive prediction circuit 101 in the video coding apparatus of the fifth, sixth, or seventh embodiment shown in FIG. 22, 26, or 28, coding may be effected so that motion vector=(0, 0) are expressed in a small amount of codes by using such a criterion for the magnitude of motion compensation prediction error as allows motion vector=(0. 0) to be selected easily. Since motion vector=(0, 0) normally appears more frequently, expressing it in a small amount of codes results in an improvement in the coding efficiency. For example, when the square sum MSE of prediction errors is used as a criterion, use of what is obtained by subtracting a specific value from MSE only when motion vector=(0, 0) enables motion vector=(0, 0) to be selected easily.

Figure 35:
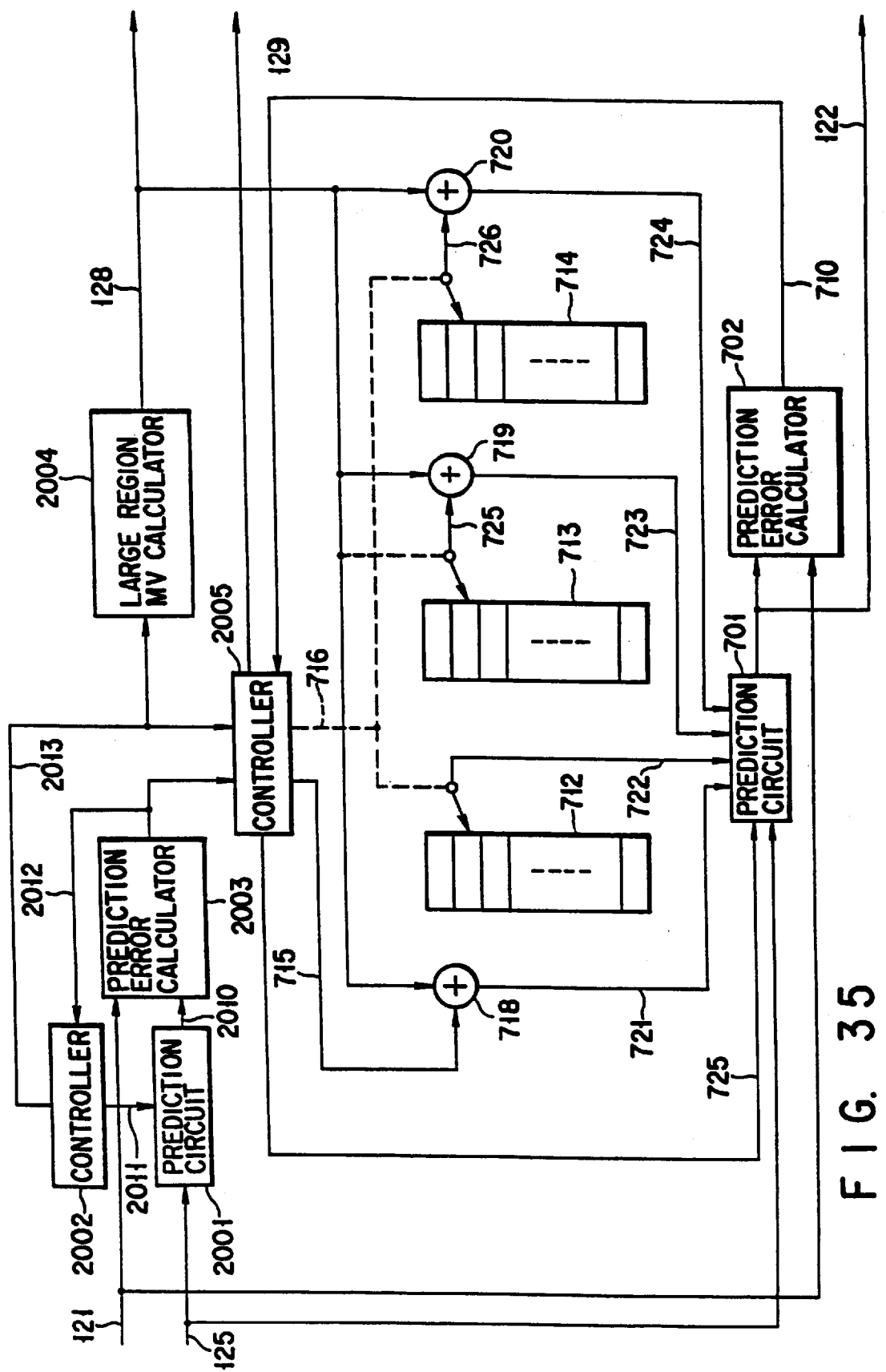
FIG. 35 is a block diagram of a motion compensation adaptive prediction circuit in a video coding apparatus according to an eighth embodiment of the present invention.

FIG. 35 is a block diagram of motion compensation adaptive prediction circuit 101 in a video coding apparatus according to an eighth embodiment of the present invention. The entire configuration of the video coding apparatus of the eighth embodiment is the same as that of the video coding apparatus of the sixth embodiment of FIG. 25 except that the motion compensation adaptive prediction circuit 101 corresponds partially to the motion compensation adaptive prediction circuit in the video coding apparatus of the seventh embodiment of FIG. 28.

Specifically, the motion compensation adaptive prediction circuit 101 used in the eighth embodiment comprises a first prediction circuit 2001 that receives a local decoded picture signal 125, a first error calculator 2003 that receives the prediction signal 2010 from the prediction circuit 2001 and an input picture signal 121, and a first controller 2002 that receives the error level signal 2012 from the error calculator 2003 and outputs small-region predetermined motion vectors 2013 and small-region predetermined motion vector candidates 2011. The motion compensation adaptive prediction circuit 101 further comprises a second prediction circuit 701, a second error calculator 702, a second controller 2005, a first to third code books 712, 713, 714, and adders 718, 719, 720. These component parts basically have the same functions as those in FIG. 28. Specifically, the second prediction circuit 701 receives the local decoded picture signal 125, the flag 725 indicating whether the small-region motion compensation is done on region division or non-region division base from the controller 2005, the candidate 721 for the small-region motion vector from the adder 718, the motion vector candidates 723, 724 from the adders 719, 720, and the candidate for the region shape from the code book 712 and outputs a prediction signal. The error calculator 702 produces a prediction error signal from the prediction signal and input picture signal 121.

In the present embodiment, the first prediction circuit 2001, first controller 2002, and error calculator 2003 are used for searching for small-region motion vectors. A large-region MV calculator 2004 computes a large-region motion vector from the small-region vector searched for. Specifically, when a large-region representative motion vector is found, small-region preliminary searching is effected to find the predetermined motion vectors in the small regions contained in the large region and on the basis of the search result, a large-region representative motion vector is determined. In this case, to search for the small-region predetermined motion vector, the first controller 2002 first generates small-region predetermined motion vector candidates 2011 one after another. The first prediction circuit 2001 generates a first prediction signal 2010 corresponding to the small-region predetermined motion vector candidate 2011 on the basis of the local decoded picture signal 125 of the coded frame from the frame memory 102 of FIG. 25. Furthermore, the first prediction error calculator 2003 computes the magnitude of the difference (error) between the input picture signal 121 in the large region and the first prediction signal 2010 and generate a first error level signal 2012 indicating the magnitude. The criterion for the magnitude of the error may be, for example, the absolute sum or square sum of errors, or the square error sum with the weighted low-frequency-band. The criterion may be weighted according to the magnitude of the motion vector in such a manner that, for example, the evaluation value for motion vector=(0, 0) is determined to be the magnitude of error minus a specific value. The first controller 2002 obtains a vector for which the magnitude of the error given by the error level signal 2012 from the small-region predetermined motion vector searching candidates 2011 as a small-region predetermined motion vector 2013 and outputs the vector.

Then, the large-region motion vector calculator 2004 computes a large-region representative motion vector 128 on the basis of the small-region predetermined motion vector 2013 thus obtained and outputs it.

Figure 36:
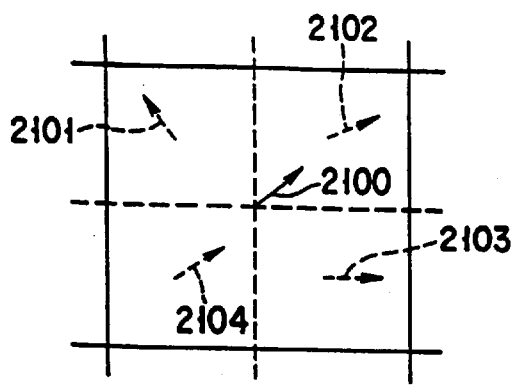
FIG. 36 is a diagram to help explain a method of searching for a large-region representative motion vector in the motion compensation prediction circuit of FIG. 35.

FIG. 36 is a drawing to help explain a method of searching for large-region motion vectors in the present embodiment. The regions indicated by solid lines are large regions and the regions indicated by broken lines are small regions. It is assumed that for each small region, the small-region predetermined motion vectors 2101 to 2104 indicated by the broken-line arrows have been found through the aforesaid procedure. The large-region representative motion vector 2100 is calculated by the following equations, using the small-region predetermined motion vectors 2101 to 2104 in the large region and the median of the average value of them:

RMVx=median (mv1x, mv2x, mv3x, mv4x, amvx)

RMVy=median (mv1y, mv2y, mv3y, mv4y, amvy)

where RMVx: the x component of the large-region representative motion vector

RMVy: the y component of the large-region representative motion vector median ( ): median mv1x, mv2x, mv3x, mv4x: the x components of the small-region predetermined motion vectors 2101 to 2104 mv1y, mv2y, mv3y, mv4y: the y components of the small-region predetermined motion vectors 2101 to 2104 amvx: the average value of mv1x to mv4x amvy: the average value of mv1y to mv4y

As described above, by determining the large-region motion vector from the small-region predetermined motion vectors, the similarity between the small-region motion vectors and the large-region motion vector becomes high.

In small-region motion compensation in the subsequent level explained below, vector quantization of the motion information is carried out by computing the difference from the large-region motion vector. As the probability that the large-region motion vector will resemble the small-region motion vector becomes higher, the probability that the difference of the motion information will become small becomes higher, with the result that the efficiency of motion compensation is improved and therefore the coding efficiency is improved.

Then, motion compensation prediction is performed on the small region.

First, the second controller 2005 generates candidates 715 for difference motion vectors without region division one after another. The adder 718 adds these candidates to the previously obtained large-region representative motion vector 128 to produce candidates 721 for small-region motion vectors. The second prediction circuit 701 generates a first prediction signal 122 corresponding to the candidate 721 for a small-region motion vector on the basis of the local decoded picture signal 125 of the previous frame from the frame memory 102 of FIG. 25. Then, the second error calculator 702 computes the magnitude of the difference (error) between the input picture signal 121 and the prediction signal 122 and generates an error level signal 710 indicating the magnitude of the error. The second controller 703 obtains a motion vector for which the magnitude of the error given by the error level signal 710 is the smallest.

For the small-region motion vector candidate which is identical with the small-region predetermined motion vector candidates 201 to obtain a large-region representative motion vector, there is no need of additionally computing error level 710, because it is computed as error level 2012.

Figure 37:
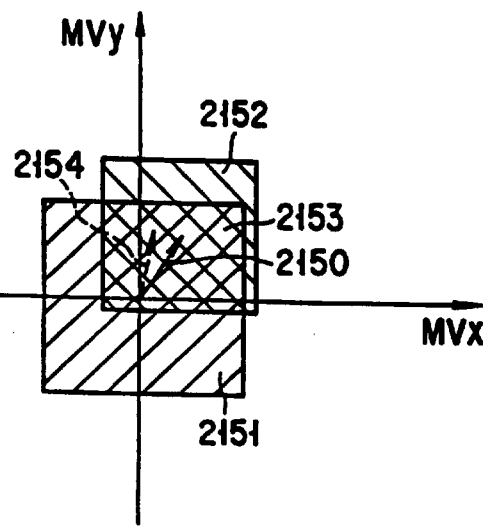
FIG. 37 is a diagram to help explain a method of searching for a small-region motion vector without region division in the motion compensation prediction circuit of FIG. 36.

A method of searching for small-region motion vectors without region division will be described with reference to FIG. 37. In FIG. 37, the region in which a predetermined motion vector is to be searched for is the area shaded with slash lines and the region in which a small-region motion vector is to be searched for is the region around the large-region representative motion vector 2150 shaded with backslash lines. In this case, in the region 2153 where these two regions 2151 and 2152 overlap each other, a small-region motion vector for which the first prediction error level signal 2012 is the smallest is selected as a first selected value from those in the overlapping region 2153 of the candidates for the small-region predetermined motion vector.

Then, in the region where the region 2152 does not overlap with the region 2151, or in the region other than the region 2153, candidates 715 for motion vectors are generated one after another and a small-region motion vector for which the second error level signal 710 is the smallest is selected as a second selected value.

Of the first and second selected values, the one whose error level is smaller is selected as a small-region motion vector without region division.

As described above, by partially searching for a small-region motion vector without region division using the search result of the predetermined motion vector, the volume of calculations for searching for a small-region motion vector can be reduced.

When the small-region predetermined motion vector 2154 shown by the broken-line arrow is in the region 2153 where the region 2151 and the region 2152 overlap each other, because the small-region predetermined motion vector 2154 is a motion vector for which the second error level signal is the smallest in the region 2153, there is no need of computing the first selected value again and the small-region predetermined motion vector 2154 is determined to be the first selected value. Eliminating the process of recomputing the value enables the volume of calculations to be reduced further.

Thereafter, the code book index for region-division motion compensation is searched for. Then, the prediction signal 122 and the motion vector information 129 containing the code book index and information indicating whether region division has been made or not are outputted. The operation is the same as that of the motion compensation adaptive prediction circuit 101 of the seventh embodiment of FIG. 28.

The present embodiment is an embodiment of the motion compensation adaptive prediction circuit 101 in the video coding apparatus of FIG. 25. It may be applied to the searching of motion vectors in a motion compensation adaptive prediction circuit that performs motion compensation adaptive prediction in a hierarchical fashion. For example, even with the motion compensation adaptive prediction circuits shown in FIGS. 9 and 22, a small-region predetermined motion vector is first searched for, followed by the determination of the large-region typical vector and the searching of a small-region motion vector, thereby achieving the improvement of the coding efficiency and the reduction of the volume of calculations.

Finally, an embodiment of a video transmission system to which a video coding/decoding apparatus of the present invention is applied as an application of the invention will be explained with reference to FIG. 38. The video signal inputted by a camera 1002 provided on a personal computer (PC) 1001 is coded by a video coding apparatus built in the PC 1001. After the coded data outputted from the video coding apparatus has been multiplexed with other audio information and data, the multiplexed data is transmitted from a radio unit 1003 by radio and received by another radio unit 1004. The signal received by the radio unit 1004 is separated into the coded data of the video signal, audio information, and data. Of these, the coded data of the video signal is decoded by a video decoding apparatus built in a workstation (EWS) 1005 and the decoded signal is allowed to appear on a display of the EWS 1005.

On the other hand, the video signal supplied from a camera 1006 provided on the EWS 1005 is coded in the same manner as described above using a video coding apparatus built in the EWS 1005. The coded data of the video signal is multiplexed with other audio information and data. Then, the multiplexed data is transmitted from the radio unit 1004 by radio and received by another radio unit 1003. The signal received by the radio unit 1003 is separated into the coded data of the video signal, audio information, and data. Of these, the coded data of the video signal is decoded by the video decoding apparatus built in the PC 1001 and the decoded signal is allowed to appear on a display of the PC 1001.

Figure 38:
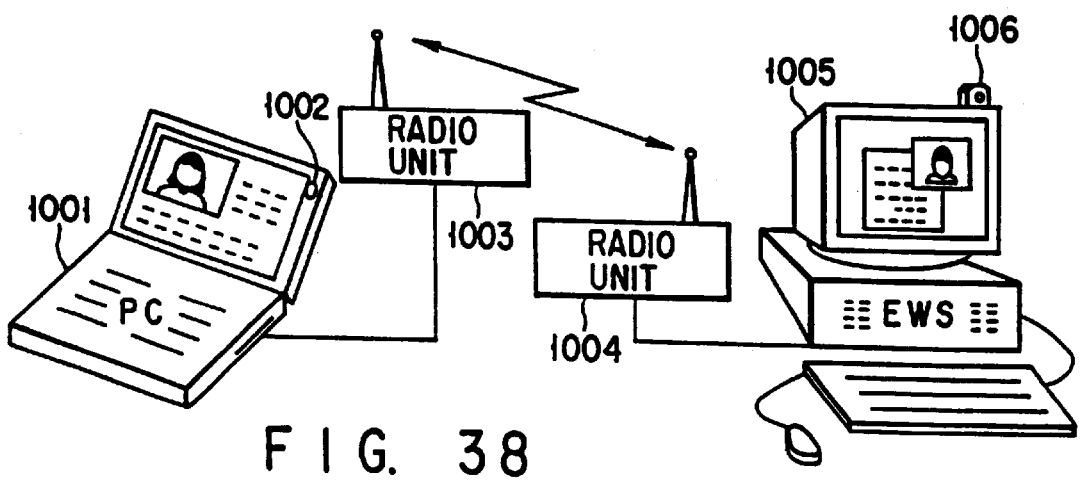
FIG. 38 is a block diagram of a system to which a video coding/decoding apparatus according to the present invention is applied.
Figure 39:
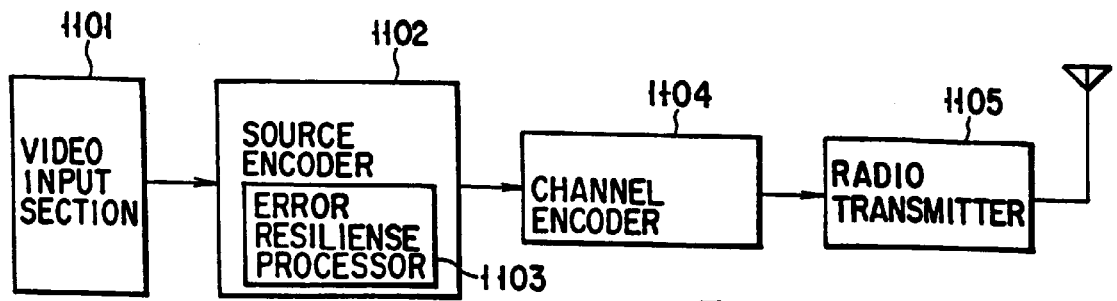
FIG. 39 is a schematic block diagram of a video coding apparatus used in the system of FIG. 38.

FIG. 39 is a schematic block diagram of the video coding apparatus and video decoding apparatus built in the PC 1001 and EWS 1005 of FIG. 38.

The video coding apparatus of FIG. 39 comprises an information source encoder 1102 that receives a video signal from a video input section 1101, such as a camera, and has an error resilience processor 1103, and a transmission channel encoder 1104. The information source encoder 1101 performs discrete cosine transform (DCT) of prediction error signals and quantization of generated DCT coefficients. The transmission channel encoder 1104 performs variable-length coding, error detecting of coded data, and error correcting/detecting coding. The coded data outputted from the transmission channel encoder 1104 is sent to a radio unit 1105, which transmits it.

Figure 40:
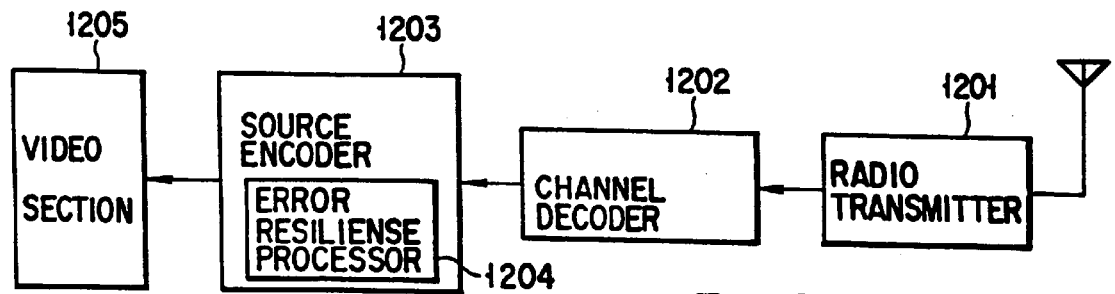
FIG. 40 is a schematic block diagram of a video decoding apparatus used in the system of FIG. 38.

On the other hand, the video decoding apparatus of FIG. 40 comprises a transmission channel decoder 1202 that takes in the coded data received by the radio unit 1201 and carries out the opposite process to that of the transmission encoder 1104 and an information source decoder 1203 that takes receives the output signal from the transmission channel decoder 1201 and has an error resilience processor 1204 that perform the opposite process to that of the information source encoder 1102. The picture decoded at the information source decoder 1203 is outputted by a video output section 1025, such as a display.

Figure 41:
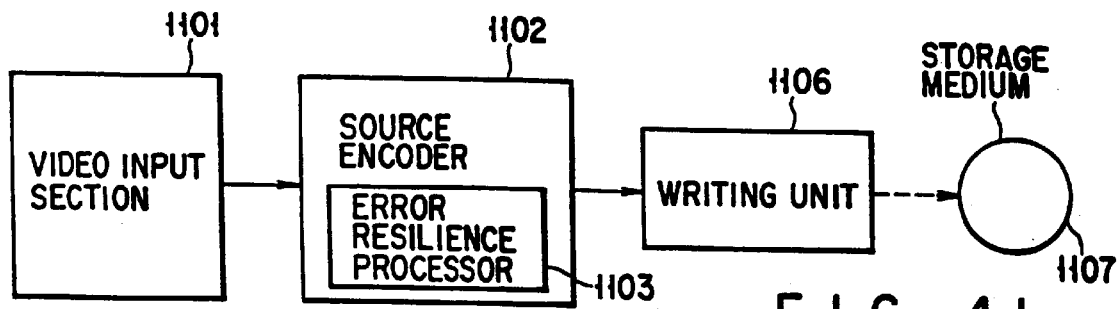
FIG. 41 is a schematic block diagram of a recording apparatus to which a video coding system of the present invention is applied.
Figure 42:
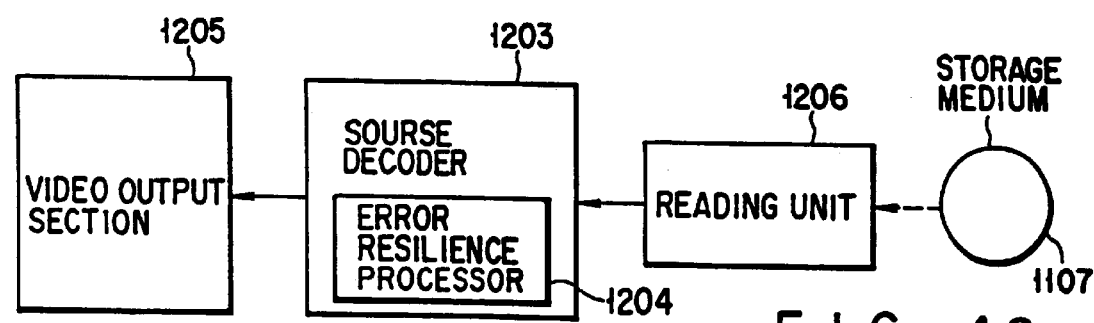
FIG. 42 is a block diagram of a reconstructing apparatus that reconstructs the coded data recorded on a recording medium by the recording apparatus of FIG. 41.

FIGS. 41 and 42 show a video coding/decoding apparatus according to the present invention that records video signals on a recording medium and reconstructs the video signals from the recording medium. Specifically, in the recording apparatus of FIG. 41, the video signal from a video input section 1101, such as a camera, is supplied to an information source encoder 1102 having an error resilience processor 1103 and is coded. In this case, the information source encoder 1101 performs discrete cosine transform (DCT) of prediction error signals and quantization of generated DCT coefficients. A transmission channel encoder 1104 performs variable-length coding, error detecting of coded data, and error correcting/detecting coding. A writing unit 1106 writes the coded data outputted from the transmission channel encoder 1104 onto a recording medium 1107.

On the other hand, in the reconstructing apparatus, the coded data recorded on the recording medium 1107 is read by a reading unit 1206, which supplies it to an information source decoder 1203 having an error resilience processor 1204 that performs the opposite process to that of the information source encoder 1102. The picture decoded at the information source decoder 1203 is outputted by an video output section 1025, such as a display.

As described above, with the present invention, it is possible to provide a video coding/decoding apparatus with high error resilience, that is, capable of keeping the picture quality of the reconstructed picture less liable to deteriorate due to an error occurring in transmitting and storing code strings.

Specifically, with the present invention, by performing the prediction of the input video signal in a hierarchical fashion over as many regions as possible and coding information on the predictions obtained at the individual levels including not only the lowest level but also higher levels, the video decoding apparatus can creates a prediction signal from information on the predictions, providing that there is no error in information on the predictions at higher levels, even if an error has occurred in information on the prediction at a particular level. Thus, it is possible to reduce the deterioration of picture quality of the decoded picture when an error has occurred in information on the prediction. When code strings obtained by coding prediction error signals and code strings obtained by coding information on the predictions at the respective levels are outputted in the form of hierarchical code strings, the disadvantage that information on all of the predictions is included in code strings in upper layers and outputted can be overcome by outputting code strings of information on the predictions obtained at higher levels as code strings in upper layers, and further a decrease in the error resilience can be avoided by outputting information on the predictions as code strings in lower layers.

Furthermore, with the present invention, when information on the prediction at each level of hierarchical prediction is decoded and the prediction error signal is not decoded correctly because an error has occurred in information on the prediction at a particular level, the deterioration of picture quality of the decoded picture can be avoided by creating a prediction signal using information on the prediction at a higher level and then decoding the video signal.

With the present invention, because determining whether or not the decoded information is possible information in coding moving images decreases the probability that erroneous information will be detected to be correct, it is possible to suppress the deterioration of picture quality of the decoded picture as a result of using erroneous information in decoding moving images.

With the present invention, by converting the coded information into code strings in such a manner that code words are arranged in deceasing order of importance, an error is prevented from spreading from less important information to more important information, avoiding a serious deterioration of picture quality of the decoded picture.

Furthermore, because motion compensation prediction of the video signal is performed using the vector-quantized motion information, it is possible to perform efficient motion compensation prediction while suppressing the amount of codes in motion information by representing the motion information by code book indexes specifying code vectors in the code book. Since the vector-quantized motion information has a smaller bias in the amount of generated information, even use of variable-length coding enables motion information to be coded at a relatively high coding efficiency. In the video decoding apparatus, an error is prevented from spreading over a wide range due to synchronization failure differently from variable-length coding, when an error occurs the transmission channel or the like. As a result, the quality of the reconstructed picture at the time when an error occurs is improved remarkably, increasing error resilience while the high coding efficiency is kept.

Furthermore, by arranging candidates for the motion vectors corresponding to the code vectors stored in the code book in such a manner that candidates for motion vectors with smaller movement are arranged with higher pixel accuracy, the prediction error signal of motion compensation prediction becomes smaller. By arranging candidates for motion vectors with large movement that appear less frequently with low pixel accuracy and thereby reducing the number of motion vector candidates to be searched for, the coding efficiency can be improved further.

Furthermore, motion compensation prediction is performed in a hierarchical fashion. The prediction error signal at the lowest level is coded and the motion information used in motion compensation prediction at the highest level is coded. In motion compensation prediction at part or all of the levels other than the highest level, the sum of a piece of difference motion information selected from the difference motion vectors obtained by vector-quantizing the difference between the candidate of the motion information to be used at the level and candidates for motion information at higher levels and the motion information used at a higher level, is used as motion information. Motion information in the hierarchical motion compensation prediction has a strong correlation with motion information used in motion compensation prediction at a higher level. When the difference between the motion information at a particular level and the motion information at a higher level is found, its components gather near 0. Vector quantization has the nature of presenting a high coding accuracy for a signal with a large bias. By making use of these two features, a much higher coding efficiency can be achieved.

Furthermore, when hierarchical motion compensation prediction is combined with multi-layer coding, a great leeway can be allowed for allocation of the amount of codes to each layer by controlling the way of allocating pieces of the motion information at the individual levels to the layers. This makes it possible to cope with a case where there are restrictions on the amount of codes in each layer because of the limits of the transmission channel. Because the vector-quantized motion information has a high error resilience, the quality of the reconstructed picture is less liable to deteriorate in the decoding apparatus even in coding in a lower layer, achieving high error resilience.

Furthermore, the video signal is divided into a plurality of regions according to the contents of the picture and motion compensation prediction is carried out using the motion information obtained by vector-quantizing a combination of the region shape information and the motion vector for each divided region. Thus, even in a portion where objects with different motions are in contact with each other, it is possible to divide the prediction region along the boundaries and perform prediction using different motion information for each object. This improves the prediction efficiency of motion compensation prediction and consequently increases the quality of coding. In the regions where region division prediction is performed, motion compensation prediction is carried out using the motion information obtained by vector-quantizing a combination of region shape information and vector information, so that the motion information containing region shape information can be expressed efficiently in a small amount of codes. This prevents the amount of codes from increasing because of use of region shape information, which was the disadvantage of a conventional segmentation based compensation prediction system. In addition, the vector-quantized information can be variable-length coded at a high coding efficiency, preventing the deterioration of picture quality of the reconstructed picture due to synchronization failure on occurrence of an error, which was a problem with widely used variable-length coding. Additionally, when the output code strings from the video coding apparatus are transmitted and stored via a medium in which an error is liable to occur, the deterioration of picture quality due to error can be minimized.

Furthermore, by using code words having the correlation with the Euclidean distance between motion vectors and the Hamming distance between code words in coding motion vector information, the deviation from the erroneously decoded motion vector can be suppressed to a minimum even if an error occurs the code word of the motion vector information. In the case of an ordinary transmission channel and storage medium whose error rate per code word is one bit or less, errors in the motion vector will be suppressed to a minimum, with the result that if an error has occurred, a high-quality reconstructed video signal can be obtained.

Furthermore, by performing the motion compensation prediction of the video signal using the vector-quantized motion information, which portion of the code book the obtained motion information exists in is determined, and on the basis of this, a code word used in coding the motion information is decided. This reduces the amount of coded needed to code the motion information even if the code book size is large, as compared with the case where the code words necessary to code all of the code book indexes are used, with the result that the coding efficiency can be improved.

Furthermore, motion compensation prediction is performed in a hierarchical fashion. The prediction error signal at the lowest level is coded and the motion information used in motion compensation prediction at the highest level is coded. In motion compensation prediction at part or all of the levels other than the highest level, the sum of a piece of difference motion information selected from the difference motion vectors obtained by vector-quantizing the difference from the motion information predicted from the motion information at a higher level and the motion information used at the higher level, is used as motion information. When hierarchical motion compensation prediction is combined with multi-layer coding, a great leeway can be allowed for allocation of the amount of codes to each layer by controlling the way of allocating pieces of the motion information at the individual levels to the layers. This makes it possible to cope with a case where there are restrictions on the amount of codes in each layer because of the limits of the transmission channel. Since the vector-quantized motion information has a high error resilience, the quality of the reconstructed picture is less liable to deteriorate in the decoding apparatus even in coding in a lower layer, achieving high error resilience. In addition, motion information in motion compensation prediction at a lower level is predicted from the motion information at a higher level and the difference from the predicted motion information is computed, making the magnitude of the difference motion information smaller than the difference from the motion information at the higher level itself, with the result that the amount of codes needed to code the difference motion information can be reduced.

Furthermore, because from the motion information obtained by preliminarily searching for the motion information at least at one level other than the highest level, motion information at least at one of the level and a higher level is determined, the probability that motion information similar to the motion information at a lower layer is obtained as motion information at a higher level becomes high. In motion compensation at a lower level, since vector quantization of motion information is performed by computing the difference from the motion information at a higher level, as the probability that motion information at a high level will resemble motion information at a low level becomes higher, the probability that the difference in motion information will become smaller gets higher, with the result that the efficiency of motion compensation is improved and accordingly the coding efficiency is improved. Additionally, by partially searching for the motion information at lower levels without region division using the preliminary search result, the amount of calculations for searching for the motion information at the lower levels can be reduced.

Furthermore, with a code book creating apparatus for vector quantization segmentation based compensation prediction, by using a motion compensation prediction error as a criterion in code book learning, it is possible to create a code book most suitable for performing motion compensation prediction with high accuracy to reduce a prediction error and thereby increasing the coding efficiency.

Still furthermore, with a segmentation based compensation searching apparatus according to the present invention, a motion vector can be searched for in a small volume of calculations by searching for non-segmentation based vectors to obtain rough region shapes and motion vectors, correcting them, and searching for region shapes and motion vectors.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A video coding apparatus, comprising:

prediction signal generating means for selecting one of an intraframe predictive coding method and an interframe predictive coding method for coding an input video signal divided into a plurality of regions, to selectively generate an intraframe prediction signal with the intraframe predictive coding method and a set of an interframe prediction signal and a motion vector with the interframe predictive coding method;

first coding means for coding coding mode information for each of the regions, the mode information indicating one of the intraframe and interframe predictive coding methods, to obtain plural coded coding mode information, and for coding the motion vector obtained for each of the regions by said prediction signal generating means in the interframe predictive coding method to obtain plural coded motion vectors;

prediction error generating means for generating a prediction error signal for each of the regions based on one of the intraframe prediction signal and the interframe prediction signal generated by the prediction signal generating means and the input video signal;

second coding means for coding the prediction error signal for each of the regions to obtain plural coded prediction error information; and code string generating means for outputting a code string divided into at least first and second layers, the first layer including a synchronization code, the mode information for each of the plurality of regions and the motion vector for each of the plurality of regions, and the second layer including the predictive error information for the plurality of regions.

2. A video coding apparatus, comprising:

prediction signal generating means for selecting one of an intraframe predictive coding method and an interframe predictive coding method for coding an input video signal divided into a plurality of regions, to selectively generate an intraframe prediction signal with the intraframe predictive coding method and a set of an interframe prediction signal and a motion vector with the interframe predictive coding method;

first coding means for coding coding mode information for each of the regions, the mode information indicating one of the intraframe and interframe predictive coding methods, to obtain plural coded coding mode information;

second coding means for coding the motion vector obtained for each of the regions by said prediction signal generating means in the interframe predictive coding method to obtain plural coded motion vectors;

prediction error generating means for generating a prediction error signal for each of the regions based on one of the intraframe prediction signal and the interframe prediction signal generated by the prediction signal generating means and the input video signal;

third coding means for coding the prediction error signal for each of the regions to obtain plural coded prediction error signals; and code string generating means for outputting a code string divided into at least first and second layers, the first layer including a synchronization code and the mode information for each of the plurality of regions, and the second layer including the predictive error information for the plurality of regions.

3. A video coding apparatus, comprising:

prediction signal generating means for selecting one of an intraframe predictive coding method and an interframe predictive coding method for coding an input video signal divided into a plurality of regions, to selectively generate an intraframe prediction signal with the intraframe predictive coding method and an interframe prediction signal with the interframe predictive coding method;

first coding means for coding coding mode information for each of the regions, the mode information indicating one of the intraframe and interframe predictive coding methods, to obtain plural coded coding mode information;

prediction error generating means for generating a prediction error signal for each of the regions based on one of the intraframe prediction signal and the interframe prediction signal generated by the prediction signal generating means and the input video signal;

second coding means for coding the prediction error signal for each of the regions to obtain plural coded prediction error signals; and code string generating means for outputting a code string divided into at least first and second layers, the first layer including a synchronization code and the mode information for each of the plurality of regions, and the second layer including the predictive error information for the plurality of regions.

4. A video coding apparatus, comprising:

prediction signal generating means for selecting one of an intraframe predictive coding method and an interframe predictive coding method for coding an input video signal divided into a plurality of regions, to selectively generate an intraframe prediction signal with the intraframe predictive coding method and a set of an interframe prediction signal and a motion vector with the interframe predictive coding method;

first coding means for coding coding mode information for each of the regions, the mode information indicating one of the intraframe and interframe predictive coding methods, to obtain plural coded coding mode information;

second coding means for coding the motion vector obtained for each of the regions by said prediction signal generating means in the interframe predictive coding method to obtain plural coded motion vectors;

prediction error generating means for generating a prediction error signal for each of the regions based on one of the intraframe prediction signal and the interframe prediction signal generated by the prediction signal generating means and the input video signal;

third coding means for coding the prediction error signal for each of the regions to obtain plural coded prediction error signals; and code string generating means for outputting a code string divided into at least first and second layers, the first layer including a synchronization code, the mode information for each of the plurality of regions and the motion vector for each of the plurality of regions, and the second layer including the predictive error information for the plurality of regions.

5. A video coding apparatus, comprising prediction signal generating means for selecting one of an intraframe predictive coding method and an interframe predictive coding method for coding an input video signal divided into a plurality of regions, to selectively generate an intraframe prediction signal with the intraframe predictive coding method and a set of an interframe prediction signal and a motion vector with the interframe predictive coding method;

first coding means for coding coding mode information for each of the regions, the mode information indicating one of the intraframe and interframe predictive coding methods, to obtain plural coded coding mode information, and for coding the motion vector obtained for each of the regions by said prediction signal generating means in the interframe predictive coding method to obtain plural coded motion vectors;

prediction error generating means for generating a prediction error signal for each of the regions based on one of the intraframe prediction signal and the interframe prediction signal generated by the prediction signal generating means and the input video signal;

second coding means for coding the prediction error signal for each of the regions to obtain plural coded prediction error information; and code string generating means for outputting a code string divided into at least first and second layers, the first layer including a synchronization code and the motion vector for each of the plurality of regions, and the second layer including the predictive error information for the plurality of regions.

6. A video coding apparatus, comprising:

a prediction signal generating section configured to select one of an intraframe predictive coding method and an interframe predictive coding method for coding an input video signal divided into a plurality of regions, and to selectively generate an intraframe prediction signal with the intraframe predictive coding method and a set of an interframe prediction signal and a motion vector with the interframe predictive coding method;

a first coding section configured to code coding mode information for each of the regions, the coding mode information indicating one of the intraframe and interframe predictive coding methods, for obtaining plural coded coding mode information, and to code the motion vector obtained for each of the regions by said prediction signal generating section in the interframe predictive coding method for obtaining plural coded motion vectors;

a prediction error generating section configured to generate a prediction error signal for each of the regions based on one of the intraframe prediction signal and the interframe prediction signal generated by the prediction signal generating section and the input video signal;

a second coding section configured to code the prediction error signal for each of the regions for obtaining plural coded prediction error information; and a code string generating section configured to output a code string divided into at least first and second layers, the first layer including a synchronization code, the mode information for each of the plurality of regions and the motion vector for each of the plurality of regions, and the second layer including the predictive error information for the plurality of regions.

7. A video coding apparatus, comprising:

a prediction signal generating section configured to select one of an intraframe predictive coding method and an interframe predictive coding method for coding an input video signal divided into a plurality of regions, for selectively generating an intraframe prediction signal with the intraframe predictive coding method, and a set of an interframe prediction signal and a motion vector with the interframe predictive coding method;

a first coding section configured to code coding mode information for each of the regions, the coding mode information indicating one of the intraframe and interframe predictive coding methods, for obtaining plural coded coding mode information;

a second coding section configured to code the motion vector obtained for each of the regions by said prediction signal generating section in the interframe predictive coding method, for obtaining plural coded motion vectors;

a prediction error generating section configured to generate a prediction error signal for each of the regions based on one of the intraframe prediction signal and the interframe prediction signal generated by the prediction signal generating section and the input video signal;

a third coding section configured to code the prediction error signal for each of the regions for obtaining plural coded prediction error signals; and a code string generating section configured to output a code string divided into at least first and second layers, the first layer including a synchronization code and the mode information for each of the plurality of regions, and the second layer including the predictive error information for the plurality of regions.

8. A video coding apparatus, comprising:

a prediction signal generating section configured to select one of an intraframe predictive coding method and an interframe predictive coding method for coding an input video signal divided into a plurality of regions, for selectively generating an intraframe prediction signal with the intraframe predictive coding method and an interframe prediction signal with the interframe predictive coding method;

a first coding section configured to code coding mode information for each of the regions, the coding mode information indicating one of the intraframe and interframe predictive coding methods, for obtaining plural coded coding mode information;

a prediction error generating section configured to generate a prediction error signal for each of the regions based on one of the intraframe prediction signal and the interframe prediction signal generated by the prediction signal generating section and the input video signal, a second coding section configured to code the prediction error signal for each of the regions for obtaining plural coded prediction error signals; and a code string generating section configured to output a code string divided into at least first and second layers, the first layer including a synchronization code and the mode information for each of the plurality of regions, and the second layer including the predictive error information for the plurality of regions.

9. A video coding apparatus, comprising:

a prediction signal generating section configured to select one of an intraframe predictive coding method and an interframe predictive coding method for coding an input video signal divided into a plurality of regions, for selectively generating an intraframe prediction signal with the intraframe predictive coding method and a set of an interframe prediction signal and a motion vector with the interframe predictive coding method;

a first coding section configured to code coding mode information for each of the regions, the coding mode information indicating one of the intraframe and interframe predictive coding methods, for obtaining plural coded coding mode information;

a second coding section configured to code the motion vector obtained for each of the regions by said prediction signal generating section in the interframe predictive coding method, for obtaining plural coded motion vectors;

a prediction error generating section configured to generate a prediction error signal for each of the regions based on one of the intraframe prediction signal and the interframe prediction signal generated by the prediction signal generating section and the input video signal;

a third coding section configured to code the prediction error signal for each of the regions to obtain plural coded prediction error signals; and a code string generating section configured to output a code string divided into at least first and second layers, the first layer including a synchronization code, the mode information for each of the plurality of regions and the motion vector for each of the plurality of regions, and the second layer including the predictive error information for the plurality of regions.

10. A video coding apparatus, comprising:

a prediction signal generating section configured to select one of an intraframe predictive coding method and an interframe predictive coding method for coding an input video signal divided into a plurality of regions, and to selectively generate an intraframe prediction signal with the intraframe predictive coding method and a set of an interframe prediction signal and a motion vector with the interframe predictive coding method;

a first coding section configured to code mode information for each of the regions, the mode information indicating one of the intraframe and interframe predictive coding methods, for obtaining plural coded coding mode information, and to code the motion vector obtained for each of the regions by said prediction signal generating section in the interframe predictive coding method for obtaining plural coded motion vectors;

a prediction error generating section configured to generate a prediction error signal for each of the regions based on one of the intraframe prediction signal and the interframe prediction signal generated by the prediction signal generating section and the input video signal;

a second coding section configured to code the prediction error signal for each of the regions for obtaining plural coded prediction error information; and a code string generating section configured to output a code string divided into at least first and second layers, the first layer including a synchronization code and the motion vector for each of the plurality of regions, and the second layer including the predictive error information for the plurality of regions.

11. A video coding method, comprising:

selecting one of an intraframe predictive coding method and an interframe predictive coding method for coding an input video signal divided into a plurality of regions and selectively generating an intraframe prediction signal with the intraframe predictive coding method and a set of an interframe prediction signal and a motion vector with the interframe predictive coding method;

coding coding mode information for each of the regions, the mode information indicating one of the intraframe and interframe predictive coding methods, to obtain plural coded coding mode information;

coding the motion vector obtained for each of the regions by said prediction signal generating step in the interframe predictive coding method to obtain plural coded motion vectors;

generating a prediction error signal for each of the regions based on one of the intraframe prediction signal and the interframe prediction signal generated by the prediction signal generating step and the input video signal;

coding the prediction error signal for each of the regions to obtain plural coded prediction error information; and outputting a code string divided into at least first and second layers, the first layer including a synchronization code, the mode information for each of the plurality of regions and the motion vector for each of the plurality of regions, and the second layer including the predictive error information for the plurality of regions.

12. A video coding method, comprising:

selecting one of an intraframe predictive coding method and an interframe predictive coding method for coding an input video signal divided into a plurality of regions and selectively generating an intraframe prediction signal with the intraframe predictive coding method and a set of an interframe prediction signal and a motion vector with the interframe predictive coding method;

coding coding mode information for each of the regions, the mode information indicating one of the intraframe and interframe predictive coding methods, to obtain plural coded coding mode information;

coding the motion vector obtained for each of the regions by said prediction signal generating step in the interframe predictive coding method to obtain plural coded motion vectors;

generating a prediction error signal for each of the regions based on one of the intraframe prediction signal and the interframe prediction signal generated by the prediction signal generating step and the input video signal;

coding the prediction error signal for each of the regions to obtain plural coded prediction error signals; and outputting a code string divided into at least first and second layers, the first layer including a synchronization code and the mode information for each of the plurality of regions, and the second layer including the predictive error information for the plurality of regions.

13. A video coding method, comprising:

selecting one of an intraframe predictive coding method and an interframe predictive coding method for coding an input video signal divided into a plurality of regions and selectively generating an intraframe prediction signal with the intraframe predictive coding method and an interframe prediction signal with the interframe predictive coding method;

coding coding mode information for each of the regions, the mode information indicating one of the intraframe and interframe predictive coding methods, to obtain plural coded coding made information;

generating a prediction error signal for each of the regions based on one of the intraframe prediction signal and the interframe prediction signal generated by the prediction signal generating step and the input video signal;

coding the prediction error signal for each of the regions to obtain plural coded prediction error signals; and outputting a code string divided into at least first and second layers, the first layer including a synchronization code and the mode information for each of the plurality of regions, and the second layer including the predictive error information for the plurality of regions.

14. A video coding method, comprising:

selecting one of an intraframe predictive coding method and an interframe predictive coding method for coding an input video signal divided into a plurality of regions and selectively generating an intraframe prediction signal with the intraframe predictive coding method and a set of an interframe prediction signal and a motion vector with the interframe predictive coding method;

coding coding mode information for each of the regions, the mode information indicating one of the intraframe and interframe predictive coding methods, to obtain plural coded coding mode information;

coding the motion vector obtained for each of the regions by said prediction signal generating step in the interframe predictive coding method to obtain plural coded motion vectors;

generating a prediction error signal for each of the regions based on one of the intraframe prediction signal and the interframe prediction signal generated by the prediction signal generating step and the input video signal;

coding the prediction error signal for each of the regions to obtain plural coded prediction error signals; and outputting a code string divided into at least first and second layers, the first layer including a synchronization code, the mode information for each of the plurality of regions and the motion vector for each of the plurality of regions, and the second layer including the predictive error information for the plurality of regions.

15. A video coding method, comprising:

selecting one of an intraframe predictive coding method and an interframe predictive coding method for coding an input video signal divided into a plurality of regions, to selectively generate an intraframe prediction signal with the intraframe predictive coding method and a set of an interframe prediction signal and a motion vector with the interframe predictive coding method;

coding coding mode information for each of the regions, the mode information indicating one of the intraframe and interframe predictive coding methods, to obtain plural coded coding mode information;

coding the motion vector obtained for each of the regions by said prediction signal generating step in the interframe predictive coding method to obtain plural coded motion vectors;

generating a prediction error signal for each of the regions based on one of the intraframe prediction signal and the interframe prediction signal generated by the prediction signal generating step and the input video signal;

coding the prediction error signal for each of the regions to obtain plural coded prediction error information; and outputting a code string divided into at least first and second layers, the first layer including a synchronization code and the motion vector for each of the plurality of regions, and the second layer including the predictive error information for the plurality of regions.

* * * * *